(12) United States Patent
Ishii et al.

(10) Patent No.: US 8,701,806 B2
(45) Date of Patent: Apr. 22, 2014

(54) ELECTRIC TRANSAXLE UNIT

(75) Inventors: Norihiro Ishii, Amagasaki (JP);
Tomoyuki Ebihara, Amagasaki (JP);
Kengo Sasahara, Amagasaki (JP);
Masaya Itou, Amagasaki (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 1044 days.

(21) Appl. No.: 12/634,098

(22) Filed: Dec. 9, 2009

(65) Prior Publication Data
US 2010/0236845 A1 Sep. 23, 2010

Related U.S. Application Data

(60) Provisional application No. 61/161,249, filed on Mar. 18, 2009.

(51) Int. Cl.
*B60K 5/04* (2006.01)

(52) U.S. Cl.
USPC .......................... 180/65.6; 180/346; 180/312

(58) Field of Classification Search
USPC .................... 180/292, 346, 308, 65.6
See application file for complete search history.

(56) References Cited

U.S. PATENT DOCUMENTS

| | | | |
|---|---|---|---|
| 1,540,526 A | 6/1925 | Anglada | |
| 3,404,747 A | 10/1968 | Fagel | |
| 4,809,796 A * | 3/1989 | Yamaoka et al. | 180/6.48 |
| 5,829,542 A | 11/1998 | Lutz | |
| 6,692,394 B2 * | 2/2004 | Takenaka | 475/5 |
| 6,899,190 B2 * | 5/2005 | Bordini | 180/65.235 |
| 7,163,077 B2 * | 1/2007 | Hasegawa et al. | 180/305 |
| 7,174,996 B2 * | 2/2007 | Hori et al. | 184/6.12 |
| 7,398,853 B2 * | 7/2008 | Ohtsuki et al. | 180/312 |
| 7,506,710 B2 * | 3/2009 | Abe et al. | 180/65.25 |
| 7,610,985 B2 * | 11/2009 | Ohashi | 180/305 |
| 7,610,986 B2 * | 11/2009 | Ohashi | 180/305 |
| 7,690,470 B2 * | 4/2010 | Iwaki et al. | 180/252 |

(Continued)

FOREIGN PATENT DOCUMENTS

| | | |
|---|---|---|
| DE | 20 2005 020 624 U1 | 6/2006 |
| EP | 0 525 663 A1 | 2/1993 |

(Continued)

OTHER PUBLICATIONS

Extended European Search Report for EP Application No. 11192237.3, European Patent Office mailed Mar. 26, 2012, 4 pgs.

(Continued)

*Primary Examiner* — Jeffrey J Restifo
(74) *Attorney, Agent, or Firm* — Sterne, Kessler, Goldstein & Fox P.L.L.C.

(57) ABSTRACT

An electric transaxle unit includes an axle, an electric motor for driving the axle, a motor shaft serving as an output shaft of the electric motor, the motor shaft being not coaxial to the axle, a deceleration gear train interposed between the motor shaft and the axle, a brake adapted to brake any element in a power train between the motor shaft and the axle via the deceleration gear train, and a casing. The casing incorporates the axle, the electric motor, the motor shaft, the deceleration gear train and the brake. The casing includes an attachment portion to be attached to a frame, and wherein the attachment portion has a constant height from a center axis of the axle regardless of whether the casing is vertically inversed.

21 Claims, 32 Drawing Sheets

(56) References Cited

U.S. PATENT DOCUMENTS

| | | | |
|---|---|---|---|
| 7,694,765 B2 * | 4/2010 | Kitagawara et al. | 180/65.6 |
| 7,798,259 B2 * | 9/2010 | Iida et al. | 180/6.2 |
| 7,866,433 B2 * | 1/2011 | Martin et al. | 180/337 |
| 8,028,776 B2 * | 10/2011 | Dong et al. | 180/6.48 |
| 2010/0236845 A1 * | 9/2010 | Ishii et al. | 180/65.6 |

FOREIGN PATENT DOCUMENTS

| | | |
|---|---|---|
| FR | 2 726 231 | 5/1996 |
| WO | WO 2007/110204 A1 | 10/2007 |
| WO | WO 2009/022958 A1 | 2/2009 |

OTHER PUBLICATIONS

European Search Report for EP Appliction No. 10158564.4, European Patent Office mailed Dec. 2, 2010 5 pgs.

\* cited by examiner

ELECTRIC TRANSAXLE UNIT

BACKGROUND OF THE INVENTION

1. Field of the Invention

The present invention relates to an electric transaxle unit including a casing incorporating an electric motor for driving an axle.

2. Related Art

Recently, an electric transaxle unit having a casing, which incorporates an electric motor having variable output and supports an axle driven by the electric motor, is used for various vehicles or devices. In a typical electric transaxle unit, a motor shaft, serving as an output shaft of the electric motor, is disposed in the casing so as not to be coaxial to the axle, a deceleration gear train is disposed in the casing so as to be interposed between the motor shaft and the axle, and a brake is disposed in the casing so as to be adapted to brake any element in a power train ranging between the motor shaft and the axle via the deceleration gear train. A typical vehicle using the electric transaxle unit is a hybrid car. The electric transaxle unit is also adaptable to an electric wheelchair and various working vehicles such as a lawn mower and a skid steering loader.

Standardization is an important factor to economize manufacture of the electric transaxle unit. Especially, in the case that a vehicle is equipped with a pair of left and right electric transaxle units for driving respective left and right wheels, each electric transaxle unit is desired to be able to serve as either the left or right electric transaxle unit. In this regard, each electric transaxle unit is desired to be convenient to attach to either a left or right portion of a frame of a vehicle or the like, or is desired to be convenient to operatively connect to either a left or right link member connected to a brake operation device.

Further, the electric transaxle unit is desired so that its components can be simply assembled, and the assembled components are firmly settled. Further, in consideration that the electric transaxle unit has an indispensable electric wire connected to the electric motor in the casing and extended outward from the casing, the casing is desired to be sealed against the electric wire penetrating a wall of the casing surely and simply during assembling of the electric transaxle unit.

SUMMARY OF THE INVENTION

An electric transaxle unit according to the invention has a basic structure such that the electric transaxle unit comprises a casing, an electric motor and an axle. The casing incorporates the electric motor and supports the axle driven by the electric motor. Further, in a first aspect of the invention, the electric transaxle unit further comprises a motor shaft serving as an output shaft of the electric motor, and a deceleration gear train. The motor shaft is disposed in the casing so as not to be coaxial to the axle. The deceleration gear train is disposed in the casing so as to be interposed between the motor shaft and the axle.

A first object of the invention is to provide the electric transaxle unit in the first aspect, which is convenient to mount onto either the left or right portion of a vehicle body or the like so as to serve as either a left or right electric transaxle unit, while the left and right electric transaxle units are equipped on the vehicle or the like so that one electric transaxle unit corresponds to the other electric transaxle unit vertically inversed.

To achieve the first object, in the electric transaxle unit of the first aspect, the casing includes an attachment portion to be attached to a frame. The attachment portion has a constant height from a center axis of the axle regardless of whether the casing is vertically inversed. Therefore, when the electric transaxle units that are identical to each other are paired and arranged as left and right electric transaxle units to be mounted onto respective left and right portions of the frame of a vehicle or the like so that one electric transaxle unit corresponds to the other electric transaxle unit inversed vertically, the electric transaxle units have the respective attachment portions to be attached to the frame at equal heights from the enter axes of the respective left and right axles, thereby being available to be attached to the frame. Consequently, the electric transaxle unit is standardized to reduce costs.

Preferably, in the electric transaxle unit of the first aspect, the casing includes first and second divisional casing parts joined to each other to have a horizontal joint surface therebetween. The axle has an axis disposed on the horizontal joint surface. The first divisional casing part includes a first attachment portion, and the second divisional casing part includes a second attachment portion, so that each of the first and second attachment portions can serve as the attachment portion of the casing to be attached to the frame, and the first and second attachment portions are equally distant in vertical from the horizontal joint surface therebetween. Therefore, either the first or second attachment portion serves as the attachment portion of the casing to be attached to the frame, which has a constant height regardless of whether the casing is vertically inversed. In this regard, to equip a pair of left and right electric transaxle units on a vehicle, the left and right electric transaxle units are necessarily arranged to have the respective axles that are as high as each other. When the pair of electric transaxle units serve as the left and right electric transaxle units arranged so that one electric transaxle unit corresponds to the other electric transaxle unit vertically inversed, the first attachment portion of one electric transaxle unit and the second attachment of the other electric transaxle unit are equally distant in vertical from the respective axles and are disposed at equal heights, thereby serving as the attachment portions of the casings of the respective left and right electric transaxle units to be attached to the frame.

Further preferably, the motor shaft is disposed to have an axis disposed on the horizontal joint surface. Therefore, the axis of the motor shaft is kept at a constant height because the axis of the axle is also disposed on the horizontal joint surface, even if the electric transaxle unit serves as either of the left and right electric transaxles equipped on a vehicle while one electric transaxle unit corresponds to the other electric transaxle unit vertically inversed.

A second object of the invention is to provide the electric transaxle in the first aspect, further comprising a brake disposed in the casing so as to be adapted to brake any element in a power train between the motor shaft and the axle via the deceleration gear train, wherein the electric transaxle unit is convenient to connect to either the left or right link members connected to a brake operation device so as to serve as either a left or right electric transaxle unit, while the left and right electric transaxle units are equipped on the vehicle or the like so that one electric transaxle unit corresponds to the other electric transaxle unit vertically inversed.

To achieve the second object, the electric transaxle unit having the brake includes a brake arm for operating the brake, the brake arm being extended outward from the casing. The brake arm has a connection portion which is kept at a constant height from a center axis of the axle regardless of whether the casing is vertically inversed. Therefore, when the electric transaxle units that are identical to each other are paired and arranged as left and right electric transaxle units to be equipped on a vehicle or the like having a brake operation device and a pair of left and right link members extended at equal heights from the brake operation device so that one electric transaxle unit corresponds to the other electric transaxle unit inversed vertically, the connection portions of the brake arms of the respective electric transaxle units are disposed at equal heights from the center axes of the respective left and right axles, thereby being available to be connected to the respective left and right link members connected to the brake operation device. Consequently, the electric transaxle unit is standardized to reduce costs.

Preferably, in the electric transaxle unit having the brake and the brake arm, the casing includes first and second divisional casing parts joined to each other to have a horizontal joint surface therebetween. The axle has an axis disposed on the horizontal joint surface. The brake arm is extended outward from one of the first and second divisional casing parts so as to have the connection portion disposed at the same height of the horizontal joint surface. In this regard, to equip a pair of left and right electric transaxle units on a vehicle, the left and right electric transaxle units are necessarily arranged to have the respective axles as high as each other. Therefore, when the pair of electric transaxle units serve as the left and right electric transaxle units arranged so that one electric transaxle unit corresponds to the other electric transaxle unit vertically inversed, a height in one electric transaxle unit where its brake arm is extended outward from its casing is different from a height in the other electric transaxle unit where its brake arm is extended outward from its casing, however, both the connection portions of the respective brake arms are disposed at equal heights from the center axes of the respective left and right axles because of their equal heights to those of the respective horizontal joint surfaces.

Alternatively, preferably, in the electric transaxle unit having the brake and the brake arm, the casing includes first and second divisional casing parts joined to each other to have a horizontal joint surface therebetween. The axle has an axis disposed on the horizontal joint surface. Both the first and second divisional casing parts include respective arm-projection portions adapted to have the brake arm extended outward therefrom. The arm-projection portions of the respective first and second divisional casing parts are evenly distant in vertical from the horizontal joint surfaces. One of the arm-projection portions of the respective first and second divisional casing parts is selected so as to have the brake arm extended outward therefrom. Therefore, when the pair of electric transaxle units serve as the left and right electric transaxle units arranged so that one electric transaxle unit corresponds to the other electric transaxle unit vertically inversed, one electric transaxle unit has its brake arm extended outward from the arm-projection portion of its first divisional casing part, and the other electric transaxle unit has its brake arm extended outward from the arm-projection portion of the second divisional casing part, so that a height in one electric transaxle unit where its brake arm is extended outward from its casing is equal to a height in the other electric transaxle unit where its brake arm is extended outward from its casing. Consequently, the brake arms do not require complicated processing, e.g., bending, to ensure the equal heights of the connection portions of the respective brake arms.

A third object of the invention is to provide the electric transaxle unit in the first aspect, wherein the axle can be optionally manually made to be rotatably free from the motor shaft of the electric motor.

To achieve the third object, in the electric transaxle unit of the first aspect, a manually operable clutch is disposed in the casing on any portion of a power train between the motor shaft and the axle via the deceleration gear train, so that the axle can be isolated from an output power of the electric motor by manual operation to disengage the clutch. Therefore, regarding a vehicle equipped with the electric transaxle unit having a clutch, a drive wheel drivingly connected to the axle can be made to be rotatably free from the electric motor by the manual operation for disengaging the clutch for convenient pushing of the vehicle by a person's hand or towing of the vehicle, in case the electric motor is stationary because it is broken or if there is trouble with an electric wire connected to the electric motor, or if the battery for the electric motor dies.

A fourth object of the invention is to provide an economized vehicle equipped with a pair of left and right electric transaxle units for driving respective left and right wheels.

To achieve the fourth object, a vehicle comprises a pair of left and right wheels, and a pair of left and right electric transaxle units for driving the respective left and right wheels. The left and right electric transaxle units are identical to each other. Each of the left and right electric transaxle units is the electric transaxle unit in the first aspect, which comprises a casing, an electric motor, an axle, a deceleration gear train and a brake. The casing incorporates the electric motor, and supports the axle driven by the electric motor. A motor shaft serving as an output shaft of the electric motor is disposed in the casing so as not to be coaxial to the axle. The deceleration gear train is disposed in the casing so as to be interposed between the motor shaft and the axle. The brake is disposed in the casing so as to be adapted to brake any element in a power train between the motor shaft and the axle via the deceleration gear train. Therefore, the electric transaxle units, which are identical to each other, i.e., have the common structure, are paired to serve as the left and right electric transaxle units equipped on the vehicle, so that the electric transaxle unit is standardized for economizing the vehicle.

Preferably, in the vehicle, the left and right electric transaxle units are arranged so that one electric transaxle unit corresponds to the other electric transaxle unit vertically inversed.

Preferably, in the vehicle, the left and right electric transaxle units have the respective axles disposed on a coaxial line extended laterally of the vehicle. The left and right electric transaxle units are line-symmetric with respect to a fore-and-aft extended centerline of the vehicle at the center of the coaxial line between the left and right axles.

Alternatively, preferably, in the vehicle, the left and right electric transaxle units have the respective axles disposed coaxially to each other. The left and right electric transaxle units are point-symmetric with respect to a lateral center point of a vehicle body disposed on a coaxial line of the axles between the left and right axles disposed coaxially to each other.

Therefore, any one of various arrangements of the left and right electric transaxle units can be selected to correspond to the design of the vehicle.

A fifth object of the invention is to provide the electric transaxle unit having the basic structure, wherein the casing is surely and simply sealed against an electric wire penetrating a wall of the casing during assembly of the electric transaxle unit.

To achieve the fifth object, in the electric transaxle unit having the basic structure, the casing includes first and second divisional casing parts joined to each other so as to have a joint surface therebetween, and includes a hole dividable between the first and second casing parts by the joint surface. A wire-passage member through which an electric wire is passed is fitted in the hole so as to be clamped between the first and second divisional casing parts. Therefore, a part of the wire-passage member is fitted into a divisional part of the hole in one of the first and second divisional casing parts before the first and second divisional casing parts are joined to each other. Then, the remaining part of the wire-passage member is naturally fitted into another divisional part of the hole in the other of the first and second divisional casing parts by joining the first and second divisional casing parts to each other. In this way, the wire-passage member is clamped between the first and second divisional casing parts so as to surely seal the interior of the casing against the electric wire entering the inside of the casing from the outside of the casing.

Preferably, in the electric transaxle unit having the wire-passage member, the wire-passage member fitted in the hole is shaped, when viewed along the joint surface, to have a first half extended from the joint surface into the first divisional casing part perpendicularly to the joint surface, and a second half extended from the joint surface into the second divisional casing part perpendicularly to the joint surface. Each of the first and second halves has a width along the joint surface, so that the width is reduced as it goes further distant from the joint surface. Further preferably, each of the hole and the wire-passage member fitted in the hole is rhombic when viewed along the joint surface so as to have a diagonal extended on the joint surface. Therefore, deformation of the wire-passage member clamped between the first and second divisional casing parts is restricted, thereby being advantageous in durability and thereby reducing deviation of the electric wire passed through the wire-passage member.

A sixth object of the invention is to provide the electric transaxle unit having the basic structure, wherein an output rotary member of the electric motor and a motor shaft serving as an output shaft of the electric motor are easily and firmly assembled and fastened to each other.

To achieve the sixth object, the output rotary member is a hollow member having a tapered inner peripheral surface. The motor shaft is supported in the casing and is drivingly connected to the axle so as to serve as an output shaft of the electric motor. The motor shaft has a tapered outer peripheral surface. The tapered inner peripheral surface of the output rotary member and the tapered outer peripheral surface of the motor shaft are fittingly pressed against each other by axial relative movement of the output rotary member and the motor shaft, whereby the output rotary member is fixed on the motor shaft. Therefore, the output rotary member and the motor shaft are firmly assembled and fastened to each other so as to eliminate deviation therebetween causing vibration or noise.

A seventh object of the invention is to provide an electric transaxle unit having the basic structure, wherein the electric transaxle unit comprises a motor assembly disposed in the casing so as to serve as the electric motor for driving the axle, wherein the motor assembly includes a motor shaft drivingly connected to the axle, wherein the motor assembly is prevented from leaking noise outward therefrom through a gap adjacent to a bearing journaling the motor shaft, and wherein the motor shaft and the bearing are assembled in the motor assembly so as to be prevented from deviating in the axial direction of the motor shaft.

To achieve the seventh object, the motor assembly of the electric transaxle unit having the basic structure includes a pair of first and second bearings fitted onto the motor shaft at respective inner peripheral surfaces thereof, a rotor having a magnet and fixed on the motor shaft, a stator having an armature winding and secured to the casing, and a support frame detachably fixed to the stator. The stator is formed with a first retaining projection, and is fitted onto an outer peripheral surface of the first bearing so as to have the first retaining projection on a distal side of the first bearing opposite to the second bearing in the axial direction of the motor shaft. The support frame is formed with a second retaining projection, and is fitted onto an outer peripheral surface of the second bearing so as to have the second retaining projection on a distal side of the second bearing opposite to the first bearing in the axial direction of the motor shaft. One of the first and second retaining projections abuts against the corresponding first or second bearing so that the other of the first and second retaining projections has a gap from the corresponding first or second bearing. The motor assembly further includes a gap-filling member fitted in the gap so as to prevent the corresponding first or second bearing from moving towards the corresponding first or second retaining projection in the axial direction of the motor shaft. Therefore, due to the gap-filling member, the motor assembly is prevented from leaking noise outward therefrom through the gap.

Preferably, the motor shaft includes a plurality of portions having different diameters so as to have a pair of steps abutting against axially proximal end surfaces of the respective first and second bearings so as to prevent the first and second bearings from moving towards each other in the axial direction of the motor shaft. The rotor has a tapered inner peripheral surface. The motor shaft has a tapered outer peripheral surface fitted to the tapered inner peripheral surface of the rotor so as to be pressured by the rotor in one axial direction of the motor shaft towards one of the first and second bearings which abuts against the corresponding first or second retaining projection. Therefore, the motor shaft and the first and second bearings are assembled in the motor assembly so as to be prevented from deviating in the axial direction of the motor shaft.

An eighth object of the invention is to provide the electric transaxle unit having the basic structure and a motor assembly serving as the electric motor, wherein components of the motor assembly in the casing, especially, its rotor and its armature winding, are effectively cooled.

To achieve the eighth object, in the electric transaxle unit having the basic structure, the casing is formed therein with a motor chamber, and the motor assembly is disposed in the motor chamber so as to drive the axle. The motor assembly includes a motor shaft having an axis and drivingly connected to the axle, a rotor having a magnet and fixed on the motor shaft, a stator having an armature winding and secured to the casing, and a support frame fixed to the stator so as to journal the motor shaft. The rotor and the armature winding are disposed in a space surrounded by the stator and the support frame fixed to the stator. The support frame fixed to the support plate has an opening through which the rotor and the armature winding are exposed to the motor chamber. Therefore, the rotor and the armature winding are effectively cooled by air or fluid in the motor chamber.

Preferably, the casing is constituted by joining a pair of casing halves to each other through a joint surface, and the support frame is fixed to one of the casing halves so as to secure the stator to the casing. Therefore, the stator can be simplified.

Preferably, the motor chamber is filled therein with fluid so as to serve as a fluid sump which can supply fluid to the rotor and the armature winding through the opening of the support frame. Therefore, the rotor and the armature can be effectively cooled. Preferably, the casing has fins on an outer surface corresponding to the motor chamber. Therefore, the motor assembly in the motor chamber can be effectively cooled.

These, further and other objects, features and advantages of the invention will appear more fully from the following description with reference to the attached drawings.

DETAILED DESCRIPTION OF THE INVENTION

An electric transaxle unit according to the invention is adaptable to a later-discussed riding lawn mower having a mid-mounted mower unit, a riding lawn mower having a front-mounted mower unit, a wheelchair, and various industrial vehicles such as a skid steering loader.

Figure 2:
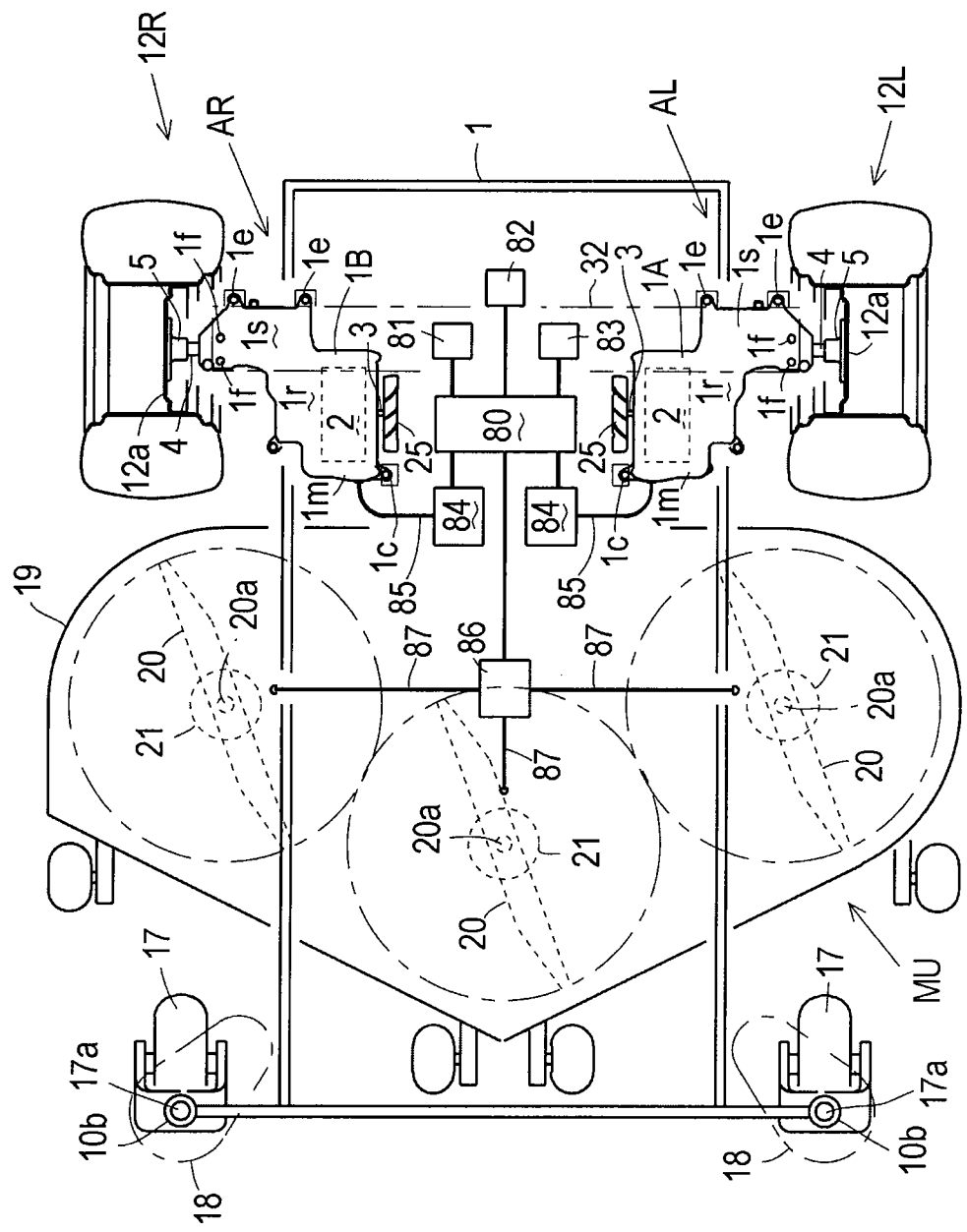
FIG. 2 is a sectional plan view of lawn mower 100.
Figure 3:
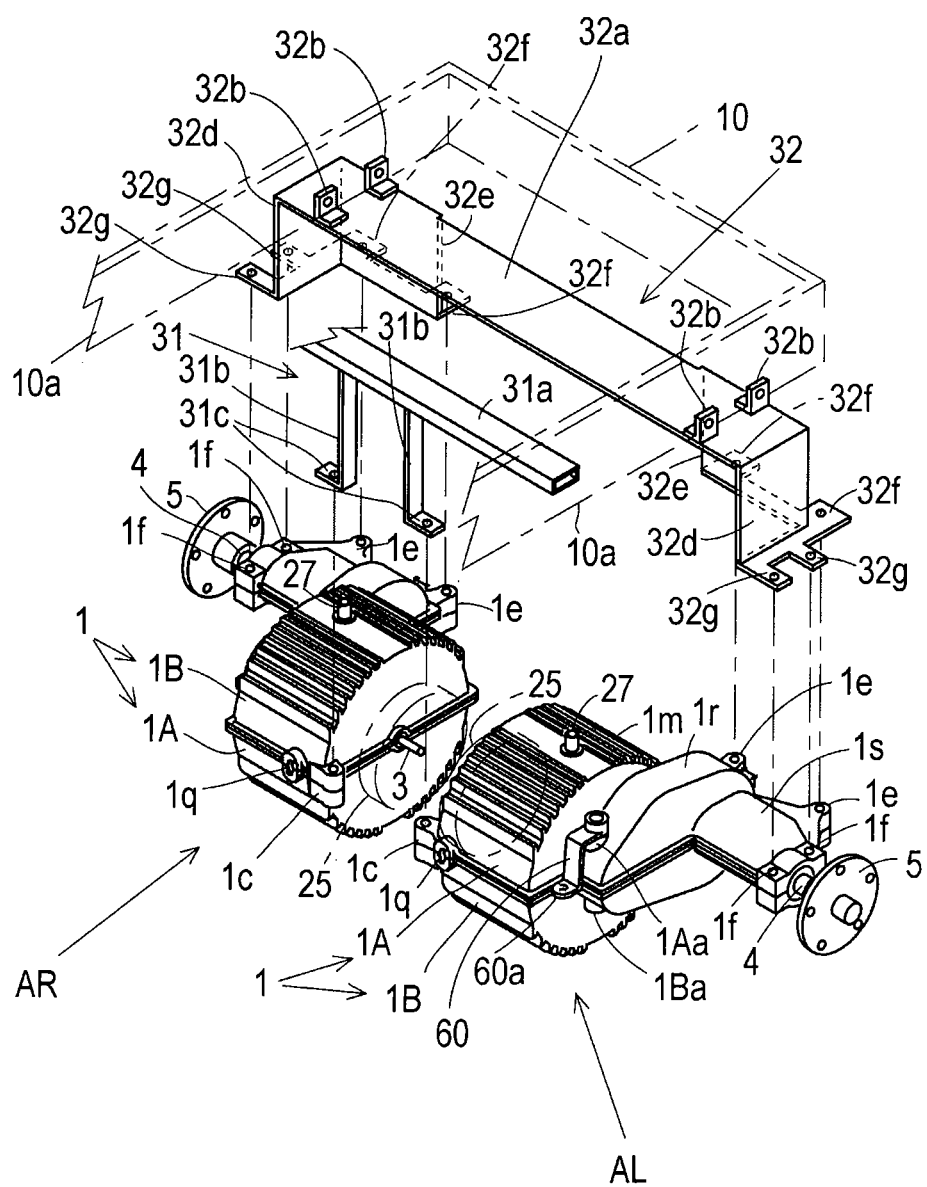
FIG. 3 is a perspective view of left and right electric transaxle units AL and AR while being attached to a vehicle body frame 10 of lawn mower 100.
Figure 4:
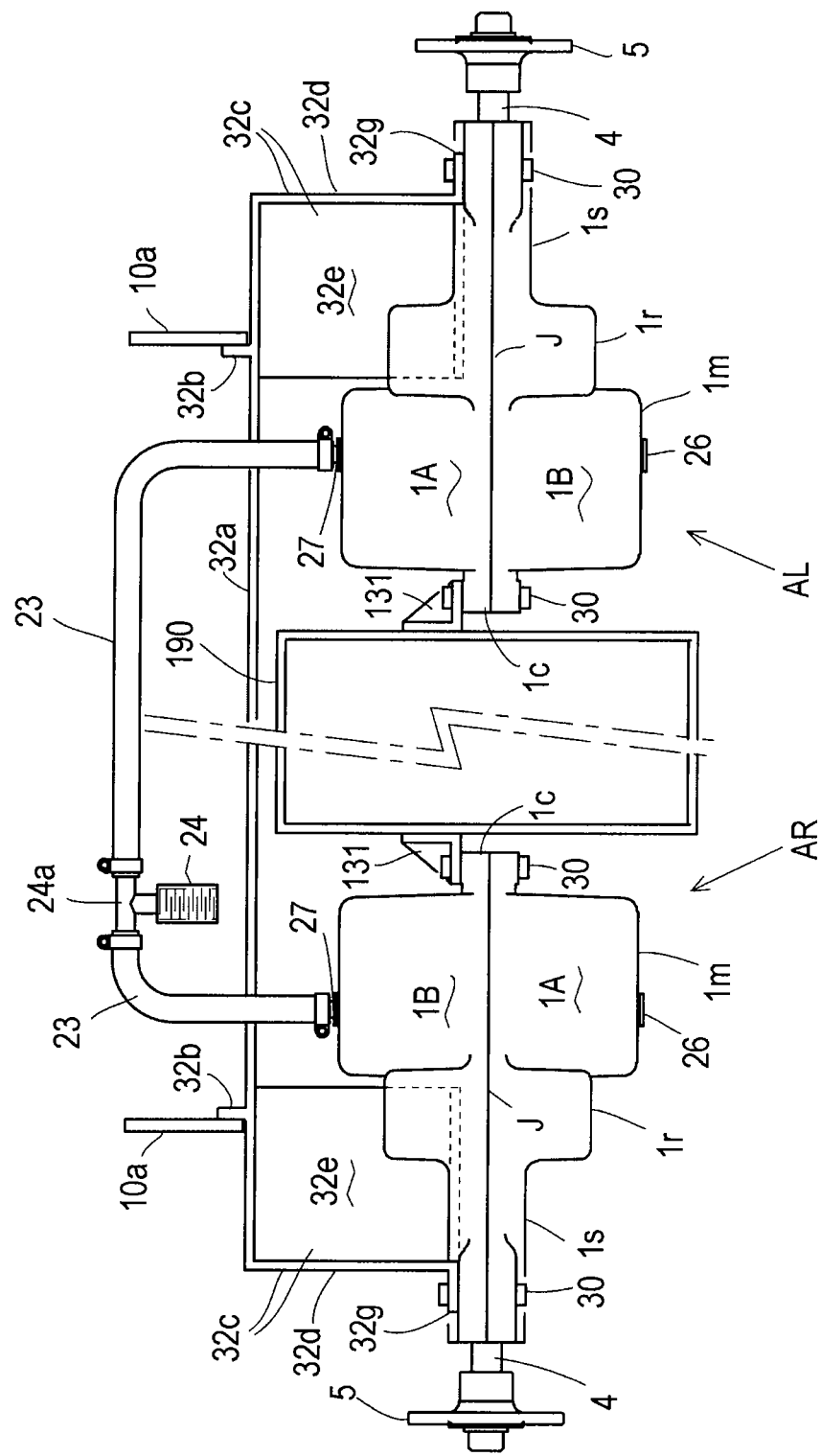
FIG. 4 is a schematic fragmentary sectional front view of lawn mower 100 equipped with a rear-discharge mower, showing its structure supporting left and right electric transaxle units AL and AR.

Referring to FIGS. 1 to 4, a structure of a riding lawn mower 100 serving as a vehicle equipped with electric transaxle units A (as a generic name of left and right electric transaxle units AL and AR) according to an embodiment of the present invention. In hereinafter descriptions, the forward traveling direction of lawn mower 100 will be referred to as "forward," and on this assumption, each of positions and directions will be referred to as front, rear, left, right, upper or lower. Further, FIG. 4 is based on an assumption that lawn mower 100 is provided with a mower unit adapted to discharge mowed grass in a different manner from that of a mower unit MU of lawn mower 100 shown in FIGS. 1 and 2, and has a structure supporting electric transaxle units A, the structure being different from that shown in FIG. 3. However, FIG. 4 will be used as a front view of left and right electric transaxle units AL and AR in lawn mower 100 shown in FIGS. 1 to 3.

Lawn mower 100 includes a vehicle body frame (chassis) 10. Left and right drive wheels 12 (as a generic name of left and right drive wheels 12L and 12R) serving as rear wheels are disposed on left and right outsides of a rear portion of vehicle body frame 10. In lawn mower 100, a pair of left and right electric transaxle units A for driving respective drive wheels 12 are disposed below the rear portion of vehicle body frame 10. If lawn mower 100 is provided with a front-mounted mower unit, rear wheels are casters or Ackerman and Junt type forcedly steered wheels as usual. In this case, a pair of left and right electric transaxle units A are disposed below a front portion of vehicle body frame 10 so as to drive front wheels.

Figure 6A:
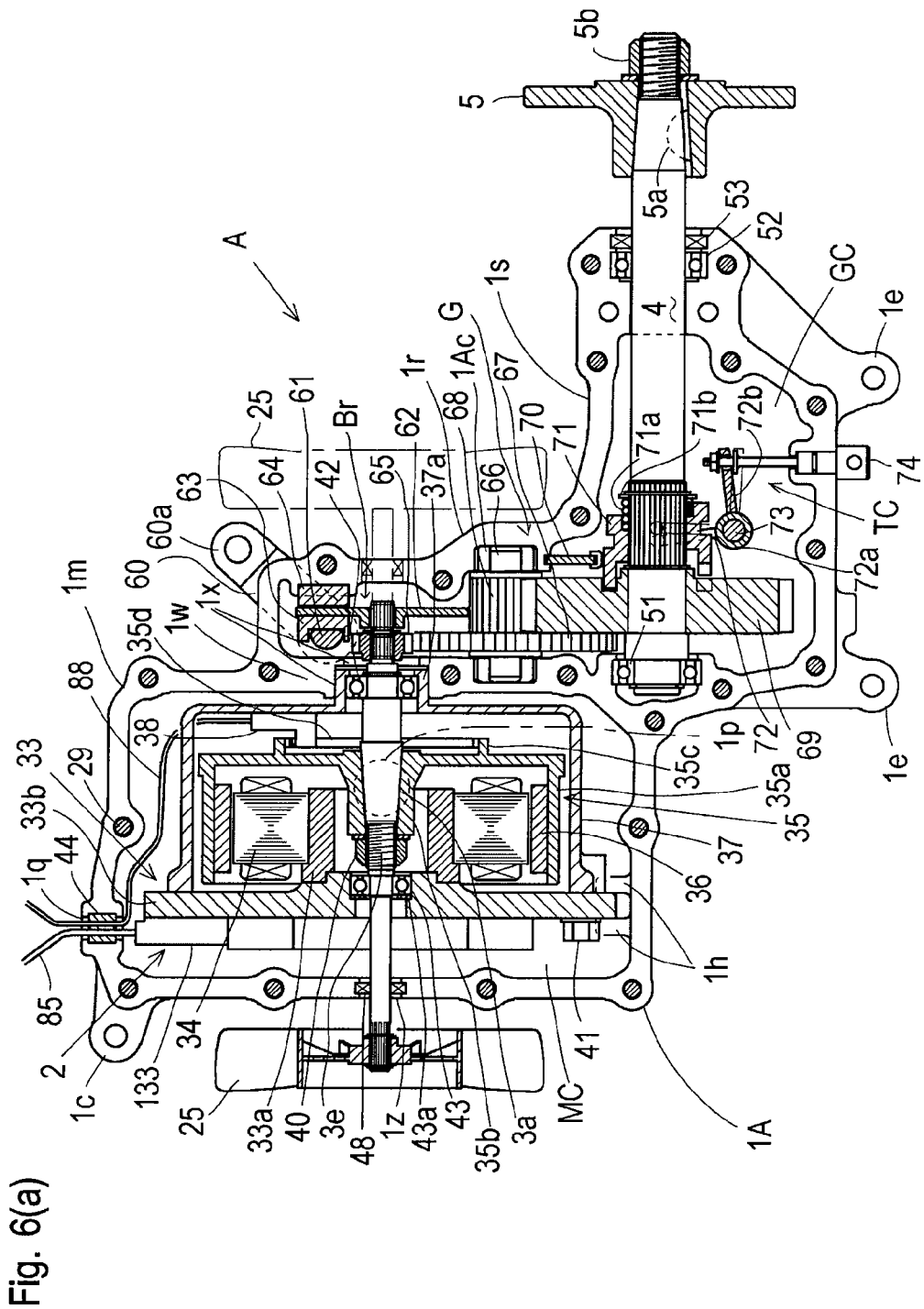
FIG. 6(a) is a sectional plan view of electric transaxle unit A having a casing 1 from which a casing half 1B has been removed, showing a remaining casing half 1A and inner and outer structures of casing half 1A.

Each electric transaxle unit A includes a casing 1 journaling an axle 4 serving as a central axial shaft of drive wheel 12. Casing 1 incorporates a motor assembly 2 serving as an electric motor for driving axle 4, a deceleration gear train G drivingly connecting motor assembly 2 to axle 4, and so on. A hub 5 of drive wheel 12 is fixed on a left or right distal end of axle 4. In this regard, as shown in FIG. 6(a), a key 5a is interposed between an inner peripheral portion of hub 5 and the distal end of axle 4, and hub 5 is fastened to axle 4 by a nut 5b so that hub 5 is fixed on axle 4.

In lawn mower 100, electric transaxle units AL and AR are disposed below respective left and right side plate portions 10a of vehicle body frame 10, so that casings 1 of respective electric transaxle units AL and AR are supported and fixed on vehicle body frame 10 in a later-discussed manner. The distal end of axle 4 projects outward from a right or left distal end of each casing 1 and is fitted to a rim 12a of drive wheel 12.

A driver's seat 13, a platform 14, a dashboard 11a and a bonnet 11 are supported on vehicle body frame 10. An accelerator pedal 15 is provided at a foot portion of dashboard 11a, and a steering wheel 16 is extended from an upper portion of dashboard 11a. The hereinafter description will be based on the assumption that lawn mower 100 is provided with steering wheel 16 serving as a steering operation device. Alternatively, a pair of left and right operation levers 160 for both traveling speed change and steering may be provided as drawn in phantom lines in FIG. 1. Each of the pair of operation levers 160 is provided with a device for converting the rotation degree and direction thereof operated by an operator into an electric signal. Alternatively, a joystick or a mouse serving as an input device of a computer may be provided.

Similar to operation of an accelerator pedal in a normal motorcar, accelerator pedal 15 is adapted to be depressed by an operator sitting on driver's seat 13 so that output rotary speeds of motor assemblies 2 of both left and right electric transaxle units AL and AR are increased or decreased according to the depression degree of accelerator pedal 15, so as to control simultaneous and even increase or decrease of speeds of left and right drive wheels 12L and 12R, thereby controlling the traveling speed of lawn mower 100. Similar to operation of a steering wheel in a normal motorcar, steering wheel 16 is adapted to be rotated by the operator sitting on driver's seat 13 so that the output rotary speeds of left and right electric transaxle units AL and AR are differentially controlled according to the rotational direction and degree of steering wheel 16, so as to differentially drive left and right drive wheels 12L and 12R, whereby lawn mower 100 turns left or right.

Further, lawn mower 100 is equipped with an unshown brake operation device (such as a pedal or lever) and an unshown forward/backward traveling direction switching operation device (such as a lever or a switch), serving as other operation devices to be operated by the operator sitting on driver's seat 13. The brake operation device is connected to a later-discussed brake arm 60. Alternatively, to switch the forward/backward traveling direction of lawn mower 100, for example, accelerator pedal 15 may be a seesaw-shaped pedal whose front end portion is adapted to be depressed for forward traveling, and whose rear end portion is adapted to be depressed for backward traveling. Alternatively, different accelerator pedals may be provided so that one is provided for forward traveling and the other is for backward traveling.

Front wheels 17 are supported by respective left and right ends of the front end portion of vehicle body frame 10. The front end portion of vehicle body frame 10 is formed on the left and right ends thereof with respective bosses 10b. A vertical pivot shaft 17a for horizontally rotating corresponding front wheel 17 is inserted into each of bosses 10b rotatably relative to vehicle body frame 10. Each pivot shaft 17a projects at a top thereof upward from corresponding boss 10b and is inserted into a front wheel steering box 18 incorporating a mechanical or electric front wheel steering system. The front wheel steering system controls rotations of left and right pivot shafts 17a based on the rotational degree of direction of steering wheel 16, thereby controlling the leftward or rightward directions of left and right front wheels 17. Alternatively, front wheels 17 may be casters.

Figure 1:
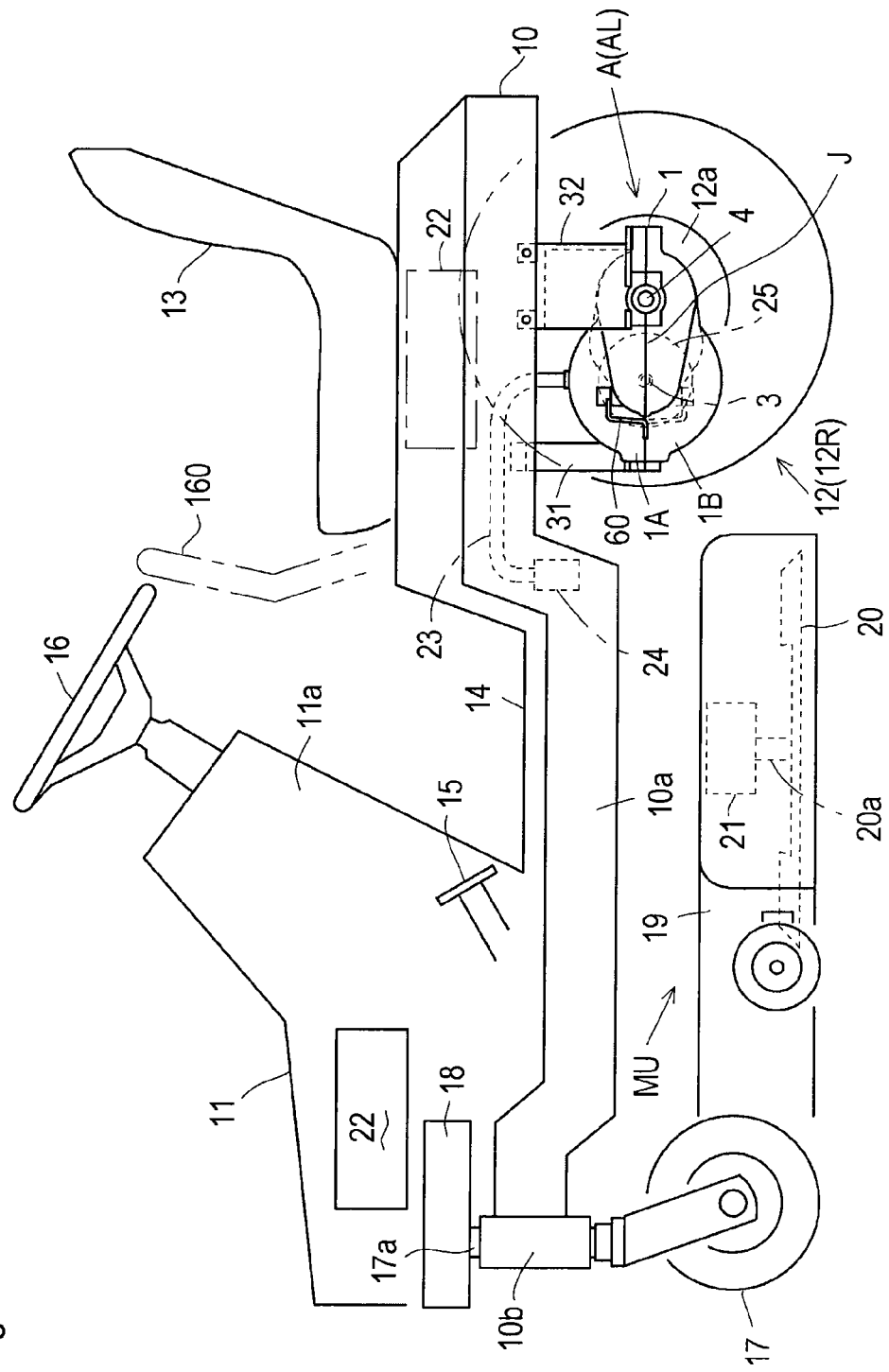
FIG. 1 is a schematic side view of a riding lawn mower 100 serving as an embodiment of a vehicle equipped with a pair of electric transaxle units A according to the invention, wherein electric transaxle units A are identical to each other, and serve as left and right electric transaxle units AL and AR for driving respective rear wheels 12 (as a generic name of left and right rear wheels 12L and 12R).

Lawn mower 100 is equipped with a mower unit MU in front of left and right electric transaxle units A, as shown in FIGS. 1 and 2. Here, description will now be given of mower unit MU including a mower deck 19, blades 20 and motor assemblies 21 with reference to FIGS. 1, 2 and 31. Mower deck 19 incorporates three blades 20, and is vertically movably supported below vehicle body frame 10 via a suspension link 19a such as show in FIG. 31. Each blade 20 has a vertical drive shaft 20a at a center axis thereof, and is provided on drive shaft 20a with a motor assembly 21 serving as an electric motor for controlling driving of corresponding blade 20. Lawn mower 100 is equipped with an unshown mower driving on/off setting operation device (such as a switch or a lever) for selecting either driving or non-driving of blades 20.

Figure 31:
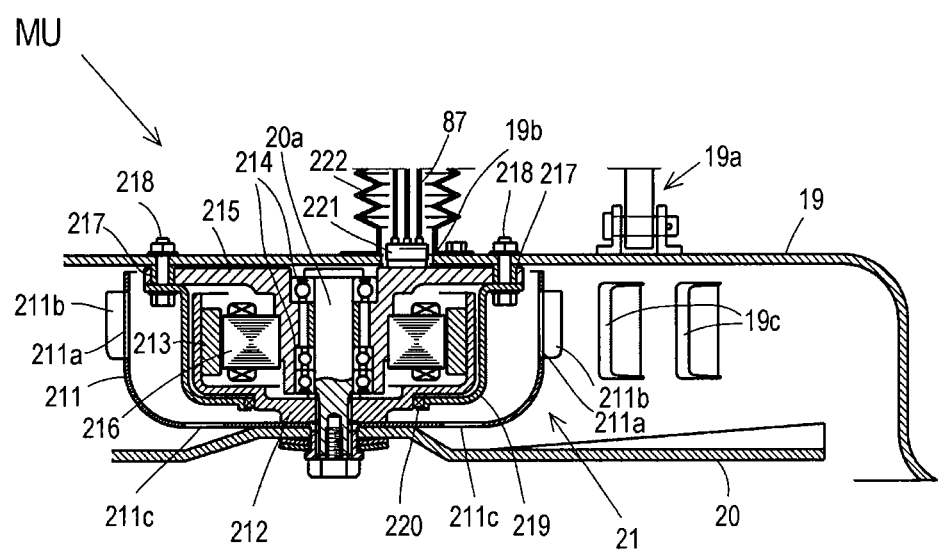
FIG. 31 is a cross sectional view of mower unit MU.

As shown in FIG. 31, motor assembly 21 includes a rotor 212 and a stator 215. Rotor 212 is fixed on drive shaft 20a rotatably integrally with drive shaft 20a. Stator 215 is fitted on drive shaft 20a via bearings 214 rotatably relative to drive shaft 20a. An upwardly opened cup-shaped rotor 212 is fixed onto drive shaft 20a at a center bottom portion thereof, and is extended vertically upward from the center bottom portion thereof so as to have permanent magnets 213 fixed on an inner peripheral surface thereof. Armature windings 216 are fixed onto an outer peripheral surface of a vertical core portion thereof fitted around drive shaft 20a via bearings 214 so as to face permanent magnets 213. In this way, motor assembly 21 is flattened to have a vertical axial length and a horizontal diametric width that is larger than the vertical axial length, and is disposed within mower deck 19, whereby a top portion of mower deck 19 is formed as a horizontal flat plate-shaped portion without an upper portion of motor assembly 21 projecting therefrom. Therefore, the limit position of mower unit MU when raised can be heightened without interfering with the vehicle body of lawn mower 100.

A top portion of stator 215 is expanded in a horizontal discoid shape, and is vibro-isolatedly secured to the horizontal top plate portion of mower deck 19 together with a rotor support frame 219 via vibro-isolating rubbers 217 and bolts-and-nuts 218. An opening 19b is opened in the horizontal discoid top portion of mower deck 19 so as to face a top surface of stator 212. A wire-collection box 221 is fixed on the top surface of stator 215 and is disposed in opening 19b, and a later-discussed harness 87 is extended upward from wire-collection box 221. A bellow 222 is extended upward from the horizontal top plate portion of mower deck 19 so as to cover opening 19b, wire-collection box 221 and harness 87.

Rotor support frame 219 is extended downward from a top portion thereof fastened to mower deck 19 via vibro-isolated rubbers 217 and bolts-and-nuts 218 so as to journal the bottom portion of rotor 212 via a bearing 220 at a bottom portion thereof. An upwardly opened cup-shaped protector 211 is fixed at a center bottom portion thereof onto drive shaft 20a between the center bottom portion of rotor 212 and the center portion of blade 20. In this way, stator 215 and rotor support frame 219 are secured to mower deck 19, and meanwhile, rotor 212, protector 211, blade 20 and drive shaft 20a are rotatable integrally with one another, and are rotatable relative to stator 215 and rotor support frame.

Mower deck 19 is formed with vent holes 19c in a vertical plate-shaped portion thereof so as to introduce the outside air thereinto. Protector 211 is formed with air suction holes 211a in a peripheral vertical plate-like portion thereof, with fan blades 211b projecting from respective air suction holes 211a, and with air discharge holes 211c in a horizontal bottom plate-like portion thereof. Therefore, protector 211 rotates together with blade 20 so as to introduce air into mower deck 19 via vent holes 19c, and thereinto via air suction holes 211a, to blow the air onto motor assembly 21, and to discharge the air outward therefrom via air discharge holes 211b. In FIG. 31, arrows define this flow of air. In this way, protector 211 protects mower assembly 21 from grass mowed by blade 20 as a main function thereof, and also serves as a cooling fan for motor assembly 21.

Mower unit MU illustrated in the present application is provided with three motor assemblies 21 provided on drive shafts 20a of respective triple blades 20. Alternatively, one of triple blades 20 may serve as a drive blade 20 provided with motor assembly 21 on drive shaft 20a thereof, and drive shafts 20a of the other two blades 20 may be drivingly connected to drive shaft 20a of drive blade 20 via a belt or the like.

Mower unit MU of lawn mower 100 shown in FIGS. 1 and 2 is a side-discharging mower unit which discharges grass mowed by blades 20 at one side of mower deck 19. Alternatively, if lawn mower 100 is equipped with a rear-discharging mower unit having a grass collection box disposed at a rear portion of the vehicle body, a duct 190 is extended rearward from mower deck 19 to the grass collection box so as to pass a space between left and right electric transaxle units AL and AR, as shown in FIG. 4.

A battery 22, such as a secondary battery or a fuel battery, is provided in bonnet 11 above vehicle body frame 10 so as to supply electric power to electric motor assemblies 2 of electric transaxle units AL and AR and to electric motor assemblies 21 for driving rotary blades 20. Battery 22 is preferably provided on a front upper portion of vehicle body frame 10 as drawn in solid lines in FIG. 1, so as to be balanced in weight with electric transaxle units A supported at the rear portion of vehicle body frame 10. Alternatively, battery 22 may be disposed above the rear portion of vehicle body frame 10 above electric transaxle units A, as drawn in phantom lines in FIG. 1.

An electric control system for motor assemblies 2 and 21 shown in FIG. 2 will be described. A controller 80 is disposed at a suitable position in lawn mower 100. A traveling speed setting device 81, a turn setting device 82 and a mower-driving on/off setting device 83 are electrically connected to an input interface of controller 80 so as to serve as input means for inputting respective operation signals to controller 80.

Traveling speed setting device 81 generates an electric signal corresponding to a depression degree of accelerator pedal 15, and transmits the electric signal to controller 80. An unshown traveling direction setting device receives a signal from the foresaid unshown forward/backward traveling direction switching device so as to select whether the electric signal corresponding to the depression degree of accelerator pedal 15 is made into a positive value or a negative value. Turn setting device 82 generates an electric signal corresponding to a rotation direction and degree of steering wheel 16 (or rotation directions and degrees of left and right operation levers 160) and transmits the electric signal to controller 80. Mower driving on/off setting device 83 generates an electric signal corresponding to the operation of the unshown mower driving on/off setting device selecting whether the mower unit (i.e., rotary blades 20) is driven or not, and transmits the electric signal to controller 80.

An output interface of controller 80 is connected to a pair of drivers 84 serving as control means for controlling respective motor assemblies 2 of left and right electric transaxle units AL and AR, and is connected to a driver 86 serving as a control means for uniformly controlling motor assemblies 21 of all blades 20. A harness 85 is extended from each driver 84 and is connected to motor assembly 2 of corresponding left or right electric transaxle unit A. Harnesses 87 are branched from driver 86 and are connected to respective motor assemblies 21.

In this regard, a unit having an inverter and a transmitter-receiver is referred to as the "driver." Controller 80 controls the respective inverters of drivers 84 and 86 in correspondence to the electric signals from aforesaid setting devices 81, 82 and 83. Each of drivers 84 and 86, having the inverter controlled, flows an electric current in a coil of corresponding motor assembly 2 or 21 via harness 85 or 87 connected to the motor assembly 2 or 21.

Figure 14:
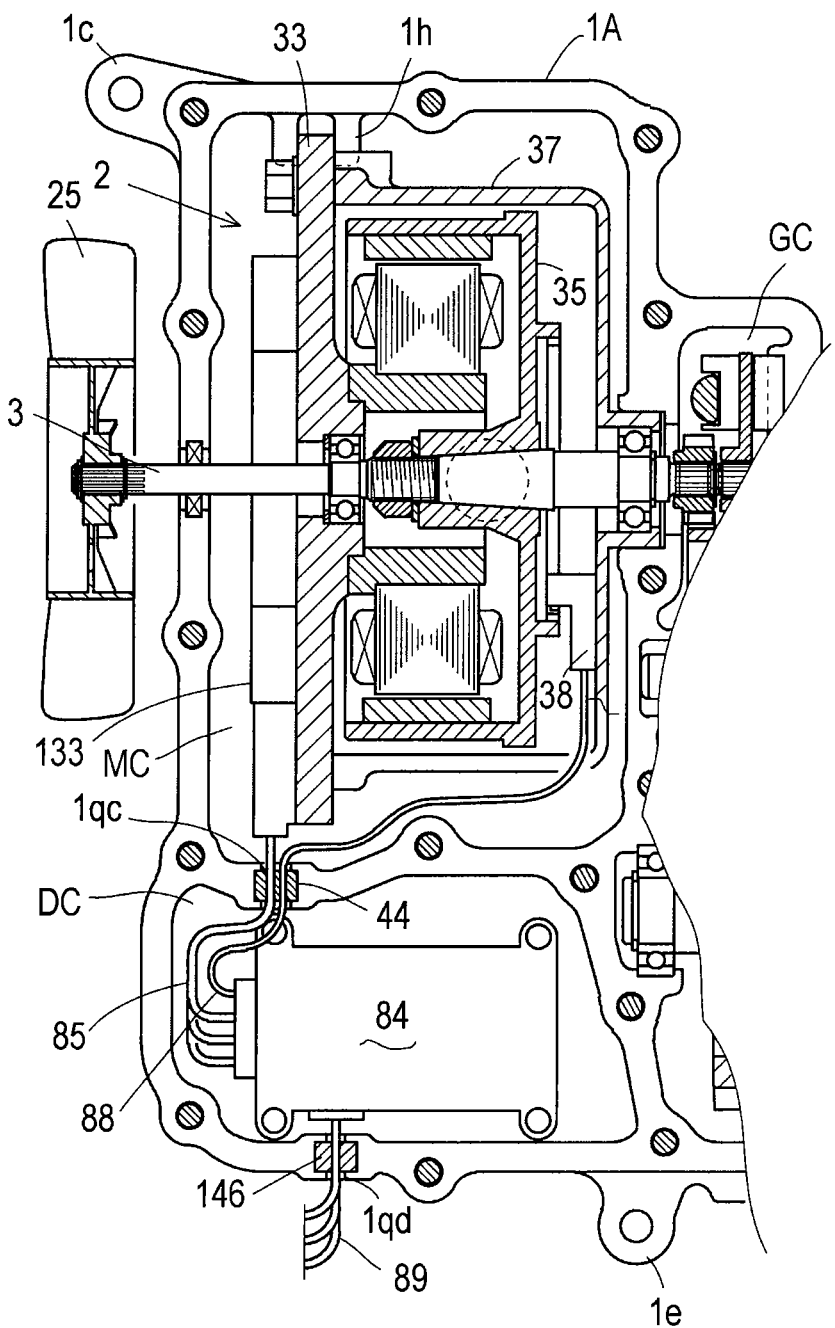
FIG. 14 is a fragmentary sectional plan view of electric transaxle unit A having casing 1 from which casing half 1B has been removed, showing remaining casing half 1A and inner and outer structures of casing half 1A, wherein a driver 84 is disposed in casing 1.

Incidentally, in FIG. 2, both drivers 84 for respective electric transaxle units A are disposed outside respective electric transaxle units A, and each harness 85 is interposed between corresponding driver 84 and corresponding casing 1. Alternatively, driver 84 may be disposed in casing 1 as in a later-discussed alternative embodiment (FIG. 14).

Motor assemblies 21 are provided with sensors (not shown) for detecting a resistance force against the rotary force of blade 20 or for detecting temperatures of motor assemblies 21, and controller 80 monitors a mowing load, i.e., resistance of mowed grass against blades 20, by use of the detection of the sensors. When controller 80 recognizes that the mowing load is excessive, controller 80 automatically controls motor assemblies 2 or the like so as to reduce the traveling speed of lawn mower 100, thereby reducing load on motor assemblies 21 and achieving a sufficient effect of mowing.

Further, controller 80 automatically controls motor assemblies 21 so as to electrically brake drive shafts 20a for an optional time after controller 80 receives an electric signal based on a manual operation of the mower driving on/off setting device for driving off mower unit MU, or receives an electric signal automatically issued when working mower unit MU needs braking of blades 20, such as when mower unit MU is raised or when lawn mower 100 is backed. Energies generated by braking motor assemblies 21 are regenerated as electric energies for driving motor assemblies 2 and 21.

Left and right electric transaxle units AL and AR are a pair of standardized electric transaxle units A (having common structures) arranged for driving respective left and right rear wheels 12L and 12R of lawn mower 100. To realize this arrangement, casing 1 of electric transaxle unit A is configured so as to be attached to vehicle body frame 10, and this configuration of casing 1 will be described.

As shown in FIG. 1 and others, casing 1 includes a pair of upper and lower casing halves 1A and 1B (serving as first and second divisional casing parts) having respective open surfaces. When casing 1 is mounted onto vehicle body frame 10, the respective open surfaces of its upper and lower casing halves 1A and 1B are disposed horizontally, and a portion of casing half 1A surrounding its open surface is fastened to a portion of casing half 1B surrounding its open surface by bolts 29 shown in FIGS. 6(a), 8 and 9.

Mutually joined casing halves 1A and 1B have the horizontal surface, serving as a joint surface J, therebetween. An axis of a motor shaft 3, serving as an output shaft of electric motor assembly 2, and an axis of an axle 4 are disposed parallel to each other (not coaxially to each other) and on joint surface J, so that motor shaft 3 and axle 4 are clamped between casing halves 1A and 1B rotatably relative to casing 1. Motor shaft 3 projects at one end portion thereof outward from casing 1 so as to be fixedly provided thereon with a cooling fan 25. In an embodiment shown in FIGS. 1 and 2, motor shaft 3 projects laterally proximally outward from casing 1 (i.e., toward the partner electric transaxle unit A), and cooling fan 25 is fixed on the projecting end portion of motor shaft 3. Alternatively, as discussed later, motor shaft 3 may project at another opposite end portion thereof outward from casing 1 so as to be fixedly provided thereon with cooling fan 25, or cooling fan 25 may be disposed in casing 1.

In lawn mower 100, electric transaxle units A are arranged so that their axles 4 are extended laterally distally outward from respective casings 1 and motor shafts 3 are extended laterally in front of axles 4. On an assumption of this arrangement of electric transaxle units A, casing halves 1A and 1B of each electric transaxle unit A are apparently shaped so as to have a shell-shaped motor housing portion 1m at their front end portions, to have a gear housing portion 1r extended rearward from a lateral distal end of motor housing portion 1m, and to have an axle housing portion is which is extended laterally distally from gear housing portion 1r so as to support axle 4 laterally horizontally.

In this embodiment, casing halves 1A and 1B are different from each other so that casing half 1A incorporates a counter shaft 66 of deceleration gear train G between motor shaft 3 and axle 4 and has a boss portion 1Aa supporting a brake shaft 61 so as to protrude one end portion of brake shaft 61 outward from boss portion 1Aa, while casing half 1B does not incorporate counter shaft 66 and has a boss portion 1Ba from which an end portion of brake shaft 61 does not project outward. Alternatively, counter shaft 66 may be supported to be disposed on joint surface J. Brake shaft 61 may be extended at both ends thereof outward from boss portion 1Aa or 1Ba.

Each electric transaxle unit A can be used for driving either left drive wheel 12L or right drive wheel 12R. In this way, electric transaxle unit A is standardized to reduce costs. When electric transaxle units A are adapted to lawn mower 100 shown in FIGS. 1-3, left electric transaxle unit AL is arranged so that its casing 1 has casing half 1A above casing half 1B, and right electric transaxle unit AR is arranged so that its casing 1 has casing half 1B above casing half 1A. In other words, one of right and left electric transaxle units AR and AL can be vertically inversed to serve as the partner left or right transaxle unit AL or AR.

As shown in FIGS. 1-3, vehicle body frame 10 is provided thereon with front and rear sub frames 31 and 32 for hanging both left and right electric transaxle units AL and AR. Sub frame 31 is fixed to vehicle body frame 10 by welding or the like. As discussed later, sub frame 32 is detachably attached to vehicle body frame 10. Both left and right electric transaxle units AL and AR are previously integrated with sub frame 32 so as to serve as a sub assembly to be detachably attached to vehicle body frame 10.

Front sub frame 31 is formed integrally with a cross bar 31a, a pair of left and right stays 31b and tabs 31c. Cross bar 31a is laterally horizontally extended and spanned between both side plate portions 10a. The pair of left and right stays 31b are extended vertically downward from cross bar 31a. Each stay 31b is bent at a bottom end thereof laterally distally so as to form each horizontal tab 31c having a bolt hole. Left and right stays 31b have respective vertical lengths equal to each other, so that left and right tabs 31c are disposed at respective heights equal to each other. Preferably, left and right tabs 31c are located at respective positions coinciding to each other in the fore-and-aft direction, and have their respective lateral positions so that a lateral distance of left tab 31c from a left distal end of cross bar 31a is equal to a lateral distance of right tab 31c from a right distal end of cross bar 31a. In other words, in sub frame 31, the pair of left and right stays 31b and the pair of left and right tabs 31c are formed laterally symmetrically.

Rear sub frame 32 is formed integrally with a horizontal plate portion 32a and a pair of left and right vertical plate portions 32c. Horizontal plate portion 32a has a length such as to cross left and right side plate portions 10a, and are disposed beneath left and right side plate portions 10a of vehicle body frame 10. A pair of front and rear tabs 32b having respective bolt holes project upward from a top surface of each of left and right portions of horizontal plate portion 32a. Tabs 32b are fastened to side plate portions 10a of vehicle body frame 10 by bolts so as to fix sub frame 32 to vehicle body frame 10.

Each of left and right vertical plate portions 32c is a plate bent in L-shape when viewed in plan, so as to have a fore-and-aft extended vertical side plate portion 32d and have a laterally extended vertical rear plate portion 32e. Vertical side plate portion 32d is extended vertically downward from each of the left and right portions of horizontal plate portion 32a. Vertical rear plate portion 32e is extended vertically downward from a rear end of each of the left and right portions of horizontal plate portion 32a. Each of left and right vertical side plate portions 32c is bent in L-shape at a bottom thereof so as to form a pair of front and rear tabs 32g extended laterally distally outward from vertical side plate portion 32d and to form a pair of left and right tabs 32f extended rearward from vertical rear plate portion 32e. Each of tabs 32f and 32g is provided therein with a bolt hole. When horizontal plate portion 32a is disposed horizontally, all tabs 32f and 32g are leveled at the same height. When sub frame 32 is viewed in plan, tabs 32f and 32g on the left portion of sub frame 32 and tabs 32f and 32g on the right portion of sub frame 32 are arranged laterally symmetrically.

As shown in FIG. 3 and others, casing 1 of each electric transaxle unit A is formed with a boss 1c extended horizontally and laterally proximately from a lateral proximal front end portion of motor housing portion 1m so that boss 1c contacts each tab 30c at a top surface thereof. Further, casing 1 is formed with bosses 1e extended horizontally rearward from a rear end portion of gear housing portion 1r and a rear end portion of axle housing portion 1s. Further, axle housing portion 1s of each casing 1 is formed with bosses 1f on respective front and rear portions of a lateral distal end portion thereof from which axle 4 projects outward.

Left and right electric transaxle units AL and AR are fixedly hung from sub frame 32 by fastening the upside facing horizontal surfaces of bosses 1e and 1f of respective casings 1, serving as mount seat surfaces of respective casings 1 (serving as attachment portions of respective casings 1 to be attached to vehicle body frame 10), to tabs 32f and 32g of sub frame 32 with respective bolts and nuts 30. Therefore, sub frame 32 and left and right electric transaxle units AL and AR serve as a sub assembly. To mount this sub assembly onto vehicle body frame 10, tabs 32b of sub frame 32 are fastened to left and right side plate portions 10a of vehicle body frame 10 by bolts. Further, the upside horizontal surfaces of bosses 1c of respective electric transaxle units AL and AR are provided as mount seat surfaces and are fastened to tabs 31c of sub frame 31 by respective bolts and nuts 30.

In this way, left and right electric transaxle units AL and AR are mounted onto vehicle body frame 10 so that each of electric transaxle units AL and AR is arranged to have its motor housing portion 1m on the lateral proximal side of corresponding side plate portion 10a, to have its axle housing portion 1s projecting laterally distally outward from corresponding side plate portion 10a, and to have respective axles 4 disposed on a horizontal coaxial line extended in the lateral direction of lawn mower 100, thereby being line-symmetric when viewed in plan with respect to a fore-and-aft centerline of lawn mower 100 at the lateral center of lawn mower 100.

Alternatively, as shown in FIG. 4, if duct 190 is extended rearward from a rear-discharging mower deck 19 and across casings 1 of left and right electric transaxle units AL and AR, sub frames 131 are fixed on respective left and right side surfaces of duct 190, and bosses 1c of respective electric transaxle units AL and AR are fastened to respective sub frames 131 by respective bolts and nuts 30.

Figure 5:
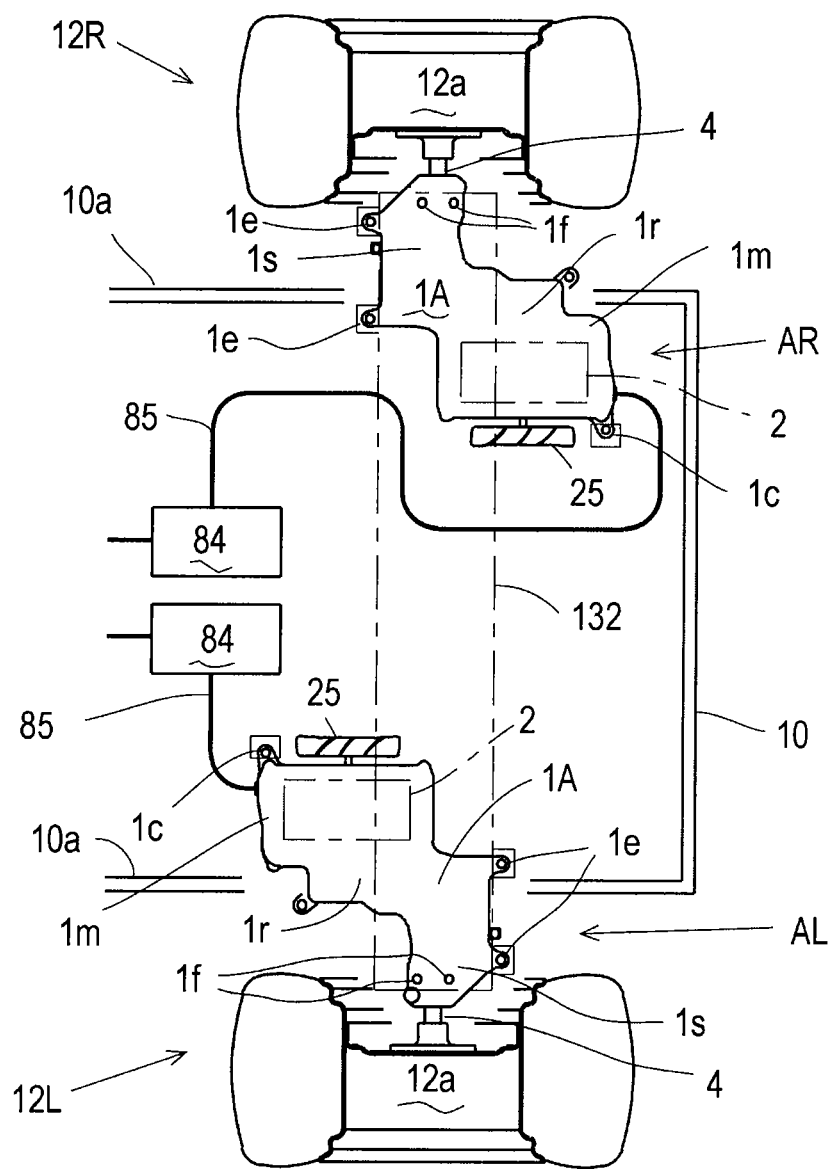
FIG. 5 is a plan view of lawn mower 100 equipped with the pair of electric transaxle units A that are identical to each other, wherein the pair of electric transaxle units A serve as left and right electric transaxle units AL and AR are point-symmetric with respect to a laterally central point of the vehicle body.

Alternatively, electric transaxle units A may be disposed to have axles 4 in front of motor assemblies 2 and motor shafts 3 so as to correspond to a design of lawn mower 100. For example, as shown in FIG. 5, left and right electric transaxle units AL and AR are the pair of identical electric transaxle units A, which are not vertically inversed with respect to each other but are fore-and-aft inversed with respect to each other (so that both casings 1 have respective casing halves 1A above respective casing halves 1B in this embodiment), and which are supported by vehicle body frame 10 so as to be point-symmetric with respect to a lateral center point of the vehicle body between units AL and AR when viewed in plan. The lateral center point of the vehicle body is disposed on a coaxial line of axles 4 between left and right axles 4 disposed coaxially to each other. In this embodiment, left electric transaxle unit AL is disposed so as to have axle 4 rearward of motor assembly 2, and right electric transaxle unit AR is disposed so as to have axle 4 forward of motor assembly 2.

To correspond to the point-symmetric arrangement of left and right electric transaxle units AL and AR, a sub frame 132 corresponding to sub frame 32 is formed on left and right portions thereof with tabs to be fitted to bosses 1e and 1f, and the tabs of sub frame 132 are point-symmetric with respect to the point on the lateral center of the vehicle body when viewed in plan. Further, a stay is fixed to vehicle body frame 10 forward of sub frame 132 and is fitted to boss 1c of left electric transaxle unit AL disposed forward of sub frame 132, and another stay is fixed to vehicle body frame 10 rearward of sub frame 132 and is fitted to boss 1c of right electric transaxle unit AR disposed rearward of sub frame 132.

Figure 7:
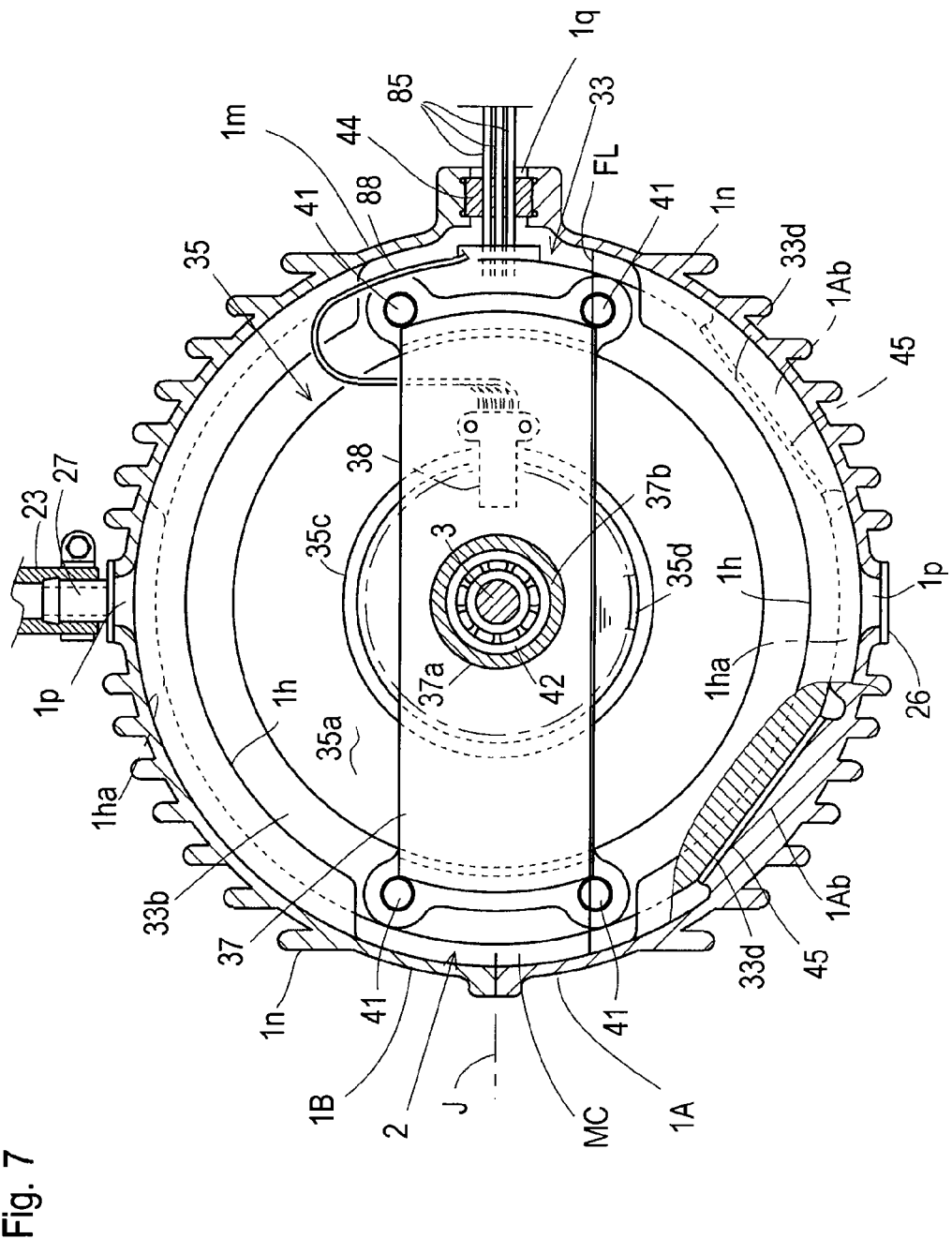
FIG. 7 is a sectional rear view of electric transaxle unit A when motor assembly 2 and motor shaft 3 in a motor chamber MC in casing 1 are viewed from a gear chamber GC side.
Figure 8:
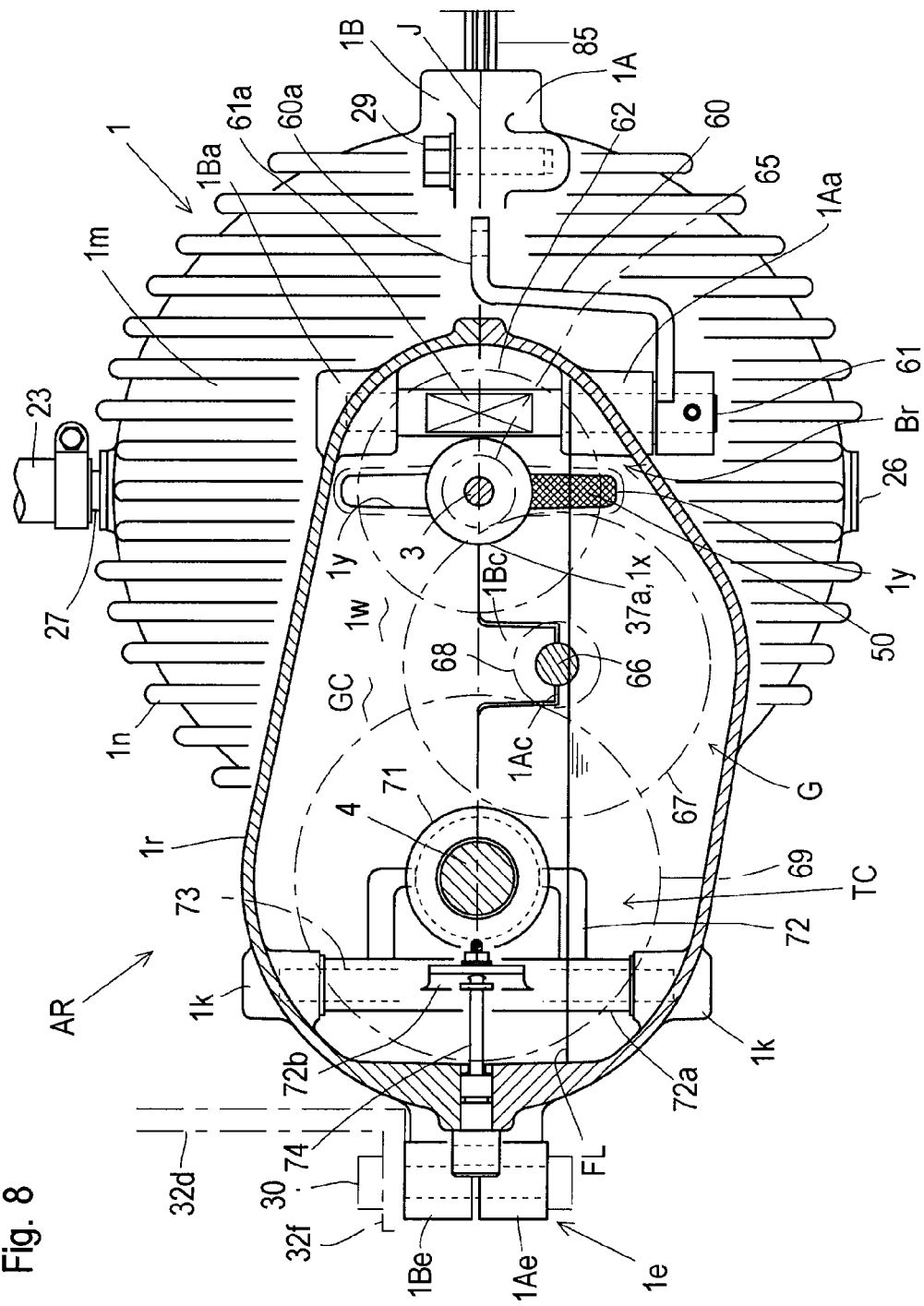
FIG. 8 is a right side view partly in section of right electric transaxle unit AR on an assumption that left and right electric transaxle units AL and AR are equipped on lawn mower 100 in the way shown in FIGS. 1 to 3.

A structure of casing 1 of each electric transaxle unit A shown in FIGS. 6-9 will be described. On each casing 1, bosses 1c, 1e and 1f are formed by matching respective boss halves extended from casing half 1A with respective boss halves extended from casing half 1B. Representative boss 1e shown in FIGS. 7 and 8 will be described for describing the forming of bosses 1c, 1d and 1f. A boss half 1Ae is extended rearward from a rear end of casing half 1A, a boss half 1Be is extended rearward from a rear end of casing half 1B, and boss halves 1Ae and 1Be are matched with each other so as to be formed as boss 1e. As shown in FIG. 7, in right electric transaxle unit AR, a bottom surface of boss half 1Ae (serving as a first attachment portion of the first divisional casing part) serves as a bottom surface of boss 1e, and a top surface of boss half 1Be (serving as a second attachment portion of the second divisional casing part) serves as the mount seat surface (serving as the attachment of casing 1). As shown in FIG. 8, in left electric transaxle unit AL, a bottom surface of boss half 1Be serves as a bottom surface of boss 1e, and a top surface of boss half 1Ae serves as the mount seat surface.

Here, a vertical distance of the mount seat surface of boss half 1Ae from the axis of axle 4 is equal to a vertical distance of the mount seat surface of boss half 1Be from the axis of axle 4. Accordingly, the top surface of boss 1e (i.e., the mount seat surface of boss half 1Be) of left electric transaxle unit AL is as high as the top surface of boss 1e (i.e., the mount seat surface of boss half 1Ae) of right electric transaxle unit AR. Incidentally, in this embodiment, joint surface J is disposed on the axis of axle 4, so that boss halves 1Be and 1Ae are equal to each other in their vertical thickness. In other words, left and right electric transaxle units AL and AR are arranged to have the respective mount seat surfaces at equal heights from respective axles 4, and are arranged line-symmetrically in lawn mower 100 as mentioned above, thereby realizing the location of axles 4 serving as center axes of respective left and right drive wheels 12L and 12R on the horizontal coaxial line, i.e., at equal heights in lawn mower 100.

Due to the above structure of casing 1 constituted by joining casing halves 1A and 1B to each other, electric transaxle units A identical to each other can be paired so that one unit A corresponds to the other unit A that is vertically inversed, thereby serving as left and right electric transaxle units AL and AR to be mounted onto vehicle body frame 10 of lawn mower 100.

Figure 9:
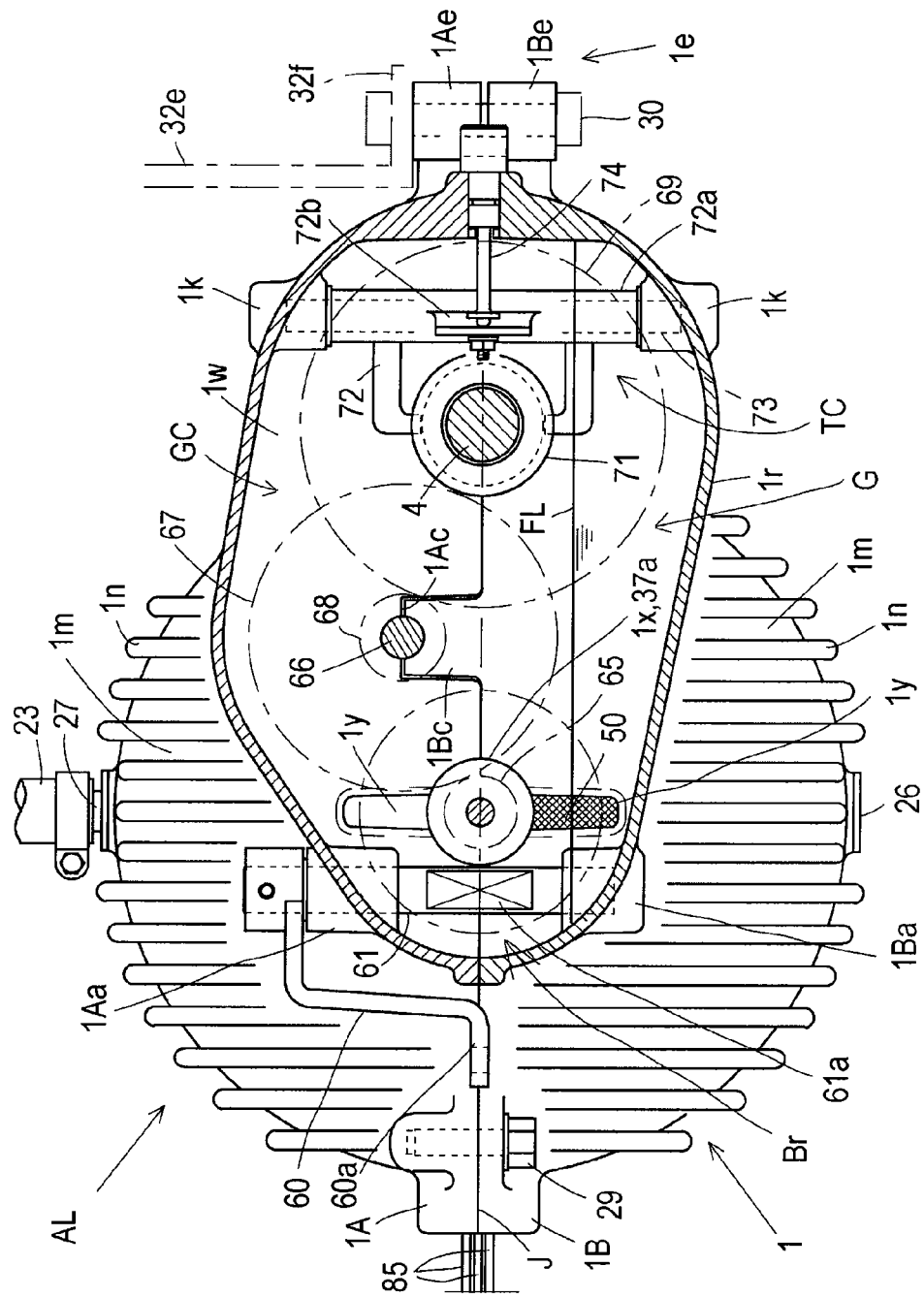
FIG. 9 is a left side view partly in section of left electric transaxle unit AL on the assumption that left and right electric transaxle units AL and AR are equipped on lawn mower 100 in the way shown in FIGS. 1 to 3.

As mentioned above, each electric transaxle unit A supports vertical brake shaft 61 rotatably and slidably in boss 1Aa of casing half 1A thereof. Boss 1Aa of left electric transaxle unit A, serving as an arm-projection portion from which a brake arm is extended outward, is disposed below joint surface J, and boss 1Aa of right electric transaxle unit A is disposed above joint surface J. However, brake arm 60 provided on an outer end of brake shaft 61 is cranked as shown in FIGS. 1, 8 and 9, so that an operable (front) end 60a of brake arm 60, serving as an end to be connected to a link member, e.g., a wire or a rod, connected to a braking operation device of lawn mower 100, e.g., a parking lever, is disposed at a height of the axis of axle 4, i.e., joint surface J. Therefore, both a left link member connected to operable end 60a of brake arm 60 of left electric transaxle unit AL and a right link member connected to operable end 60a of brake arm 60 of right electric transaxle unit AR can be disposed at the same height, thereby rationalizing the manufacturing of lawn mower 100.

Alternatively, brake arm 60 may be connected to an active portion of each of let and right electric actuators pivotally supported onto vehicle body frame 10 or the like, instead of the above-mentioned mechanical link, such as a wire or a rod. In this case, each of brake arms 60 is constantly biased toward its braking position (not shown in FIG. 6(a)) by a spring or the like. The braking operation device of lawn mower 100 is provided for electrically controlling the electric actuators. When motor shaft 3 is not rotated, or when the braking operation device is operated for braking, brake arms 60 of left and right axle transaxle units AL and AR are retained at their respective braking positions by the springs. When motor shaft 3 is rotated, or when the braking operation device is operated for unbraking, the left and right electric actuators receive a command signal so as to simultaneously actuate to rotate respective brake arms 60 to respective unbraking positions as shown in FIG. 6(a) against the springs. Therefore, when lawn mower 100 is parked on a slope, for instance, left and right axles 4 are automatically braked so as to prevent lawn mower 100 from freewheeling, i.e., to prevent drive wheels 12L and 12R from unexpectedly rotating.

As shown in FIG. 3 and others, in each of left and right transaxle units AL and AR, casing halves 1A and 1B are bored with respective ports 1p, which are identical to each other in shape, in opposite top and bottom portions of motor housing portion 1m. Port 1p in the top portion of motor housing portion 1m is opened upward so as to serve as a breather port. Port 1p in the bottom portion of motor housing portion 1m is opened downward so as to serve as a drain port. A pipe joint 27 is fitted into port 1p serving as the breather port (see FIG. 7 and the like) so as to project upward from port 1p. A breather tube 23 connected to a labyrinth box 24 is extended from pipe joint 27, as shown in FIG. 1. Labyrinth box 24 is mounted at a position in vehicle body frame 10 so as to be prevented from receiving mud or other foreign materials. Both electric transaxle units AL and AR may be provided with respective labyrinth boxes 24, or with single common labyrinth box 24 as shown in FIG. 4. In the embodiment shown in FIG. 4, labyrinth box 24 is fixed to a part of the vehicle body and is connected to a bifurcated pipe joint 24a having left and right coupling ends, to which respective breather tubes 23 extended from left and right electric transaxle units AL and AR are connected.

The drain port is normally closed by a later-discussed detachable lid 26, so that later-discussed fluid is stored in a lower portion of motor housing portion 1m. Lid 26 is detached when the fluid is exchanged. When a volume of the fluid stored in motor housing portion 1m is increased or reduced because of heat of electric motor assembly 2, a volume of air stored in an upper portion of motor housing portion 1m is reduced or increased due to breather tube 23. Labyrinth box 24 absorbs fluid from the air discharged outward from casing 1. Instead of breather tube 23 and labyrinth box 24, an accumulator may be attached to the breather port so as to accumulate the change of volume of the stored air.

A concrete interior structure of electric transaxle unit A will now be described with reference to FIGS. 6-18. The inside space of casing 1 constituted by joining casing halves 1A and 1B to each other is divided into a motor chamber MC and a gear chamber GC by a partition wall 1w. Motor chamber MC is formed in motor housing portion 1m, and gear chamber GC is formed to range in gear housing portion 1r and axle housing portion 1s. Motor chamber MC incorporates motor assembly 2 and motor shaft 3 serving as the center shaft of motor assembly 2. Gear chamber GC incorporates an output end portion of motor shaft 3, axle 4, and deceleration gear train G interposed between motor shaft 3 and axle 4.

In gear chamber GC, fluid for lubricating gears is stored in gear chamber GC so as to serve as a fluid sump occupying an approximate quarter of the volume of gear chamber GC, for example. In each of FIGS. 8 and 9, a mark "FL" designates a level of fluid surface of the fluid sump in gear chamber GC. If motor chamber MC is a dry chamber, motor shaft 3 is fluid-tight against partition wall 1w so as to prevent the fluid in gear chamber GC from leaking to enter motor chamber MC. If motor chamber MC is a wet chamber, a later-discussed connection hole 1y is formed in partition wall 1w so as to allow fluid to pass therethrough between chambers MC and GC so that fluid which is the same as that stored in gear chamber GC is stored in motor chamber MC. In this case, a filter 50 is provided in connection hole 1y so as to filter the fluid before entering motor chamber MC. In FIG. 7, a mark "FL" designates a level of fluid surface of a fluid sump in motor chamber MC. This fluid absorbs heat generated from motor assembly 2 so as to keep a high efficiency in driving motor assembly 2. As shown in FIGS. 8, 9 and others, fins 1n are formed on an outer side surface of motor housing portion 1m so as to efficiently radiate heat of the fluid via casing 1.

Electric motor assembly 2 includes a stator 33, armature windings 34, a rotor 35, permanent magnets 36 and a motor shaft support frame 37. Stator 33 includes a horizontally axial and cylindrical stator core 33a disposed coaxially to motor shaft 3, and includes a discoid stator plate 33b fixed to an axial end of stator core 33a. Armature windings 34 are fixed onto an outer peripheral surface of stator core 33a. Rotor 35 is formed with a cup-shaped portion 35a opened toward stator plate 33b so as to surround stator core 33a and armature windings 34 on stator core 33a, and is formed with a central boss portion 35b fixed onto motor shaft 3 and surrounded by an inner peripheral surface of stator core 33a. Permanent magnets 36 are fixed on an inner peripheral surface of cup-shaped portion 35a of rotor 35 so as to face armature windings 34.

Motor shaft support frame 37 is shaped in an arch having a size such as to stride rotor 35, and is fixed to a vertical side surface of stator plate 33b, so as to journal motor shaft 3. When viewed in plan, i.e., perpendicular to the axial direction of motor shaft 3, as shown in FIG. 6(a), armature windings 34 on stator core 33a and the whole of rotor 35 including permanent magnets 36 are disposed in a space surrounded by stator plate 33b and arched support frame 37. When viewed in rear, i.e., in the axial direction of motor shaft 3, as shown in FIG. 7, support frame 37 has a horizontal top surface and a horizontal bottom surface, so that cup-shaped portion 35a of rotor 35 projects upward from the top surface of support frame 37 and downward from the bottom surface of support frame 37 so as to be exposed to motor chamber MC. Further, as shown in FIG. 6(a), cup-shaped portion 35a of rotor 35 is opened at an axial end thereof toward stator plate 33b so as to expose permanent magnets 36 and armature windings 34 in the inside of cup-shaped portion 35a of rotor 35 to motor chamber MC. In other words, support frame 37 has upward and downward openings so as to expose rotor 35 and armature windings 34 to motor chamber MC through the openings of support frame 37. When motor chamber MC is filled with fluid so as to serve as a wet chamber, the fluid can be effectively supplied to rotor 35 and armature windings 34 so as to effectively cool them. When motor chamber MC is a dry chamber and its inside air is cooled by the outside air due to fins 1n, the cooling effect of air in motor chamber MC affects rotor 35 and armature windings 34.

Further, electric motor assembly 2 is a brush-less motor provided with a rotation angle detector 38 on the inside of motor shaft support frame 37. A rotary encoder, a hole sensor or a resolver serves as the rotation angle detector. If the hole sensor is used, an annular convex 35c is formed on an axial end vertical side surface of cup-shaped portion 35a of rotor 35 axially opposite to stator plate 33b so as to project toward partition wall 1w around motor shaft 3, and an annular detected member 35d is fixed to an inner peripheral surface of annular convex 35c. Rotation angle detector 38 searches a rotational position of detected member 35d so as to detect a position of a certain one of permanent magnets 36, and transmits a detection signal to controller 80. In correspondence with the current position of detected rotating magnet 36, controller 80 switches directions of magnetic forces from armature windings 34 (or directions of currents in armature windings 34) so as to rotate rotor 35. Alternatively, a rotary sensor may be used to correspond to a type of the motor, as discussed later. Anyway, the signal received by these sensors is also used for detecting traveling speed of the vehicle and is transmitted to controller 80 as a feedback.

Besides the described permanent magnet type motor (e.g., a surface permanent magnet synchronous motor or an interior permanent magnet synchronous motor), an induction type motor and a switched reluctance motor are adaptable. Further, in this embodiment, the illustrated motor is an outer rotor type motor structured to have a radial gap. Alternatively, it may be an inner rotor type motor, or a motor structured to have an axial gap.

Processes of assembling motor assembly 2 and motor shaft 3 and processes of assembling the assembly of motor assembly 2 and motor shaft 3 into casing 1 will be described with reference to FIGS. 6-10 and with reference to other various embodiments shown in other drawings.

Motor shaft 3 is fitted at outer peripheral surfaces thereof to inner peripheral surfaces of respective bearings 42 and 43, bearing 42 is fitted at an outer peripheral surface thereof to an inner peripheral surface of central boss portion 37a of motor shaft support frame 37, and bearing 43 is fitted at an outer peripheral surface thereof to an inner peripheral surface of a center portion of stator plate 33b, so that motor shaft 3 is journalled by motor shaft support frame 37 and stator plate 33b via respective bearings 42 and 43. The assembling of motor shaft 3 to rotor 35 will be described in association with assembling of motor shaft 3 to stator 33 and motor shaft support frame 37 via bearings 42 and 43.

Figure 6B:
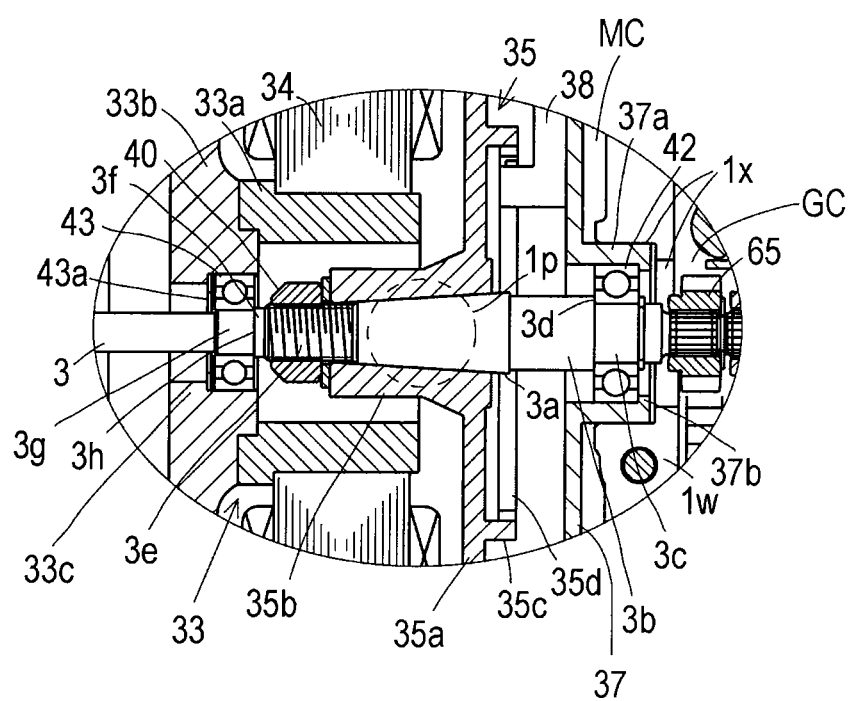
FIG. 6(b) is an enlarged view of a principal portion of FIG. 6(a) showing surroundings around a motor shaft 3 in a motor assembly 2 serving as an electric motor for driving an axle 4.

As shown in FIG. 6(b), an axial end portion of central boss portion 37a of motor shaft support frame 37 axially opposite to rotor 35 is extended radially toward motor shaft 3 so as to form a retaining projection 37b, which is adapted to abut against a side surface of bearing 42 facing gear chamber GC directly or via a gap-filing member, such as a shim or a washer, so as to prevent bearing 42 from further moving away from bearing 43. On the other hand, an axial end portion of a wall of stator plate 33b surrounding bearing 43 is extended radially toward motor shaft 3 so as to form a retaining projection 33d, which is adapted to abut against a side surface of bearing 43 axially opposite to rotor 35 directly or via a gap-filling member, such as shim or a washer, so as to prevent bearing 43 from further moving away from bearing 42.

Further, as shown in FIG. 6(b), an axial intermediate portion of motor shaft 3 is formed as a tapered shaft portion 3a whose outer peripheral surface is tapered so as to have a diameter which increases as it goes toward bearing 42. Central boss portion 35b of rotor 35 has an inner peripheral surface tapered so as to have a diameter which increases as it goes toward bearing 42 in correspondence to tapered shaft portion 3a. Motor shaft 3 is formed with a shaft portion 3b, having a constant diameter, extended from one axial end of tapered shaft portion 3a toward bearing 42, and is formed with a shaft portion 3c further extended from shaft portion 3b so as to be fitted into bearing 42. Shaft portion 3c is diametrically smaller than shaft portion 3b, so as to form a step 3d on motor shaft 3 between shaft portions 3b and 3c. Motor shaft 3 is formed with a threaded portion 3e extended from the other axial end of tapered shaft portion 3a away from bearing 42, is formed with a shaft portion 3f, having a constant diameter, extended from threaded portion 3e toward bearing 43, and is formed with a shaft portion 3g further extended from shaft portion 3f so as to be fitted into bearing 43. Shaft portion 3g is diametrically smaller than shaft portion 3f so as to form a step 3h on motor shaft 3 between shaft portions 3f and 3g. Threaded portion 3e and shaft portions 3f and 3g are diametrically smaller than the minimum diametric end of tapered shaft portion 3a, i.e., the minimum diametric end of the tapered boss hole of central boss portion 35b of rotor 35, thereby being allowed to pass through the tapered boss hole.

Processes of assembling motor assembly 2 will be described. First, shaft portion 3c of motor shaft 3 is inserted into bearing 42 fitted in motor shaft support frame 37. Then, rotor 35 with permanent magnets 36 is moved axially toward bearing 42 relative to motor shaft 3, so as to pass shaft portions 3g and 3f and threaded portion 3e through the tapered boss hole of central boss portion 35b of rotor 35 until the tapered inner peripheral surface of central boss portion 35b is pressed against the tapered outer peripheral surface of tapered shaft portion 3a of motor shaft 3. Accordingly, motor shaft 3 is pressed against bearing 42, so that step 3d abuts against the side surface of bearing 42 toward rotor 35 so as to prevent bearing 42 from axially moving toward bearing 43, and retaining projection 37b abuts against the side surface of bearing 42 toward gear chamber GC so as to prevent bearing 42 from axially moving away from bearing 43. In this way, bearing 42 is firmly clamped by step 3d and retaining projection 37b so as to be prevented from moving in axial opposite directions. Therefore, rotor 35, motor shaft 3, bearing 42 and motor shaft support frame 37 are firmly assembled in an assembly without loosening or deviation causing noise.

Stator 33 is previously constituted by joining or assembling stator core 33a, stator plate 33b, armature windings 34, bearing 43 and gap-filling member 43a before stator 33 is assembled to the assembly of rotor 35, motor shaft 3, bearing 42 and motor shaft support frame 37. A washer or washers, or a shim or shims serves/serve as gap-filling member 43a filled between retaining projection 33d and bearing 43 fitted in the bearing hole of stator plate 33b. Then, stator 33 is axially moved toward bearing 42 relative to motor shaft 3 so as to fittingly pass shaft portion 3g of motor shaft 3 through bearing 43 until stator plate 33b abuts against front and rear end portions of motor shaft support frame 37 toward stator plate 33b, thereby locating stator 33. At this time, a vertical flat surface of step 3h of motor shaft 3 abuts against the side surface of bearing 43 toward rotor 35 so as to locate bearing 43 in the axial direction of motor shaft 3. The width of gap-filling member 43a in the axial direction of motor shaft 3 is determined to correspond to the width of the gap between bearing 43 and retaining projection 33d at this time. If the width of gap-filling member 43a is shorter than the width of the gap between bearing 43 and retaining projection 33d in the state that stator plate 33b abuts against motor shaft support frame 37, stator 33 is moved away from rotor 35 and motor shaft support frame 37 and is removed from motor shaft 3, and gap-filling member 43a is adjusted to increase its width (if a shim or shims serves/serve as gap-filling member 43a, the number of shims is increased), and then, stator 33 is moved as mentioned above again so that stator plate 33b abuts against motor shaft support frame 37 again. On the contrary, if bearing 43 abuts against the vertical flat surface of step 3h before stator plate 33b abuts against motor shaft support frame 37, it means that the width of gap-filling member 43a is too large. In this case, stator 33 is removed from motor shaft 3 and gap-filling member is adjusted to reduce its width (if shims serve as gap-filling member 43a, the number of shims is reduced), and then, stator 33 is moved again to make stator plate 33b abut against motor shaft support frame 37. After stator plate 33b with gap-filling member 43a having the optimized width abuts against the front and rear end portions of motor shaft support frame 37, stator plate 33b is fastened to the front and rear end portions of motor shaft support frame 37 by bolts 41, as shown in FIG. 7, thereby completing the assembling of motor assembly 2. Therefore, gap-filling member 43a is clamped between retaining projection 33d and bearing 43, and step 33h abuts against bearing 43, so that bearing 43 is prevented from moving in opposite axial directions toward bearing 42 and away from bearing 42, thereby preventing noise caused by this axial movement of bearing 43.

Motor shaft 3 is further extended outward from bearing 43 in stator plate 33b so as to be fixedly provided on an end portion thereof with cooling fan 25. In FIG. 5, the length of motor shaft 3 is set to arrange this end portion of motor shaft 3 outside of casing 1 after the assembling of electric motor assembly 2 into casing 1. Alternatively, an output end portion of motor shaft 3 extended from bearing 42 axially opposite to stator 33 may be further extended to penetrate gear chamber GC so as to be fixedly provided thereon with cooling fan 25 as drawn in phantom lines in FIG. 6(a).

Figure 10:
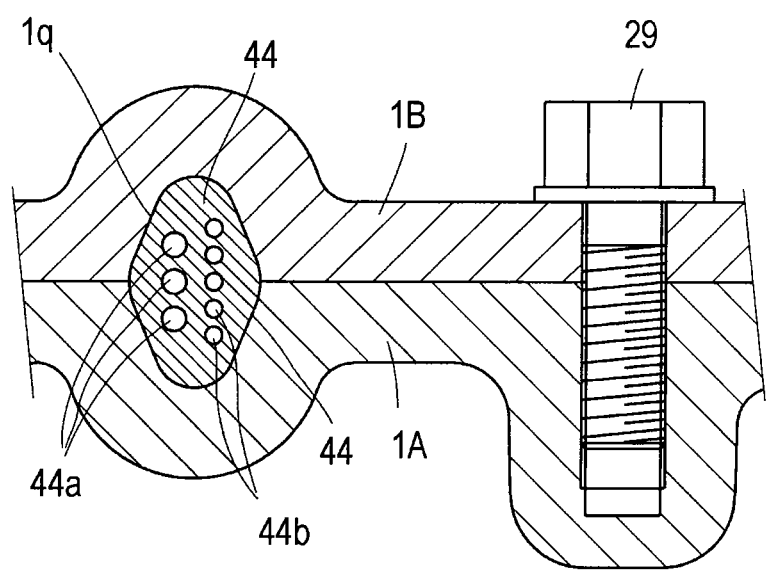
FIG. 10 is a fragmentary sectional view of electric transaxle unit A showing a rubber plug 44 for wiring a harness, rubber plug 44 being clamped between casing halves 1A and 1B.

A wire-gathering box 133 is attached on a surface of stator 33 so as to gather wires extended from respective armature windings 34, and harness 85 extended from driver 84 is connected to wire-gathering box 133. Further, a sensor harness 88 is extended from driver 84 and is connected to rotation angle detector 38. As shown in FIG. 10, a sectionally rhombic plug 44 (serving as a wire-passage member through which electric wires are passed) is formed with penetrating holes 44a, and wires of harness 85 are passed through respective penetrating holes 44a.

Here, casing halves 1A and 1B are now assumed to be joined to each other through joint surface J. When viewed in the axial direction of penetrating holes 44a, plug 44 clamped between joined casing halves 1A and 1B has its maximum width at a vertical center portion extended on joint surface J, which corresponds to a diagonal of the rhombic shape of plug 44. An upper half of plug 44 is extended upward from the vertical center portion thereof into one of casing halves 1A and 1B perpendicularly to joint surface J, and a lower half of plug 44 is extended downward from the vertical center portion thereof into the other of casing halves 1A and 1B perpendicularly to joint surface J. A width of each of the upper and lower halves of plug 44 along joint surface J is reduced as it goes away from joint surface J.

Electric motor assembly 2 having been assembled as mentioned above is installed into casing half 1A which is placed so as to have its open surface corresponding to joint surface J at the top thereof, and various other members are installed into the half of gear chamber GC in casing half 1A. Then, casing half 1B is put on casing half 1A and is joined and fastened to casing half 1A by bolts 29, thereby completing electric transaxle unit A.

In motor housing portion 1m of casing 1 of electric transaxle unit A structured as shown in FIGS. 6 and 7, each of casing halves 1A and 1B is formed on and along an inner peripheral surface thereof with a clamp portion 1h, which is arcuate when viewed in the axial direction of motor shaft 3. Each clamp portion 1h has a pair of left and right projections projecting toward the axis of motor shaft 3, and has a groove between the projections. The groove has a width which is equal to a thickness of stator plate 33b corresponding to the gap between the projections. When viewed in the axial direction of motor shaft 3, the arcuate shape of clamp portion 1h is disposed on a circle centered on the axis of stator plate 33b and having a larger diameter than that of stator plate 33b.

In the grooves of respective clamp portions 1h, respective fitting portions 1ha are formed and project at an inner upper end of motor housing portion 1m and at an inner lower end of motor housing portion 1m, so as to be arcuate when viewed in the axial direction of motor shaft 3. Further, in the groove of clamp portion 1h of casing half 1A, detent portions 1Ab are formed at front and rear sides of fitting portion 1ha so as to resist rotation of motor assembly 2. Each detent portion 1Ab has a flat surface which appears as a chord when viewed in the axial direction of motor shaft 3 and faces an outer peripheral surface of stator plate 33b. An elastic pad 45 is stuck to the flat surface of each detent portion 1Ab so as to absorb vibration. On the other hand, the outer peripheral surface of stator plate 33b is cut off to form a pair of front and rear flat surfaces 33c corresponding to the respective flat surfaces of detent portions 1Ab. Similar detent portions may also be formed in the groove of clamp portion 1h of casing half 1B, and stator plate 33b may be further formed with cut-off flat surfaces corresponding to these detent portions.

Regarding electric transaxle unit A shown in FIGS. 6 and 7, to install electric motor assembly 2 into casing half 1A which is placed to have its open surface corresponding to joint surface J at the top thereof, first, stator plate 33b is inserted at an outer peripheral edge of a lower half portion thereof into the groove of clamp portion 1h of casing half 1A, and is fitted at an outer peripheral surface of a bottom end portion thereof to fitting portion 1ha in the groove of clamp portion 1h, and then, cut-off flat surfaces 33c of stator plate 33b are put onto pads 45 on respective detent portions 1Ab. In this way, stator plate 33b is fixed to casing half 1A. On the other hand, a lower half portion of an outer peripheral surface of central boss portion 37a of motor shaft support frame 37 is fitted into a half-cut retaining hole 1x of casing half 1A, thereby placing the axis of motor shaft 3 on joint surface J. In this state, casing half 1B is put on casing half 1A.

Figure 11:
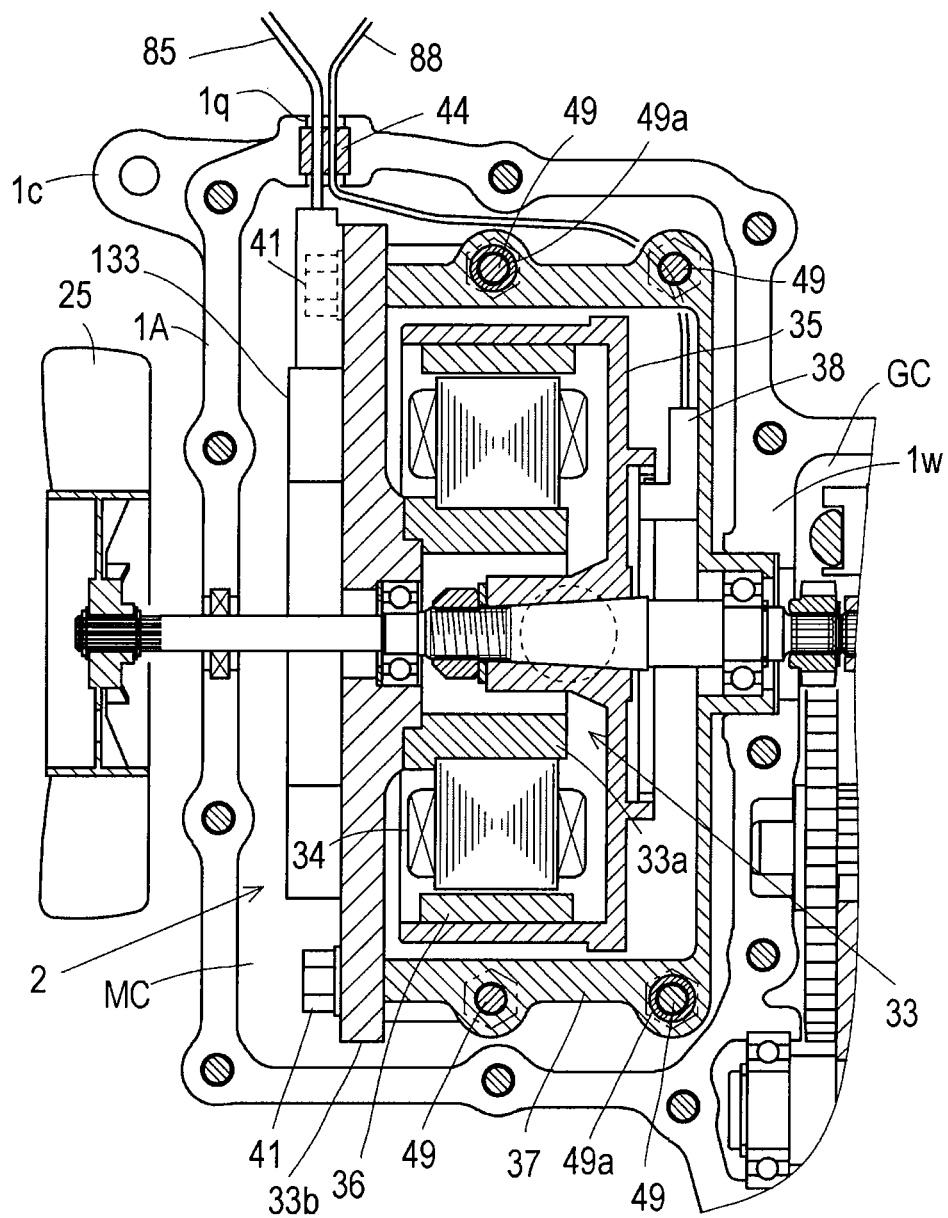
FIG. 11 is a fragmentary sectional plan view of electric transaxle unit A having casing 1 from which casing half 1B has been removed, showing remaining casing half 1A and inner and outer structures of casing half 1A, wherein motor assembly 2 is installed into motor chamber MC by fastening a motor shaft support frame 37 to casing half 1A.
Figure 12:
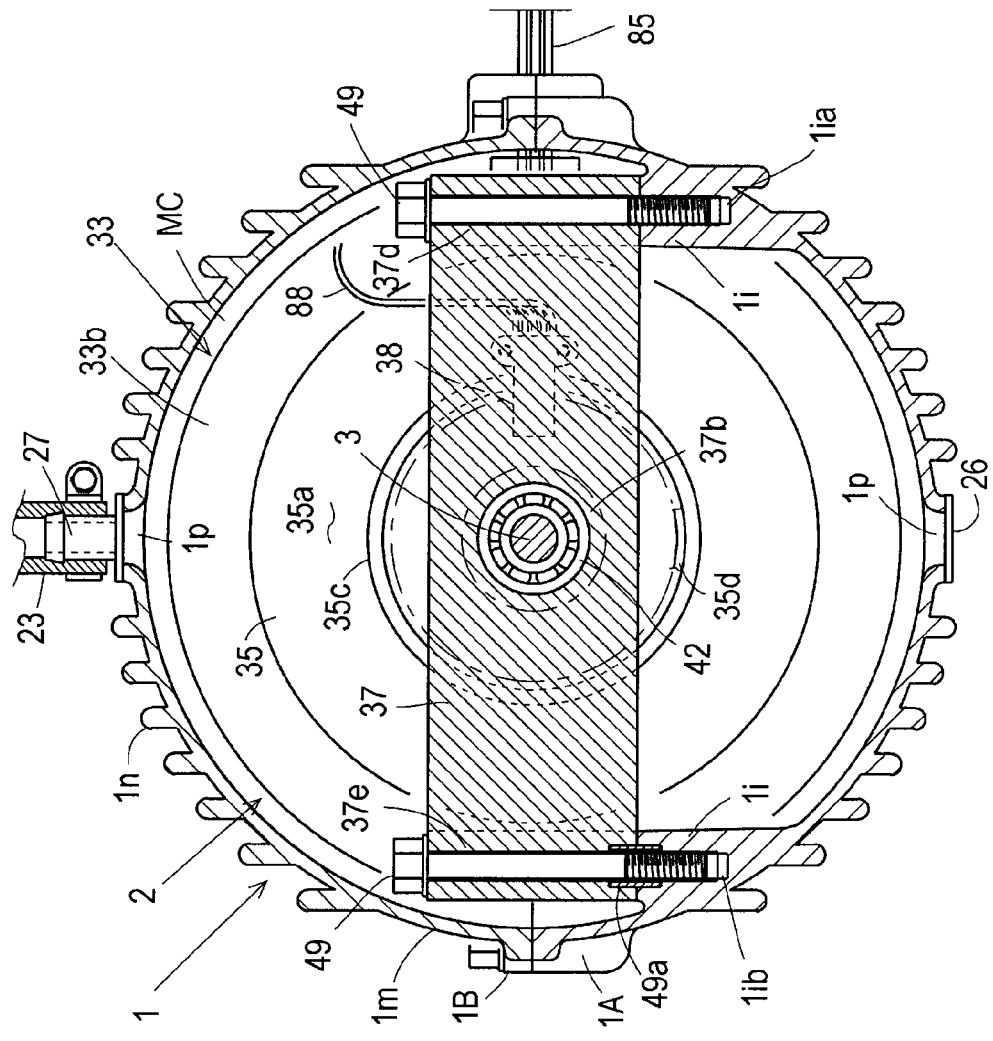
FIG. 12 is a sectional rear view of electric transaxle unit A having the structure shown in FIG. 12 when a motor assembly 2 and a motor shaft 3 in a motor chamber MC in casing 1 are viewed from a gear chamber GC side.

Alternatively, regarding electric transaxle unit A shown in FIGS. 11 and 12, to install electric motor assembly 2 into casing half 1A which is placed to have its open surface corresponding to joint surface J at the top thereof, motor shaft support frame 37 is fastened to casing half 1A by bolts 49. More specifically, motor shaft support frame 37 has front and rear foot portions whose top and bottom surfaces are horizontal, i.e., extended parallel to joint surface J, and the front and rear foot portions of motor shaft support frame 37 are extended toward stator plate 33b. A pair of left and right bolt holes 37d and 37e are extended vertically, i.e., perpendicular to joint surface J, and penetrate each of the front and rear foot portions of motor shaft support frame 37. Bolt hole 37d has a constant diameter in the whole axial length thereof, and the diameter is substantially the same as a diameter of bolt 49. Bolt hole 37e is shaped so as to correspond to a bolt hole, which has the same diameter as that of bolt hole 37d and is radially expanded at an end portion thereof disposed in casing half 1A. The expanded end portion of bolt hole 37e serves as a dowel hole into which a doweling sleeve 49a is fitted. Casing half 1A is formed with a pair of vertically projecting front and rear bosses 1i in motor housing portion 1m and on an inner wall thereof facing motor chamber MC, so as to correspond to positions of the respective bolt holes in motor shaft support frame 37. Each boss 1i is formed therein with a pair of left and right threaded holes 1ia and 1ib extended vertically to correspond to respective bolt holes 37d and 37e in motor shaft support frame 37. Threaded hole 1ia is a normal threaded hole having a constant diameter in the whole vertical length thereof. Threaded hole 1ib is a threaded hole radially expanded at an open end portion thereof so as to have a dowel hole into which doweling sleeve 49a is fitted.

Before the installation of electric motor assembly 2 into casing half 1A which is placed to have the open surface corresponding to joint surface J at the top thereof, doweling sleeves (or dowels) 49a are fitted into the respective dowel holes of threaded holes 1ib in respective front and rear bosses 1i and project at upper portions thereof upward from top surfaces of respective bosses 1i. The upward projecting portions of doweling sleeves 49a are fitted into the dowel holes of respective bolt holes 37e in motor shaft support frame 37, and the front and rear foot portions of motor shaft support frame 37 are located by being put onto respective bosses 1i, dowel holes of bolt holes 37e. Then, bolts 49 are inserted into respective bolt holes 37d and 37e in motor shaft support frame 37, and are screwed into respective threaded holes 1ia and 1ib in bosses 1i, thereby fastening stator plate 33b to casing half 1A via motor shaft support frame 37. The lower half portion of the outer peripheral surface of central boss portion 37a of motor shaft support frame 37 is fitted into retaining hole 1x of casing half 1A, similar to that in the embodiment of FIG. 5. Accordingly, the axis of motor shaft 3 is disposed on joint surface J, and in this state, casing half 1B is put on casing half 1A.

In casing 1 of electric transaxle unit A having either the structure shown in FIGS. 6(a) and 7 or the structure shown in FIGS. 11 and 12, retaining hole 1x for fixing the position of motor shaft support frame 37 is formed in partition wall 1w between motor chamber MC and gear chamber GC. Partition wall 1w and retaining hole 1x are divided into halves in respective casing halves 1A and 1B by joint surface J.

An extended portion of motor shaft 3 extended outward from central boss portion 37a of motor shaft support frame 37 and is passed through retaining hole 1x so as to be disposed in gear chamber GC. A motor output gear 65 and a brake rotor 62 are fixed onto an output end portion of motor shaft 3 by spline-fitting. Motor output gear 65 and brake rotor 62 are fixed on the output end portion of motor shaft 3 before the installation of electric motor assembly 2 into casing half 1A.

As shown in representative FIG. 6(a), a shaft hole 1z penetrates a portion of casing 1 on joint surface J between motor chamber MC and the outside of casing 1. Joint surface J divides shaft hole 1z into halves between casing halves 1A and 1B. A fluid seal 48 is fitted on a portion of motor shaft 3 penetrating shaft hole 1z. Cooling fan 25 is fixed on an end portion of motor shaft 3 projecting outward from fluid seal 48.

Figure 13:
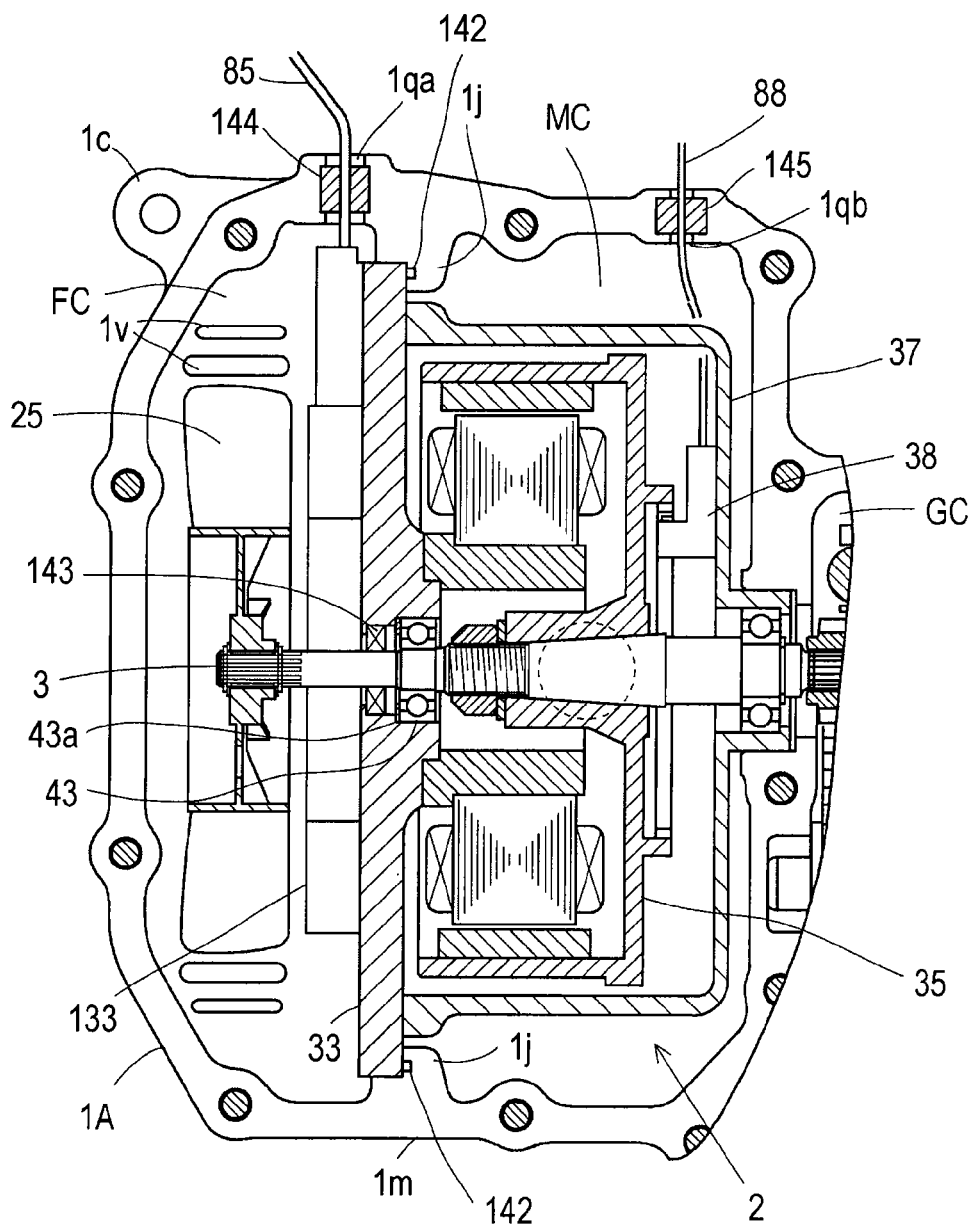
FIG. 13 is a fragmentary sectional plan view of electric transaxle unit A having casing 1 from which casing half 1B has been removed, showing remaining casing half 1A and inner and outer structures of casing half 1A, wherein a cooling fan 25 is disposed in casing 1.

For an alternative embodiment arrangement of a cooling fan, cooling fan 25 may be disposed in motor housing portion 1m of casing 1 as shown in FIG. 13. More specifically, a cooling chamber FC is formed in motor housing portion 1m, and cooling fan 25 is disposed in cooling chamber FC. A plurality of vent holes 1v are formed in an outer wall of motor housing portion 1m of casing 1 forming cooling chamber FC so as to exhaust air from cooling chamber FC or to introduce an outside air into cooling chamber FC. Incidentally, vent holes 1v may be covered with a filter for preventing mowed grass from entering cooling chamber FC in consideration of the situation that grass mowed by blades 20 rise to the air.

A step 1j is formed on an inner peripheral surface of motor housing portion 1m between motor chamber MC and cooling chamber FC so as to engage with an outer peripheral edge of stator plate 33b. Step 1j is divided into halves between casing halves 1A and 1B. To install motor assembly 2 and motor shaft 3 into casing half 1A from which casing half 1B has been removed, a lower half outer peripheral edge of stator plate 33b is fitted to step 1j of casing half 1A. Step 1j completed by joining casing halves 1A and 1B to each other is disposed as an end surface of motor chamber MC covering the whole outer peripheral edge of stator plate 33b when viewed in the axial direction of motor shaft 3, thereby completely separating motor chamber MC from cooling chamber FC.

An annular groove 142 is formed on a surface of step 1j facing stator plate 33b by joining casing halves 1A and 1B to each other, and liquid packing is filled up in groove 142. Stator plate 33b is provided with bearing 43 and a fluid seal 143 interposed between an inner peripheral surface of the center hole of stator plate 33b and an outer peripheral surface of motor shaft 3, thereby constantly keeping cooling chamber FC as a dry chamber while motor chamber MC is a wet chamber.

Wiring of harnesses 85 and 88, when installing motor assembly 2 and motor shaft 3 into casing 1, will be described. In electric transaxle unit A having the structure of FIGS. 6(a) and 7 or the structure of FIGS. 11 and 12, a plug hole 1q is formed through a front end wall of motor housing portion 1m of casing 1 between motor chamber MC and the outside of casing 1. As shown in FIG. 10, when plug hole 1q is viewed in the fore-and-aft direction (horizontally perpendicular to motor shaft 3), plug hole 1q is substantially shaped like a rhombus having a vertical long diagonal line, a short diagonal line along joint surface J, and arcuate top and bottom ends, so as to correspond to the approximately rhombic plug 44 to be clamped between casing halves 1A and 1B, and is divided into halves between casing halves 1A and 1B by joint surface J. Plug hole 1q completed by joining casing halves 1A and 1B, when viewed in the fore-and-aft direction, is formed to have its maximum width along joint surface J at a vertical center portion thereof extended on joint surface J and to extend upward and downward from the vertical center portion thereof perpendicular to joint surface J so as to reduce its width along joint surface J as it goes away from joint surface J.

To install electric motor assembly 2 into casing half 1A which is placed to have the open surface corresponding to joint surface J at the top thereof, wires of two harnesses 85 and 88 are passed through common plug 44, and a lower half portion of plug 44 is engaged into plug hole 1q of casing half 1A.

Alternatively, as shown in FIG. 13, wires of harness 85 may be passed through a plug 144, and harness 88 may be passed through a plug 145 separated from plug 144. Casing 1 is formed with a plug hole 1qa for fitting plug 144 therein, and with a plug hole 1qb for fitting plug 145 therein. Plugs 1qa and 1qb are divided into halves between casing halves 1A and 1B. Each of plugs 144 and 145 has a shape and function similar to those of plug 44. When motor assembly 2 and motor shaft 3 are installed into casing half 1A as mentioned above, rubber plugs 144 and 145 are fitted into respective plug holes 1qa and 1qb of casing half 1A.

Electric transaxle units AL and AR require respective drivers 84. Normally, drivers 84 are mounted on appropriate portions of vehicle body frame 10. Alternatively, referring to FIG. 13, drivers 84 are provided in respective casings 1. In this regard, a driver chamber DC is formed in motor housing portion 1*m* of each casing 1 so as to be separate from motor chamber MC and gear chamber GC and to be dividable into halves between casing halves 1A and 1B. A partition wall between motor chamber MC and driver chamber DC is formed therein with a plug hole 1*qc* which is dividable into halves between casing halves 1A and 1B. Plug 44 through which the wires of harnesses 85 and 88 are passed is fitted into plug hole 1*qc*. Further, a penetrating plug hole 1*qb* is formed through a wall of casing 1 between driver chamber DC and the outside of casing 1 so as to be dividable into halves between casing halves 1A and 1B. Electric wires and ground wires are extended from respective drivers 84 and are connected to battery 22 and controller 80 disposed outside of casings 1. The electric wires and ground wires are passed through respective plugs 146, and plugs 146 are fitted into respective plug holes 1*qb*. Plug 146 has a shape and function similar to those of plug 44. Each plug 146 is fitted into plug hole 1*qb* when corresponding driver 84 is installed into driver chamber DC of casing half 1A.

An upper half portion of plug 44 is fitted into plug hole 1*q* of casing half 1B by putting casing half 1B onto casing half 1A. Then, bolts 29 are screwed to fasten casing halves 1A and 1B to each other. Accordingly, plug 44 is stressed by a downward surface pressure from casing half 1B and by an upward surface pressure from casing half 1A. Rubber plug 44 is elastically deformed to extend horizontally at the portion thereof along the short diagonal line of the rhombus-shape thereof on joint surface J so as to correspond to the surface pressure, whereby plug 44 is tightly fitted at an outer peripheral surface thereof to an inner peripheral wall surface of plug hole 1*q*, and the electric wires are tightly fitted at outer peripheral surfaces thereof to respective inner peripheral surfaces of the passage holes in plug 44, thereby surely sealing motor chamber MC.

The pair of ports 1*p* formed in the top and bottom end portions of motor housing portion 1*m* of each casing 1 will be described. In the embodiment of FIGS. 1-3 (and FIG. 4), right electric transaxle unit AR is arranged so that port 1*p* in its casing half 1A serves as the drain port, and port 1*p* in its casing half 1B serves as the breather port, and left electric transaxle unit AL is arranged so that port 1*p* in its casing half 1A serves as the breather port, and port 1*p* in its casing half 1B serves as the drain port.

Figure 17:
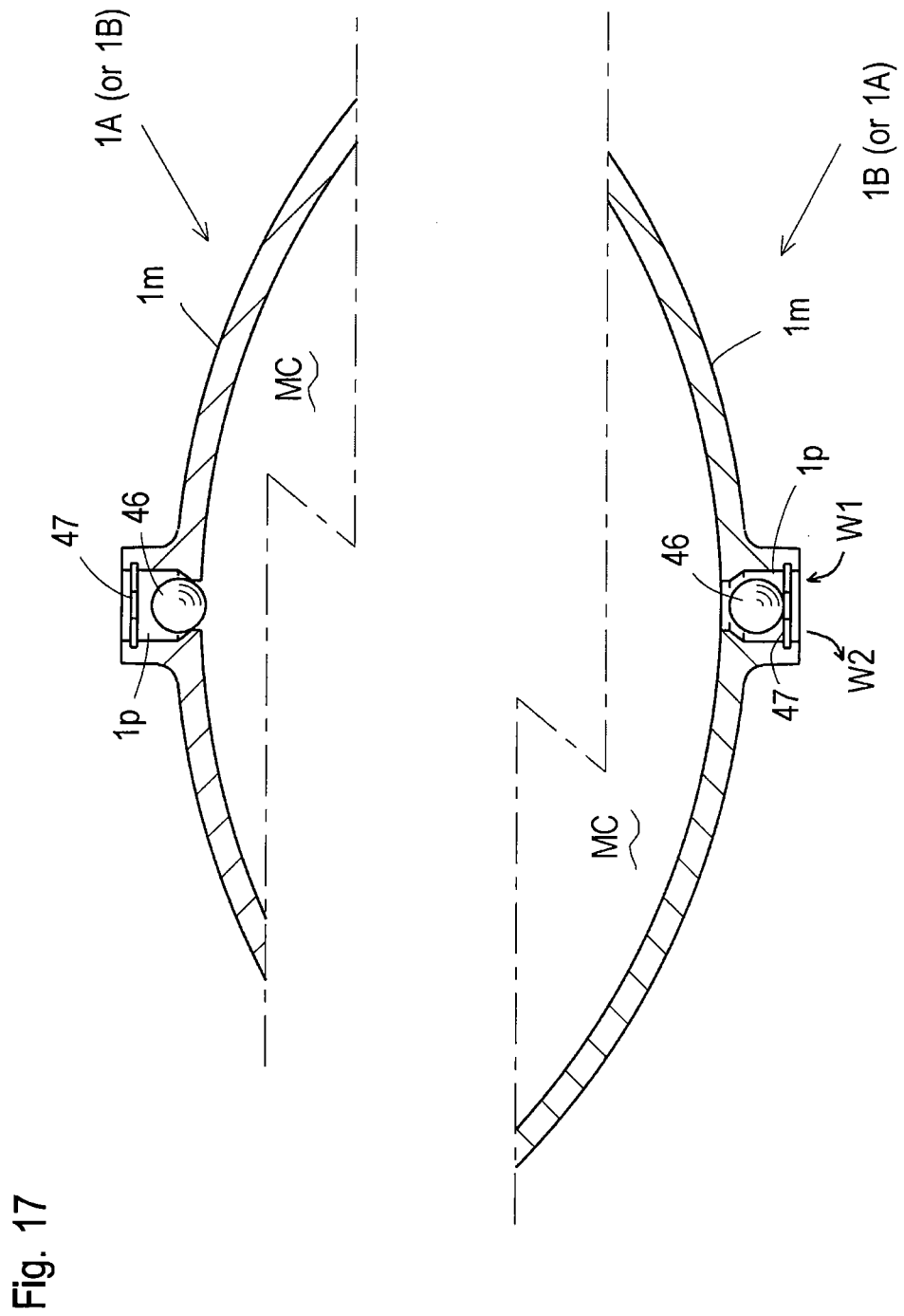
FIG. 17 is a fragmentary sectional view of casing halves 1A and 1B formed with respective breather ports 1p, wherein breather ports 1p are disposed at top and bottom ends of a motor housing portion 1m of casing 1 of electric transaxle unit A, and have respective check balls 46 therein to correspond to motor assembly 2 when motor assembly 2 is a dry type motor.

The above-mentioned arrangement corresponds to motor chamber MC when it is a wet chamber. Alternatively, when motor chamber MC is a dry chamber, check balls 46 are fitted in respective upper and lower ports 1*p* as shown in FIG. 17. Each port 1*p* is fixedly provided with a retaining plate 47 having inner-and-outer penetrating connection holes at an end portion thereof opened to the outside of casing 1. Each port 1*p* is tapered to form a valve seat at a connection hole thereof opened to motor chamber MC. Each check ball 46 is disposed between corresponding retaining plate 47 and the corresponding valve seat.

In port 1*p* at the top of motor housing portion 1*m* (casing 1), the valve seat is disposed below retaining plate 47, so that check ball 46 abuts against the valve seat so as to close the connection hole of port 1*p* opened to motor chamber MC, thereby preventing foreign materials such as water from entering casing 1 via upper port 1*p*. On the other hand, in port 1*p* at the bottom of motor housing portion 1*m* (casing 1), retaining plate 47 is disposed below the valve seat, so that check ball 46 is separated from the valve seat and abuts against retaining plate 47 so as to open motor chamber MC at the inside of port 1*p* to the outside of the casing via the connection holes of retaining plate 47. In other words, lower port 1*p* serves as a breather which introduces outside air into motor chamber MC via the connection holes of retaining plate 47 along an arrow W1. Further, dew condensed in motor chamber MC can be drained out via the connection holes of retaining plate 47 along an arrow W2.

Alternatively, harnesses 85 and 88 may be passed through breather port 1*p* at the top of motor housing portion 1*m* without plug 44 or the like. In this case, a breather tube having an opening at an appropriate portion thereof is provided so that harness 85 or 88 is passed in the breather tube and is drawn out from the opening of the breather tube.

On the assumption that motor chamber MC is a wet chamber, a structure for fluidal communication between motor chamber MC and gear chamber GC will now be described. As shown in FIGS. 8 and 9, partition wall 1*w* of casing 1 is formed therein with upper and lower symmetric slot-shaped connection holes 1*y* extending upward and downward from the inner peripheral surface of retaining hole 1*x*. A filter 50 is fitted into lower connection hole 1*y* because lower connection hole 1*y* is able to pass fluid therethrough between gear chamber GC and motor chamber MC. Although metal powder generated by rubbing of gears of deceleration gear train G is mixed in fluid in gear chamber GC, filter 50 prevents the metal powder from entering motor chamber MC. Air is freely passed between motor chamber MC and GC via upper connection hole 1*y* which is disposed above a fluid surface level FL of the fluid sump in motor chamber MC and gear chamber GC. If motor chamber MC is a dry chamber, casing halves 1A and 1B are not formed with these connection holes 1*y*.

The foregoing are structures for incorporating electric motor assembly 2 in casing 1 by fastening casing halves 1A and 1B to each other when one half of casing 1 (e.g., casing half 1B) is put on the other half of casing 1 (e.g., casing half 1A) after the installation of electric motor assembly 2 into the other half of casing 1 (e.g., casing half 1A).

Alternatively, electric motor assembly 2 may be installed into casing 1 after casing halves 1A and 1B are joined to each other to constitute casing 1. In this regard, in an embodiment shown in FIG. 15, casing 1 completed by joining casing halves 1A and 1B has an opening at a side surface of motor housing portion 1*m* thereof opposite to gear housing portion 1*r*. Electric motor assembly 2 is inserted into motor chamber MC in the axial direction of motor shaft 3 via this opening, and central boss portion 37*a* of motor shaft support frame 37 is fitted into retaining hole 1*x* of casing 1. Stator plate 33*b* is diametrically larger than motor housing portion 1*m* of casing 1 so that the outer peripheral edge of stator plate 33*b* is disposed radially outward of the outer periphery of the opening of casing 1 (i.e., casing halves 1A and 1B). The outer peripheral edge of stator plate 33*b* is fastened to a wall of casing 1 surrounding the opening of casing 1 by bolts 149 so as to complete incorporation of motor assembly 2 and motor shaft 3 in casing 1.

Figure 15:
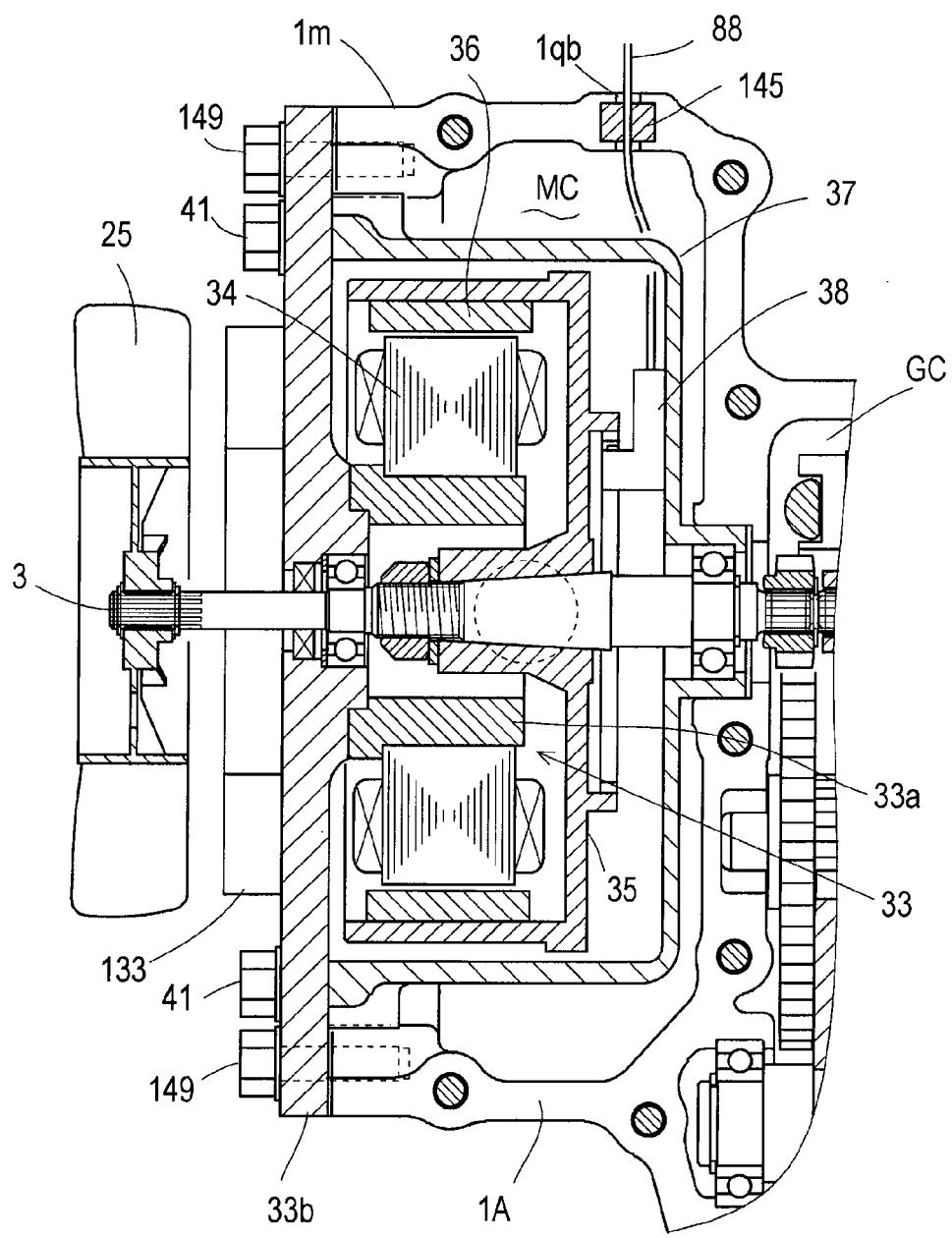
FIG. 15 is a fragmentary sectional plan view of electric transaxle unit A having casing 1 from which casing half 1B has been removed, showing remaining casing half 1A and inner and outer structures of casing half 1A, wherein motor assembly 2 is installed into casing 1 after casing 1 is completely constituted by joining casing halves 1A and 1B to each other.

Incidentally, FIG. 15 does not illustrate harness 85, while harness 85 is disposed outside of casing 1 so as to be connected to stator plate 33*b*. In this regard, casing 1 is formed with plug hole 1*qb* which is dividable into halves between casing halves 1A and 1B, and rubber plug 145, through which only the wires of harness 88 connected to rotation angle detector 38 are passed, is fitted into plug hole 1*qb*.

An interior structure of gear chamber GC of electric transaxle unit A and relevant structures shown in FIGS. 6(*a*), 8 and 9 will now be described. As mentioned above, the output end portion of motor shaft 3 is disposed in a front end portion of gear chamber GC so as to be fixedly provided thereon with motor output gear 65 and brake rotor 62. Single axle 4 parallel to motor shaft 3 is journalled by casing 1 in a rear portion of gear housing portion 1r and in axle housing portion is. A lateral proximal end portion (anti-projecting portion) of axle 4 is fitted into a bearing 51, and a portion of axle 4 toward its lateral distal end portion (projecting portion provided with hub 5) is passed through a bearing 52 and a fluid seal 53. Bearings 51 and 52 and fluid seal 53 are clamped between casing halves 1A and 1B. The above-mentioned pair of front and rear bosses 1f are formed on casing 1 (respective casing halves 1A and 1B) just forward and rearward of bearing 52 and fluid seal 53.

In gear chamber GC, a final gear 69 is fitted on a portion of axle 4 toward its proximal end so as to be rotatable relative to axle 4. Further, in gear chamber GC, a counter shaft 66 is clamped at both ends thereof between casing halves 1A and 1B so as to be supported parallel to motor shaft 3 at a fore-and-aft directional position between motor shaft 3 and axle 4. In gear chamber GC, a large diameter gear 67 meshes with motor output gear 65, a small diameter gear 68, which is diametrically smaller than large diameter gear 67, meshes with final gear 69, and gears 67 and 68 are provided on counter shaft 66 so as to be rotatable integrally with each other.

In this regard, the axes of motor shaft 3 and axle 4 are disposed on joint surface J between casing halves 1A and 1B, as mentioned above. After both the lower half portion of motor shaft support frame 37 journaling motor shaft 3 and a lower half portion of a bearing journaling axle 4 are installed into casing half 1A placed to have its open surface at the top thereof, casing half 1B is put on casing half 1A and joined to casing half 1A, so as to clamp both motor shaft support frame 37 and the bearing of motor shaft 3 between casing halves 1A and 1B, thereby completing to support motor shaft 3 and axle 4 in gear chamber GC.

On the other hand, counter shaft 66 is disposed in casing half 1A apart from joint surface J. More specifically, right electric transaxle unit AR has its counter shaft 66 below joint surface J, and vertically inversed left electric transaxle unit AL has its counter shaft 66 above joint surface J. Therefore, the fore-and-aft length of gear chamber GC is reduced so as to minimize electric transaxle unit A in the fore-and-aft direction. To achieve this arrangement of counter shaft 66, on the assumption that casing half 1A is placed to have its open surface corresponding to joint surface J at the top thereof, a pair of recesses 1Ac are formed in casing half 1A at partition wall 1w between gear housing portion 1r and motor housing portion 1m and at an outer side portion of gear housing portion 1r opposite to motor housing portion 1m so as to be recessed downward from the open surface of casing half 1A corresponding to joint surface J. Each recess 1Ac has a flat surface at its bottom end, and a pair of sectionally semicircular recesses for receiving the lower half portion of counter shaft 66 are formed in casing half 1A so as to be recessed downward from the bottom flat surface of respective recesses 1Ac.

On the other hand, on the assumption that casing half 1B is placed to have its open surface corresponding to joint surface J at the bottom thereof, a pair of projections 1Bc are formed on casing half 1B at partition wall 1w between gear housing portion 1r and motor housing portion 1m and at an outer side portion of gear housing portion 1r opposite to motor housing portion 1m so as to project downward from the open surface of casing half 1B corresponding to joint surface J. Each projection 1Bc has a flat surface at its bottom end, and a pair of sectionally semicircular recesses for receiving the upper half portion of counter shaft 66 are formed in casing half 1B so as to be recessed upward from the bottom flat surface of respective projections 1Bc.

In the state that casing half 1A is placed to have its open surface corresponding to joint surface J at the top thereof, the lower half portion of counter shaft 66 is fitted at opposite ends thereof into the semicircular downward recesses at the bottom portions of respective recesses 1Ac. Then, casing half 1B is put on casing half 1A and is joined to casing half 1A, so that projections 1Bc are fitted into respective recesses 1Ac, and the upper half portion of counter shaft 66 is fitted at the opposite ends thereof into the semicircular upward recesses at the bottom portions of respective projections 1Bc, thereby completing to support counter shaft 66 in casing half 1A.

Alternatively, counter shaft 66 may be supported to have its axis disposed on joint surface J, i.e., at the same height of the axes of motor shaft 3 and axle 4. In this case, each of casing halves 1A and 1B is provided with sectionally semicircular recesses recessed from the surface thereof corresponding to joint surface J, and counter shaft 66 is fitted at opposite ends thereof into the recesses of casing halves 1A and 1B so as to be clamped between mutually joined casing halves 1A and 1B. Therefore, processes for shaping casing halves 1A and 1B can be simplified.

A vertical brake shaft 61 is supported in gear chamber GC forward of motor output gear 65 so as to be rotatable and centered on its axis. Brake shaft 61 has an end, which is diametrically smaller than a vertically intermediate main portion of brake shaft 61 disposed in gear chamber GC. This outer end of brake shaft 61 is passed through boss 1Aa (serving as the arm-projection portion from which the brake arm is extended outward) penetrating casing half 1A (to be outwardly opened), and projects outward from the casing via boss 1Aa so as to be fixedly provided thereon with brake arm 60. Brake shaft 61 also has another end that is diametrically smaller than the main portion of brake shaft 61. This end of brake shaft 61 is fitted into outwardly closed boss 1Ba formed on casing half 1B. The diametric difference of the main portion of brake shaft 61 from the end portion of brake shaft 61 inserted into boss 1Aa prevents brake shaft 61 from escaping casing 1.

As mentioned above, brake arm 60 is cranked, and has end 60a to be connected to a link member connected to a brake operation device. End 60a of brake arm 60 is disposed at the same height of the axis of axle 4. Accordingly, the link members that extend from the brake operation device and connect to respective brake arms 60 of respective electric transaxle units AL and AR are leveled at the same height when electric transaxle units AL and AR are arranged so that one unit corresponds to the other unit reversed vertically.

Alternatively, brake arm 60 may not be cranked, and boss 1Ba of casing half 1B may also be outwardly opened (so as to serve as an arm-projection portion from which the brake arm is extended outward). In this state, brake shaft 61 is arranged so that both the top and bottom outer ends of brake shaft 61 project outward from casing 1. Both brake shafts 61 of respective electric transaxle units AL and AR are fixedly provided with the respective brake arms on the outer ends thereof above respective casings 1, for instance, so that the brake arms of left and right electric transaxle units AL and AR can be disposed at equal heights.

In gear chamber GC, a vertical intermediate portion of brake shaft 61 is formed as a cam portion, which is substantially semicircular when viewed sectionally in plan and has a vertical flat cam surface 61a. A brake shoe 63 is disposed in gear chamber GC so as to face cam surface 61a, and a brake pad 64 is disposed in gear chamber GC on another side of brake shoe 63 opposite to brake shaft 61, and is fixed to casing 1. A part of brake rotor 62 is disposed between brake shoe 63 and brake pad 64. In this way, a brake mechanism Br is configured in gear chamber GC so as to include brake shaft 61, brake rotor 62, brake shoe 63 and brake pad 64. When the brake operation device is set at an unbraking position, cam surface 61a is disposed parallel to a vertical surface of brake shoe 63, so that brake shoe 63 and brake pad 64 are separated from brake rotor 62. When brake arm 60 is rotated to a braking position, cam surface 61a presses brake shoe 63 against brake rotor 62 so as to brake motor shaft 3.

Casing halves 1A and 1B clamp and support a vertical discoid magnet 70 therebetween in gear chamber GC. Magnet 70 adsorbs iron powder generated by meshing and friction of each gear so as to reduce contamination of fluid in gear chamber GC.

When cogging torque of electric motor assembly 2 is too large to ensure smooth rotation of the axle during towing of a vehicle, preferably, a mechanical clutch for towing of the vehicle is provided in a power train between motor shaft 3 and axle 4. For example, a clutch for towing of the vehicle may be interposed between motor shaft 3 and motor output gear 65 provided on motor shaft 3 rotatably relative to motor shaft 3, i.e., the clutch may be disposed on motor shaft 3. However, FIG. 6(a) illustrates that a representative clutch TC for towing the vehicle is provided on axle 4. Due to this arrangement on axle 4, the required force for free rotation of axle 4 during disengagement of clutch TC when lawn mower 100 being towed is minimized because it does not have to rotate deceleration gear train G together with axle 4. In this regard, a clutch member 71 is spline-fitted on axle 4 so as to be unrotatable relative to axle 4 and be axially slidable on axle 4. A retaining ring 71b is fixed on axle 4, and a spring 71a is wound around axle 4 so as to be interposed between retaining ring 71b and clutch member 71. Spring 71a biases clutch member 71 toward final gear 69. Final gear 69 is formed with recesses opened on one side surface thereof so that tip projections of clutch member 71 can be fitted into the respective recesses.

Clutch member 71 is formed with an annular groove, and a fork 72 is fitted into the annular groove of clutch member 71. A boss 72a of fork 72 is fitted on a vertical fork shaft 73 so as to be rotatable and centered on the axis of fork shaft 73. Both ends (top and bottom ends) of fork shaft 73 are fitted into respective bosses 1k formed in respective casing halves 1A and 1B, so that fork shaft 73 is supported between joined casing halves 1A and 1B.

An arm 72b is extended from boss 72a of fork 72 so as to be rotatable integrally with fork 72 and boss 72a. A fore-and-aft horizontally movable push-pull pin 74 is retained at a front end portion thereof onto a tip portion of arm 72b. Push-pull pin 74 is supported at a rear portion thereof by a rear end wall of casing 1 so as to locate its axis on joint surface J. Further, push-pull pins 74 project rearward from respective rear end surfaces of respective casings 1 so as to be connected at rear ends thereof to respective link members (such as rods) extended from the above-mentioned unshown common clutch operation device provided in lawn mower 100 for both left and right electric transaxle units AL and AR. Each of the link members includes a detent mechanism for retaining clutch member 71 at a clutch-off position.

When the clutch operation device is operated for clutching-on, left and right push-pull pins 74 are substantially simultaneously thrust forward at respective portions thereof extended in respective gear chamber GC, so as to set clutch members 71 at respective clutch-on positions where the projections of respective clutch members 71 are fitted into the respective recesses of final gear 69 by the biasing forces of springs 71a. Consequently, final gears 69 engage with respective axles 4 via respective clutch members 71 so as to be rotatable integrally with respective axles 4, thereby transmitting the rotary force of motor shaft 3 to axle 4 for normal traveling of the vehicle.

When the clutch operation device is operated for clutching-off, push-pull pins 74 are withdrawn rearward at the respective portions thereof extended in respective gear chamber GC, so as to pull the tips of respective arms 72b and to rotate respective forks 72 centered on respective bosses 72a, thereby setting clutch members 71 at respective clutch-off positions where the projections of respective clutch members 71 are removed from the respective recesses of final gear 69 against respective springs 71a. Consequently, final gears 69 become rotatable relative to respective axles 4, so that the rotary forces of motor shafts 3 received by respective final gears 69 are not transmitted to respective axles 4, thereby being adapted for towing of the vehicle.

Incidentally, for convenience of description, in FIG. 6, clutch member 71 above axle 4 is illustrated as being set at the clutch-on position, and clutch member 71 below axle 4 is illustrated as being set at the clutch-off position. The aforesaid clutches are dog clutches serving as the clutches for towing the vehicle. Alternatively, ball clutches, bi-directional clutches automatically engaged and disengaged in correspondence to rotary speeds, or other various clutches are adaptable as the clutches for towing the vehicle.

Figure 16:
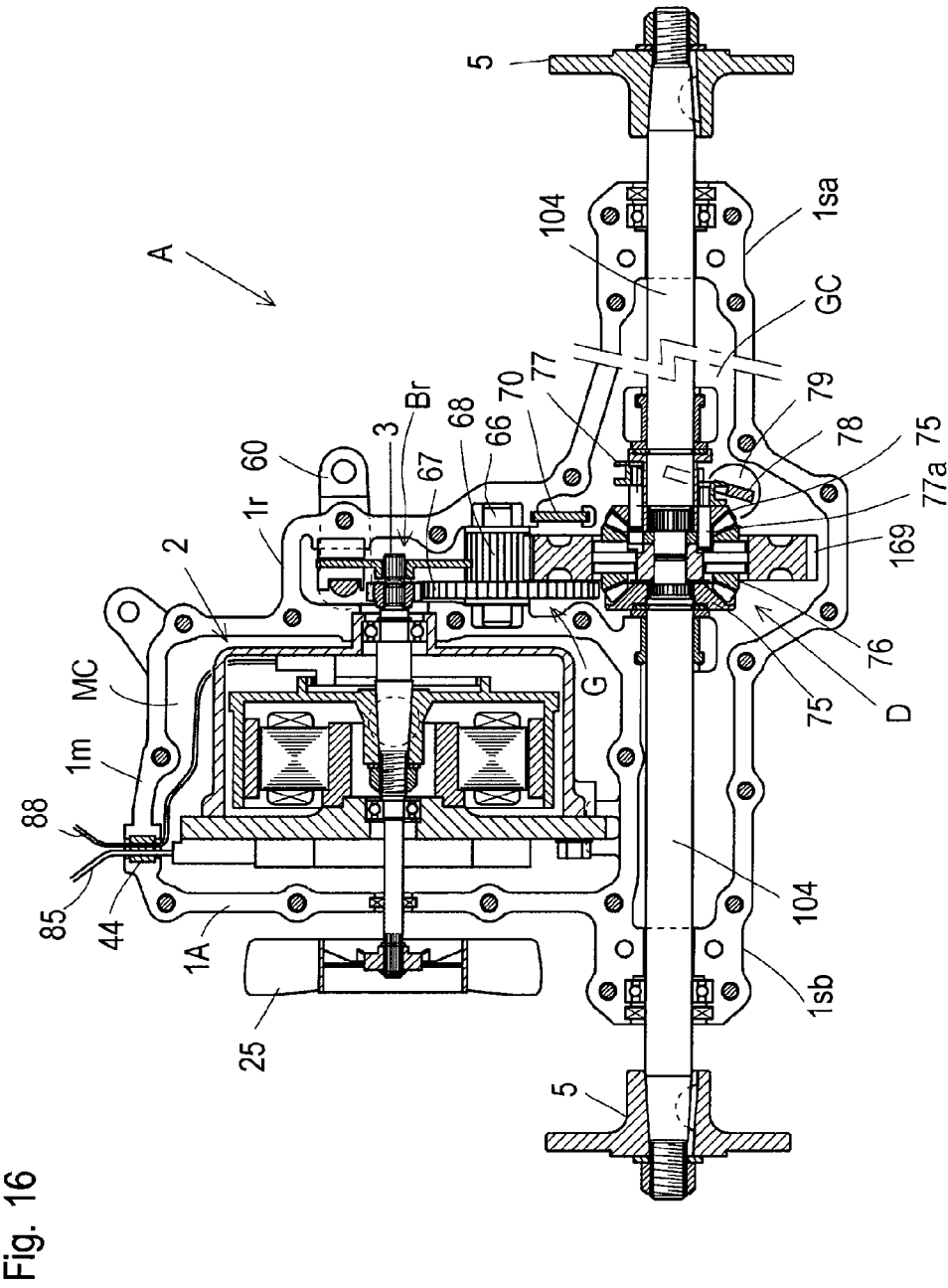
FIG. 16 is a fragmentary sectional plan view of electric transaxle unit A having casing 1 from which casing half 1B has been removed, showing remaining casing half 1A and inner and outer structures of casing half 1A, wherein electric transaxle unit A is provided with a pair of axles 104 and a differential mechanism D differentially connecting axles 104 to each other.

Alternatively, as shown in FIG. 16, each electric transaxle unit A may be configured to support a pair of axles 104 for driving both left and right rear wheels 12L and 12R. In electric transaxle unit A having the structure of FIG. 16, casing 1 constituted by mutually joining casing halves 1A and 1B is formed with motor housing portion 1m and gear housing portion 1r which are similar to above-mentioned motor housing portion 1m and above-mentioned gear housing portion 1r. Casing 1 has an axle housing portion 1sa, which is laterally extended from a rear portion of gear housing portion 1r laterally opposite to motor housing portion 1m so as to correspond to the above-mentioned axle housing portion 1s. Further, casing 1 is formed with another axle housing portion 1sb laterally extended from the rear portion of gear housing portion 1r along a rear end portion of motor housing portion 1m.

Motor housing portion 1m is formed therein with motor chamber MC incorporating electric motor assembly 2, and gear housing portion 1r is formed therein with gear chamber GC in which brake mechanism Br including brake shaft 61 and deceleration gear train G including counter shaft 66 and gears 65, 67 and 68 are disposed, similar to those in the foregoing embodiments. Each of axles 104 is journalled in each of axle housing portions 1sa and 1sb, and projects laterally distally from a left or right distal end of each of axle housing portions 1sa and 1sb, so as to be fixedly provided on the distal end thereof with hub 5.

A bull gear 169, corresponding to bull gear 69, is disposed in a rear portion of gear chamber GC. Axles 104 are fitted at proximal ends thereof into a center hole of bull gear 169 so as to be rotatable relative to bull gear 169. A differential mechanism D is interposed between bull gear 169 and both axles 104 so as to transmit the rotary force of bull gear 169 to axles 104. More specifically, differential pinions 76 are supported in bull gear 169 so as to be rotatable and centered on their axes extended radially of bull gear 169. A pair of left and right differential side gears 75 are fixed on respective axles 104 so as to face the respective left and right side surfaces of bull gear 169, and mesh with each of differential pinions 76.

A differential lock member 77 is axially slidably fitted on one of axles 104. Differential lock member 77 is switchable between a differential locking position and a differential unlocking position according to the axial slide thereof. In FIG. 16, for convenience of description, differential lock member 77 set at the differential unlocking position is illustrated above axle 104, and differential lock member 77 set at the differential locking position is illustrated below axle 104. Differential lock member 77 is fixedly provided with differential lock pins 77a extended in the axial direction of axle 104. Differential lock pins 77a are constantly inserted into one of differential side gears 75. When differential lock member 77 is set at the differential locking position, differential lock pins 77a are fitted into respective recesses formed in bull gear 169, thereby differentially locking left and right axles 104 to each other. When differential lock member 77 is set at the differential unlocking position, differential lock pins 77a are separated from bull gear 169 so that left and right axles 104 are differentially rotatable.

Differential lock member 77 is formed with an annular groove into which a fork 78 is fitted. A vertical fork shaft 79 is supported in gear chamber GC so as to serve as a pivot shaft of fork 78. Casing halves 1A and 1B may be formed with respective bosses which are shaped similar to above-mentioned bosses 1k for brake shaft 61 in this embodiment, and fork shaft 79 may be supported at top and bottom ends thereof in the respective bosses. A differential lock arm (not shown) is provided on an end of fork shaft 79 projecting the top or bottom end of bosses 1k.

Figure 18:
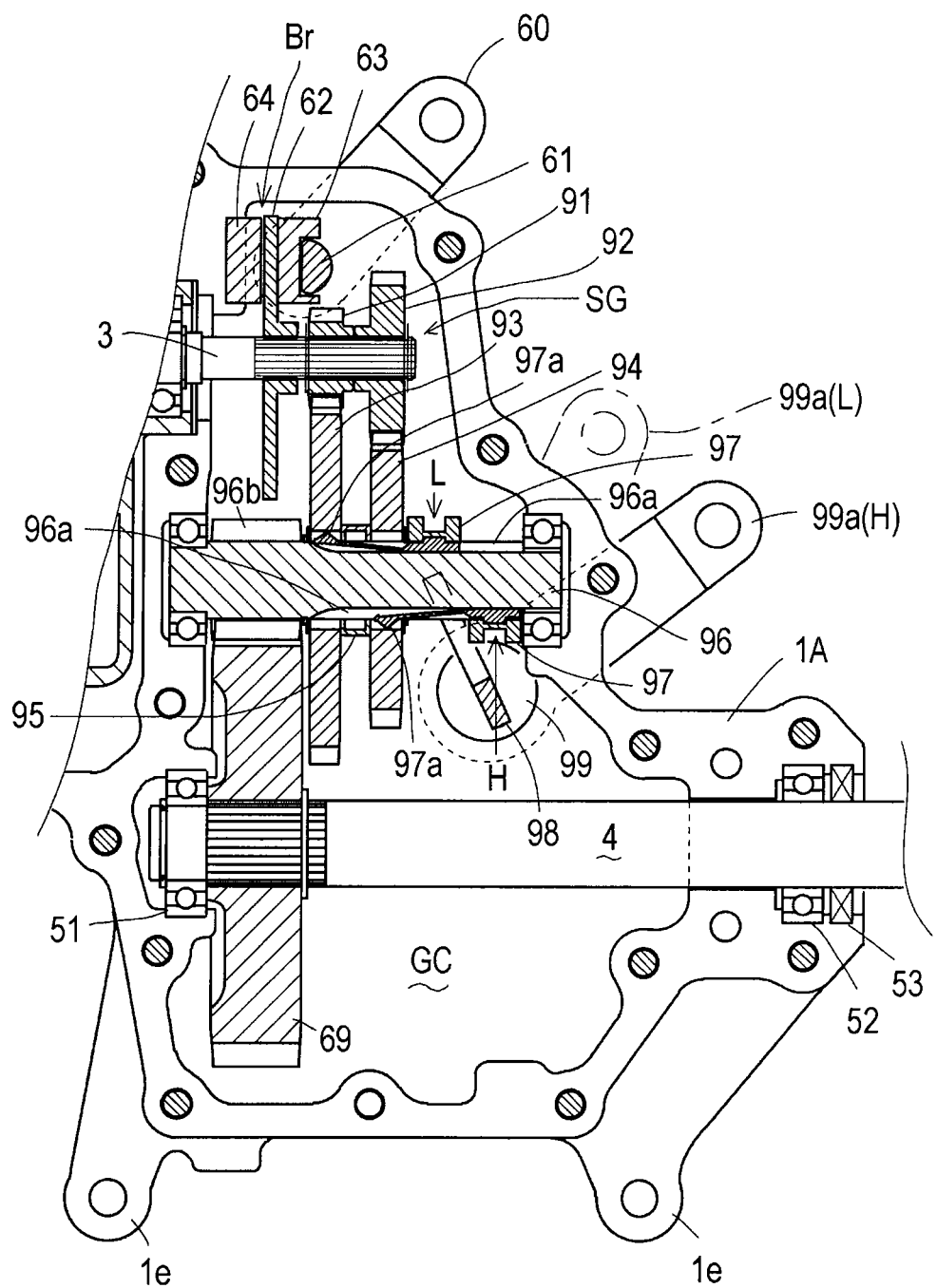
FIG. 18 is a fragmentary sectional plan view of electric transaxle unit A having casing 1 from which casing half 1B has been removed, showing remaining casing half 1A and inner and outer structures of casing half 1A, wherein a speed-shift gear mechanism is installed in gear chamber GC.

Alternatively, each of electric transaxle units AL and AR may be provided in gear chamber GC in casing 1 thereof with a mechanical multi-speed shift system SG as shown in FIG. 18. In the structure shown in FIG. 18, counter shaft 96 is supported in gear chamber GC between motor shaft 3 and axle 4. Incidentally, in this embodiment, counter shaft 96 is disposed so as to have the axis thereof on joint surface J, and is inserted at both ends thereof into respective bearings clamped between mutually joined casing halves 1A and 1B, thereby being rotatably supported in casing 1. A pinion 96b is formed on counter shaft 96 so as to be rotatable integrally with counter shaft 96, and meshes with final gear 69 fitted on axle 4.

In gear chamber GC, motor shaft 3 is fixedly provided thereon with a low speed drive gear 91 and a high speed drive gear 92 which is diametrically larger than low speed drive gear 91. Counter shaft 96 is provided thereon with a low speed driven gear 93, a high speed driven gear 94 which is diametrically smaller than low speed driven gear 93, and a neutral sleeve 95 between driven gears 93 and 94, so that driven gears 93 and 94 and neutral sleeve 95 are rotatable relative to counter shaft 96. Low speed driven gear 93 constantly meshes with low speed driven gear 91 so as to constitute a low speed gear train including gears 91 and 93. High speed driven gear 94 constantly meshes with high speed driven gear 92 so as to constitute a high speed gear train including gears 92 and 94.

Counter shaft 96 is formed on an outer surface thereof with a key groove 96a, which is axially extended so as to face inner peripheral surfaces of driven gears 93 and 94 and neutral sleeve 95. A shifter 97 is axially slidably fitted on counter shaft 96 so as to retain a base portion of a key member 97a fitted in key groove 96a. A fork 98 is pivoted on a vertical fork shaft 99 and is fitted into an annular groove of shifter 97.

In this embodiment, casing halves 1A and 1B are formed with respective bosses which are shaped similar to respective bosses 1Aa and 1Ba for brake shaft 61. Fork shaft 99 is supported at top and bottom ends thereof in these upper and lower bosses respectively, and projects at one outer end thereof outward from one of these bosses (in the present embodiment, the boss formed in casing half 1A) so as to be provided thereon with a cranked speed shift arm 99a. Similar to brake arm 60, speed shift arm 99a has an end portion which is disposed at the same height of the axis of axle 4 so as to be connected to a link member connected to a sub speed shift operation device disposed adjacent to the driver's seat. Alternatively, speed shift arm 99a may be connected to an actuator electrically controlled according to operation of the speed shift operation device.

For example, the sub speed shift operation device is a lever shiftable among three positions, i.e., a low speed setting position, a high speed setting position and neutral position. The common sub speed shift operation device is shared between left and right electric transaxle units AL and AR so that the shift of the sub speed shift operation device to either the low speed setting position or the high speed setting position affects on both left and right electric transaxle units AL and AR simultaneously. According to the operation of the sub speed shift operation device, fork shafts 99 and forks 98 are rotated so as to slide respective shifters 97 in the axial direction of respective counter shafts 96. Incidentally, for convenience of description, counter shaft 96 is illustrated as being formed at top and bottom ends thereof with respective key grooves 96a.

Each key member 97a is formed as a latch at a free tip portion thereof. When the sub speed shift operation device is set at the low speed setting position so as to set each shifter 97 at a low speed position L, the tip latch of each key member 97a engages with the inner peripheral portion of low speed driven gear 93 so that low speed driven gear 93 engages with counter shaft 96 via shifter 97 so as to be rotatable integrally with counter shaft 96, thereby transmitting the rotary force of motor shaft 3 to counter shaft 96 via the low speed gear train including gears 91 and 93. When the sub speed shift operation device is set at the high speed setting position so as to set each shifter 97 at a high speed position H, the tip latch of each key member 97a engages with the inner peripheral portion of high speed driven gear 94 so that high speed driven gear 94 engages with counter shaft 96 via shifter 97 so as to be rotatable integrally with counter shaft 96, thereby transmitting the rotary force of motor shaft 3 to counter shaft 96 via the high speed gear train including gears 92 and 94. Incidentally, speed shift arm 99a drawn in solid lines is illustrated as being set at a position for setting shifter 97 at high speed position H, and speed shift arm 99a drawn in phantom lines is illustrated as being set at a position for setting shifter 97 at low speed position L.

When the sub speed shift operation device is disposed at the neutral position so as to engage the tip latch of key member 97a with neutral sleeve 95, both driven gears 93 and 94 are rotatable relative to counter shaft 96 so as to prevent the rotary force of motor shaft 3 from being transmitted to counter shaft 96. During towing of lawn mower 100, the sub speed shift operation device is set at the neutral position. Therefore, in electric transaxle unit A of the embodiment shown in FIG. 18, clutch TC for towing the vehicle as mentioned above is not provided on axle 4.

Figure 19:
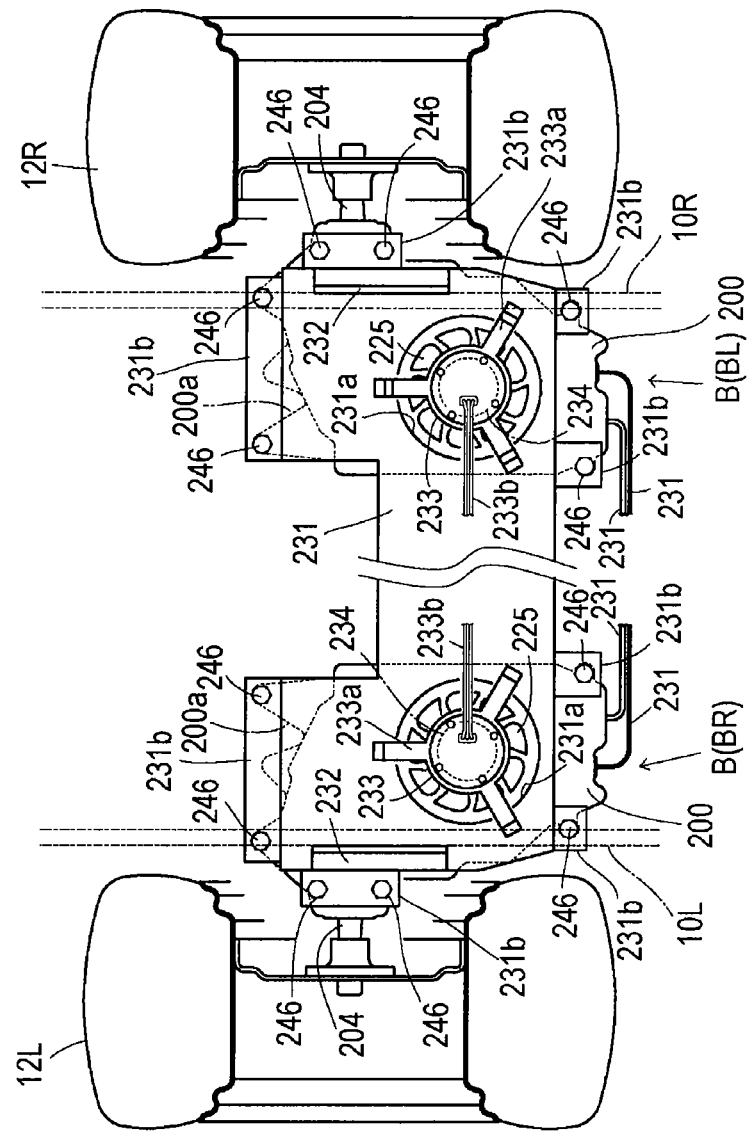
FIG. 19 is a plan view of a pair of alternative electric transaxle units B (left and right electric transaxle units BL and BR) supported by a vehicle body frame 10 of lawn mower 100.
Figure 20:
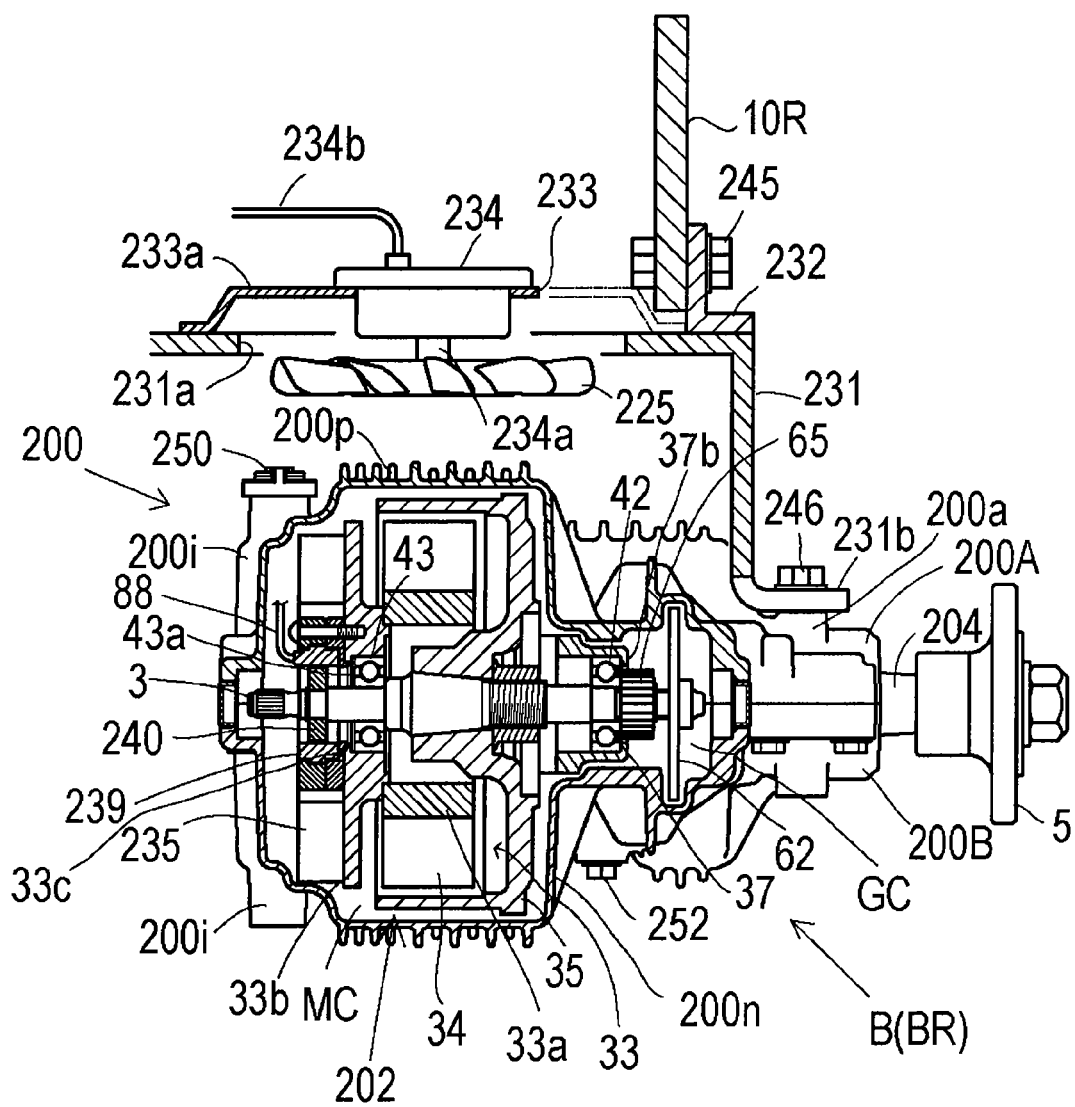
FIG. 20 is a sectional front view of one of left and right electric transaxle units BL and BR (i.e., representative right electric transaxle unit BR) supported by vehicle body frame 10 of lawn mower 100.

An embodiment shown in FIGS. 19 to 25 will now be described. In this embodiment, as shown in FIGS. 19 and 20, a pair of left and right electric transaxle units BL and BR having no cooling fan are supported by vehicle body frame 10, and a pair of cooling fans 225 are supported by vehicle body frame 10 so as to face casings 200 of respective electric transaxle units BL and BR.

A sub frame 231 is extended beneath left and right side plate portions 10a of vehicle body frame 10. Sub frame 231 has a horizontal plate portion to be extended above both electric transaxle units BL and BR. Left and right stays 232 are fixed on respective left and right ends of an upper surface of the horizontal plate portion by welding or the like so as to have respective vertical plate portions projecting upward. Sub frame 231 is fixed to vehicle body frame 10 by fastening the vertical plate portions of respective left and right stays 232 to respective left and right side plate portions 10*a* of vehicle body frame 10 via respective bolts and nuts 245.

The horizontal plate portion of sub frame 231 is vertically penetrated with a pair of left and right symmetric fan holes 231*a*. A pair of fan motor stays 233 are disposed just above respective fan holes 231*a*. Each fan motor stay 233 has a horizontal circular ring at a center portion thereof, and has foot portions 233*a* extended radially outward from the central ring (in this embodiment, three foot portions 233*a* at regular intervals). Foot portions 233*a* of each fan motor stay 233 are bent downward so as to have respective horizontal tabs at utmost ends thereof. The tabs of each fan motor stay 233 are disposed around corresponding fan hole 231*a* and are fixed onto the upper surface of the horizontal plate portion of sub frame 231.

A pair of fan motors 234 are fixed at respective upper portions thereof onto upper surfaces of the rings of respective fan motor stays 233 by screwing or the like, and are hung down from respective fan motor stays 233 through holes of the rings of respective fan motor stays 233. Vertical fan shafts 234*a* are extended downward from bottoms of respective fan motor stays 233 through respective fan holes 231*a*. The pair of left and right cooling fans 225 are fixed on bottom ends of respective fan shafts 234*a* beneath respective fan holes 231*a*. Harnesses 234*b* for collections of electric wires are extended upward from respective fan motors 234 so as to be connected to a controller (not shown).

A pair of electric transaxle units B identical to each other (i.e., having a common structure) serve as left and right electric transaxle units BL and BR. Left and right electric transaxle units BL and BR are arranged in lawn mower 100 so that one electric transaxle unit BL corresponds to the other electric transaxle unit BR vertically inversed, and left and right axles 204 supported by respective casings 200 of respective electric transaxle units BL and BR are extended laterally horizontally and coaxially to each other.

The horizontal plate portion of sub frame 231 is bent at left and right front ends, left and right side ends, and left and right rear ends thereof, so as to form vertical plate portions extended downward therefrom. The vertical plate portions of sub frames 231 are bent at bottom portions thereof so as to form horizontal tabs (generally named as tabs 231*b*) to be attached to casings 200. Casing 200 of each of left and right electric transaxle units BL and BR is formed at front, rear, and left or right proximal end portions thereof with bosses (generally named as bosses 200*a*) to be attached to sub frame 231. Top surfaces of respective bosses 200*a* (serving as attachment portions of casing 200 to be attached to the frame) contact lower surfaces of tabs 231*b*, and bolts 246 are screwed into respective bosses 200*a* through tabs 231*b* so as to fasten tabs 231*b* to bosses 200*a*, thereby fixing left and right electric transaxle units BL and BR to sub frame 231. Incidentally, in FIG. 19, only representative bosses of casings 200 contacting tabs 231*b* are marked by reference numerals 200*a*.

Left and right electric transaxle units BL and BR, which are completely fixed to sub frame 231 are disposed just below respective left and right cooling fans 225. In this regard, a horizontally axial cylindrical motor housing portion 200*n* of each casing 200 is formed therein with a later-discussed motor chamber MC, and is formed on a peripheral surface thereof with fins 200*p*, and a top portion of the peripheral surface of each motor housing portion 200*n* faces each cooling fan 225 thereabove. Therefore, cooling air generated by cooling fans 225 is preferentially blown to motor housing portions 200*n* with fins 200*p* so as to efficiently cool motor chambers MC and electric motor assemblies 202 incorporated therein.

A sub assembly is completed as sub frame 231 provided with left and right cooling fans 225 and left and right electric transaxle units BL and BR, and is supplied to a vehicle maker who assembles sub assemblies so as to produce lawn mower 100. In the vehicle maker, left and right stays 232 on sub frame 231 are fastened to respective left and right side plate portions 10*a* of vehicle body frame 10 by bolts and nuts 245, thereby hanging the sub assembly down from vehicle body frame 10.

Each casing 200 includes casing halves 200A and 200B, which are joined to each other so as to have horizontal joint surface J therebetween and are fastened to each other by bolts 29, similar to casing 1 including casing halves 1A and 1B. In left electric transaxle unit BL, casing half 200A is above casing 200B, and in right electric transaxle unit BR, casing half 200A is below casing 200B. Casing halves 200A and 200B are substantially symmetric with respect to joint surface J, and bosses 200*a* are dividable into halves between casing halves 200A and 200B, that is, utmost ends of divisional halves of each boss 200*a* are equally distant from joint surface J. Therefore, the top surface of each boss 200*a* is kept at a constant height so as to be convenient to its contact with tab 231*b* regardless of whether casing 200 is arranged to have casing half 200A above casing halve 100B or below casing half 200B. In this way, each electric transaxle unit B is adapted to serve as either left or right electric transaxle unit BL or BR only by vertical inversion thereof, similar to electric transaxle unit A.

Incidentally, in the embodiment shown in FIGS. 19 and 20, left and right electric transaxle units BL and BR are arranged so as to have axles 204 forward of electric motor assemblies 202. Alternatively, they may be arranged to have axles 204 rearward of electric motor assemblies 202. In this case, left electric transaxle unit BL has casing half 200A below casing half 200B, and right electric transaxle BR has casing half 200A above casing half 200B. Here, as mentioned above, casing halves 200A and 200B are approximately symmetric with respect to joint surface J (corresponding to open surfaces of respective casing halves 200A and 200B) and the only important difference between casing half 200A and casing half 200B is that only casing half 200A is adapted to have (motor shaft support frame 37 of) electric motor assembly 202 settled by bolts 49 as shown in FIG. 22.

Figure 21:
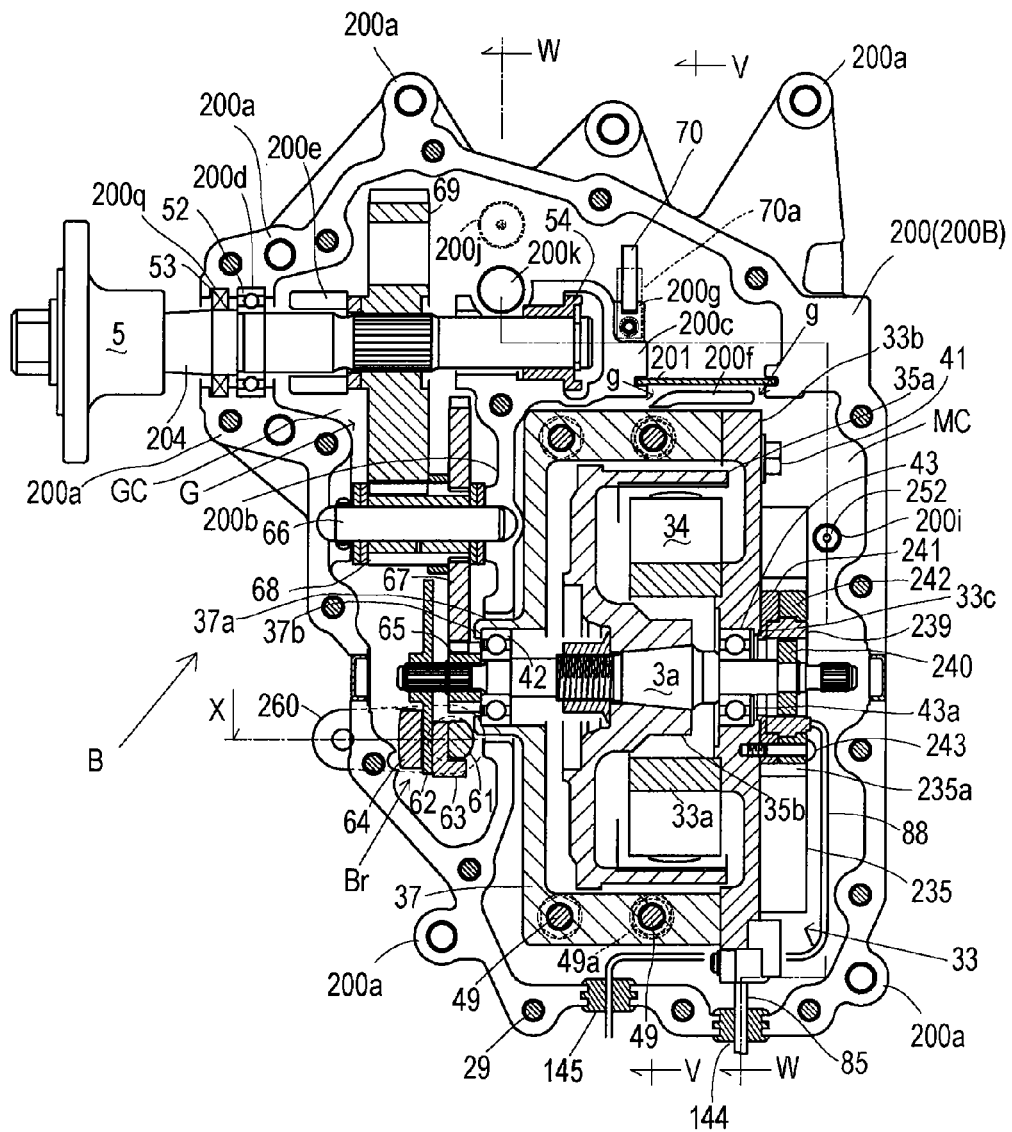
FIG. 21 is a sectional plan view of electric transaxle unit B having a casing 200 from which a casing half 200B has been removed, showing a remaining casing half 200A and inner and outer structures of casing half 200A.
Figure 22:
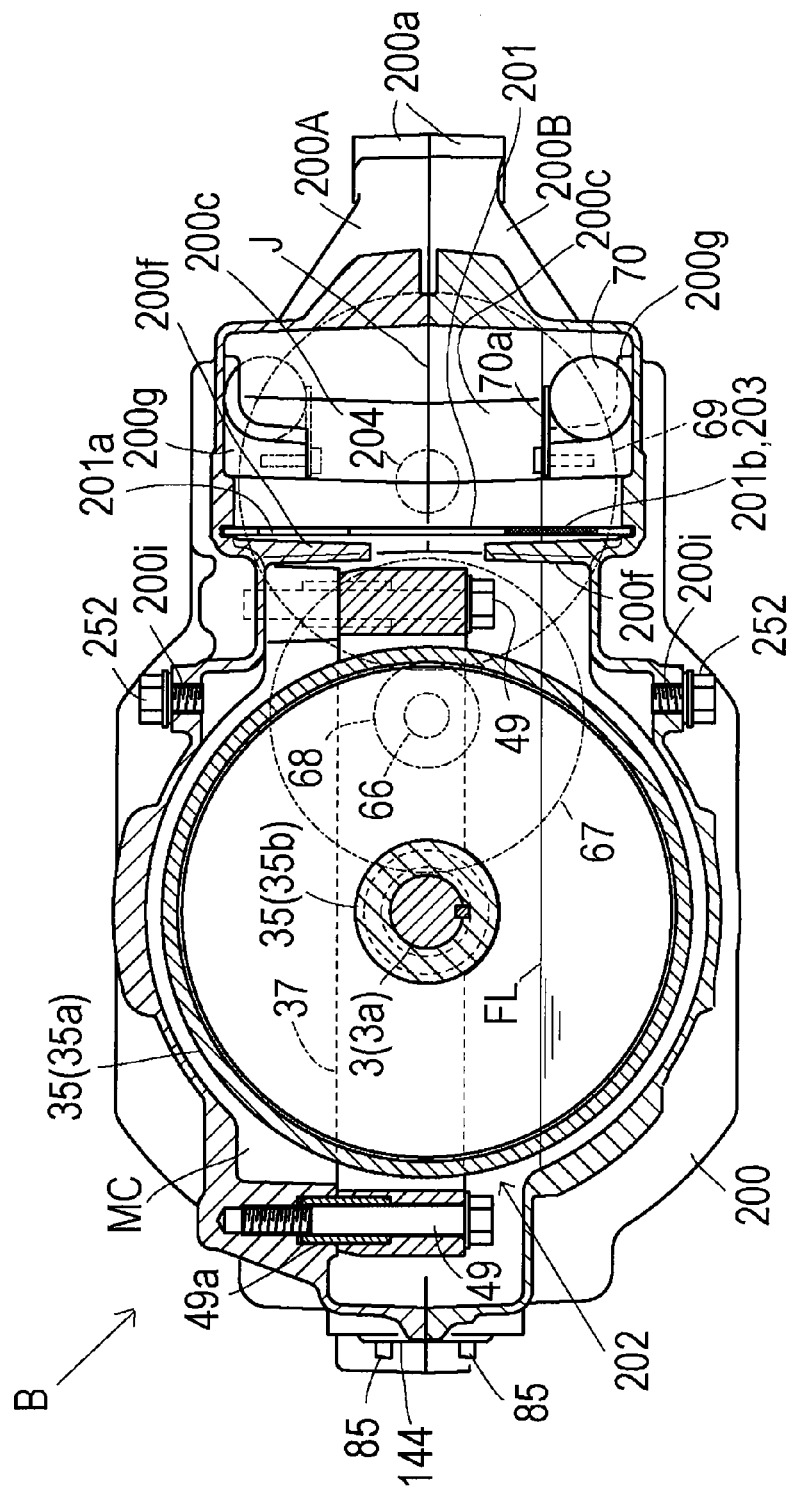
FIG. 22 is a cross sectional view taken along V-V line of FIG. 21.
Figure 23:
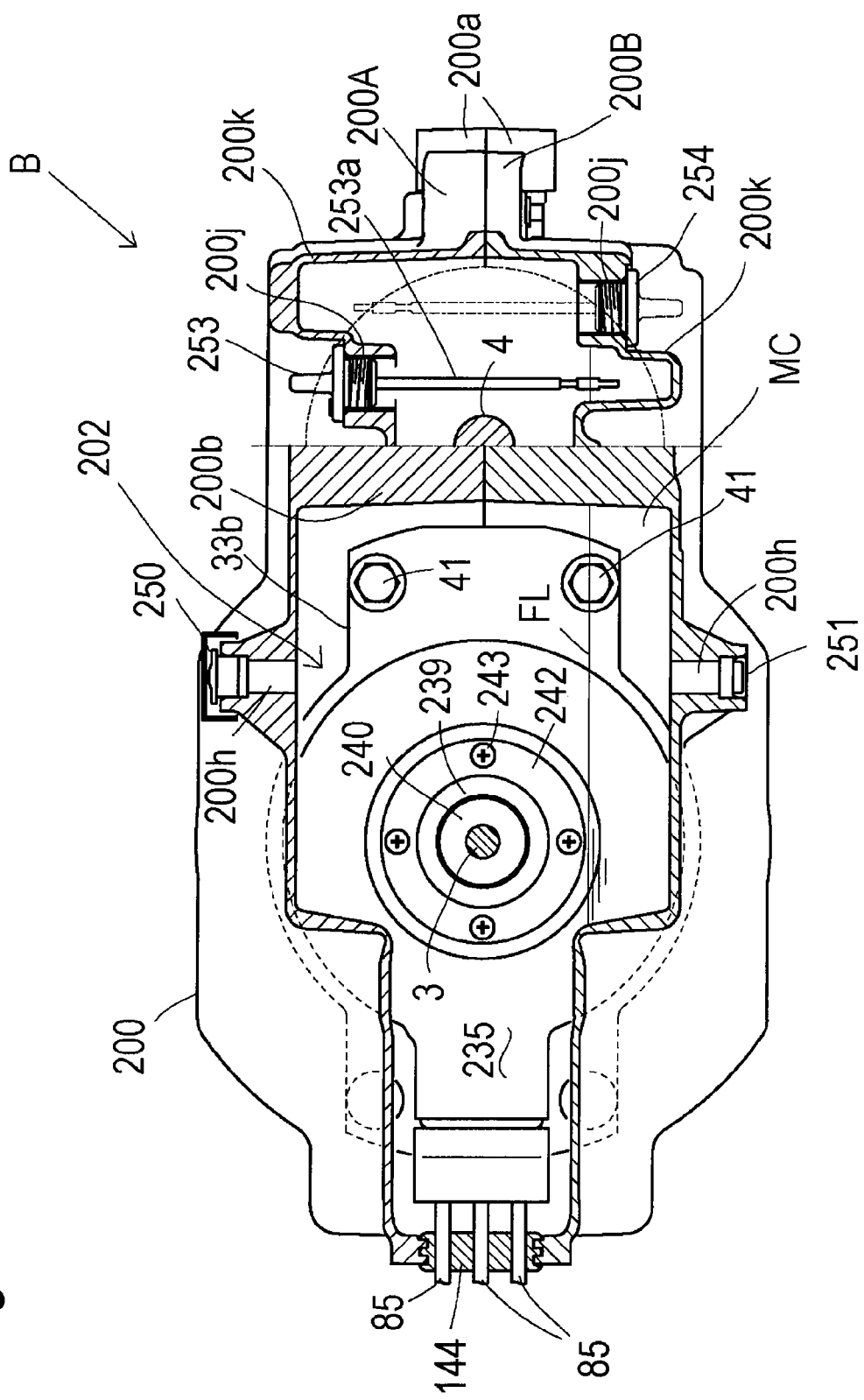
FIG. 23 is a cross sectional view taken along W-W line of FIG. 21.
Figure 24:
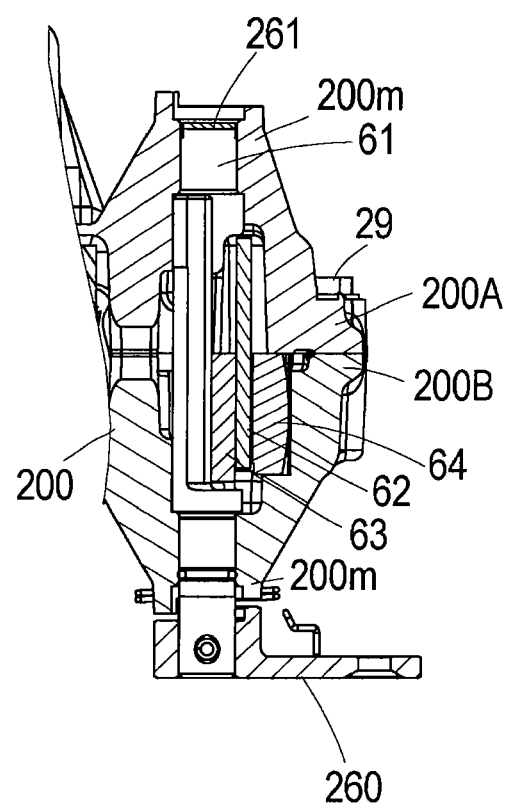
FIG. 24 is a cross sectional view taken along a line marked by an arrow X of FIG. 22.

Although FIG. 21 illustrates only casing half 200B and FIGS. 22 to 24 illustrate casing halves 200A and 200B, while casing half 200A is disposed above casing half 200B, a structure of casing 200 will be described with reference to FIGS. 21 to 25, on the assumption that a half structure of casing 200 in casing half 200B shown in FIG. 21 is representative of the whole structure of casing 200, and axle 204 is disposed forward of electric motor assembly 202, regardless of whether casing half 200A is disposed above or below casing half 200B.

Casing 200 is formed therein with a partition wall 200*b* dividable into halves between casing halves 200A and 200B. Partition wall 200*b* is extended forward from a rear end portion of casing 200, and is extended at a front end portion thereof in the lateral direction of casing 200 in parallel to axle 204, so as to divide an inner space of casing 200 into a motor chamber MC, which is substantially rectangular in sectional plan view, and a gear chamber GC, which is substantially L-like shaped in sectional plan view.

The front portion of partition wall 200b is formed as a bearing portion 200c for journaling a lateral proximal end of axle 204 via a bush 54. Axle 204 is extended in gear chamber GC from bearing portion 200c and projects outward from casing 200 so as to be fixedly provided on a lateral distal end thereof with hub 5. In this regard, semicircular annular grooves 200d are formed in lateral distal end portions of respective casing halves 200A and 200B by machining, so as to constitute a circular annular groove by joining casing halves 200A and 200B to each other, and bearing 52 provided on an axial intermediate portion of axle 204 is fitted into the joined grooves 200d. Further, casing 200 is formed in gear chamber GC with a cylindrical axle guide portion 200e which is dividable into halves between casing halves 200A and 200B so as to pass an axial intermediate portion of axle 204 therethrough.

An end portion of later-discussed motor shaft 3 is extended from motor chamber MC into gear chamber GC, and in gear chamber GC, a deceleration gear train G including gears 65, 67, 68 and 69, similar to deceleration gear train G of electric transaxle unit A is configured so as to be interposed between the end portion of motor shaft 3 and axle 204. In this embodiment, counter shaft 66 of deceleration gear train G has an axis on joint surface J and is clamped between casing halves 200A and 200B. Alternatively, counter shaft 66 may be supported in one of casing halves 200A and 200B so as to be offset from joint surface J as in the embodiments of electric transaxle unit A shown in FIGS. 8 and 9.

Further, as shown in FIGS. 21 and 24, a brake mechanism Br, similar to brake mechanism Br of electric transaxle unit A, is configured around the end portion of motor shaft 3 in gear chamber GC, so as to include vertical brake shaft 61, brake rotor 62 fixed on motor shaft 3, brake shoe 63 and brake pad 64. In this regard, casing halves 200A and 200B are formed with respective upper and lower bosses 200m, which are symmetric with respect to joint surface J, have respective vertical penetrating holes, and face gear camber GC therebetween. One end portion of vertical brake shaft 61 is rotatably passed through one boss 200m so as to project outward from casing 200, and is fixedly provided thereon with a brake arm 260. The other end portion of brake shaft 61 is rotatably fitted into the other boss 200m closed by a cap 261, so as not to project outward from casing 200.

In this embodiment, upper boss 200m is plugged by cap 261, and lower boss 200m serves as an arm-projecting portion from which brake arm 260 projects outward of casing 200, regardless of whether casing half 200A is above or below casing half 200B. Therefore, brake arms 260 are provided on the ends of brake shafts 61 projecting downward via lower bosses 200m from casings 200 of respective left and right electric transaxle units BL and BR so as to be disposed at equal heights, thereby being convenient for their operative connection to a brake operation device, as in the embodiment of electric transaxle units A. Alternatively, brake arms 260 may be provided on the ends of brake shafts 61 projecting upward via upper bosses 200m from casings 200 of respective left and right electric transaxle units BL and BR.

Fluid is stored in gear chamber GC so as to lubricate gears of deceleration gear train G Fluid is also stored in motor chamber MC serving as a wet chamber. In FIGS. 22 and 23, "FL" designates a fluid surface level of the fluid sump in casing 200 (in gear chamber GC and motor chamber MC). In this regard, casing 200 is formed with a pair of left and right vertical grooves: one is formed on bearing portion 200c; and the other is formed on a wall of casing 200 facing bearing portion 200c, as shown in FIG. 21. Further, casing 200 is formed with a pair of upper and lower horizontal grooves: one is formed on casing half 200A; and the other is formed on casing half 200B, as show in FIG. 22. Into these grooves, a partition plate 201 shown in FIG. 25 is fitted at left, right, upper and lower edges thereof so as to cover a gap between motor chamber MC and gear chamber GC.

Figure 25:
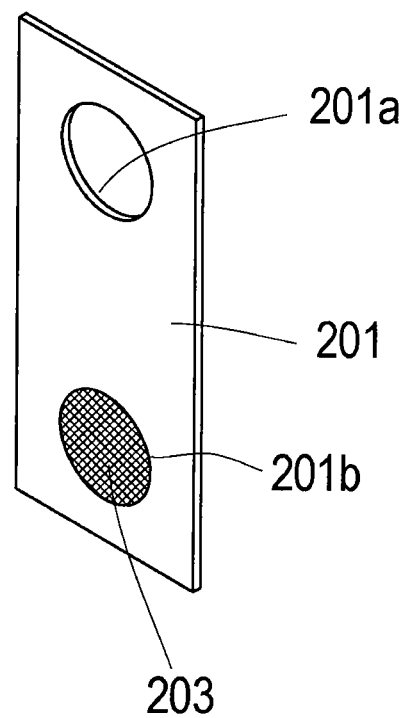
FIG. 25 is a perspective view of a partition plate 201 adaptable to electric transaxle unit B.

As shown in FIG. 25, partition plate 201 is bored with a pair of holes 201a and 201b. Not hole 201a but only hole 201b is covered with a mesh serving as a filter 203. Partition plate 201 is constantly disposed to have hole 201a above hole 201b regardless of whether casing half 200A is disposed above or below casing half 200B. Therefore, holes 201a and 201b function so that upper hole 201a allows air to flow therethrough between motor chamber MC and gear chamber GC, lower hole 201b allows fluid to flow therethrough between motor chamber MC and gear chamber GC, and filter 203 traps metal powder mixed in fluid in gear chamber GC before the fluid enters motor chamber MC, similar to the function of upper and lower holes 1y and filter 50 shown in FIGS. 8 and 9.

As shown in FIGS. 21 and 22, in motor chamber MC adjacent to partition plate 201, casing halves 200A and 200B are formed with respective upper and lower vertical fences 200f, which are extended vertically toward each other symmetrically with respect to joint surface J so as to have a gap therebetween as shown in FIG. 22. Further, as shown in FIG. 21, each of upper and lower fences 200f is extended in the axial directions of motor shaft 3 and axle 4, i.e., in the lateral direction of electric transaxle unit B, so that left and right opposite ends of each fence 200f are spaced from wall ends of corresponding casing half 200A or 200B defining a passage between motor chamber MC and gear chamber GC so as to have respective gaps "g", each of which is smaller than the gap between upper and lower fences 200f. Therefore, lower fence 200f resists fluid flowing from gear chamber GC to motor chamber MC via lower hole 201b.

In this way, regardless of whether casing half 200A is above or below casing half 200B, lower fence 200f soaked in the fluid sump in motor chamber MC reduces agitation resistance of the fluid in motor chamber MC against rotation of rotor 35 of electric motor assembly 202, thereby ensuring a required rotation efficiency of rotor 35. More specifically, during rotation of rotor 35 in motor chamber MC, fluid in motor chamber MC is splashed by the rotation of rotor 35, and most of the splashed fluid moves into gear chamber GC over lower fence 200f, whereas, fluid from gear chamber GC flows into motor chamber MC only through gaps "g", and most of the fluid from gear chamber GC is fenced out by lower fence 200f before entering motor chamber MC, thereby reducing the resistance of fluid against rotating rotor 35.

As shown in FIGS. 21 and 22, in gear chamber GC at a portion between partition plate 201 and deceleration gear train G, casing halves 200A and 200B are formed with respective upper and lower magnet pockets 200g, which are symmetric with respect to joint surface J and continuous to bearing portion 200c. Regardless of whether casing half 200A is above or below casing half 200B, vertical discoid magnet 70 is fitted to only lower magnet pocket 200g and not upper magnet pocket 200g. A retaining plate 90 is fixed onto magnet pocket 200g so as to retain magnet 70. As mentioned above in the embodiment of electric transaxle unit A, metal powder generated by rubbing of the gears of deceleration gear train G is trapped by magnet 70. Upper and lower magnet pockets 200g are adapted to have a retaining plate 70a mounted thereon. Retaining plate 70a is fixed onto lower magnet pocket 200g fitting magnet 70 so as to be pressed against a top of magnet 70, thereby retaining magnet 70.

As shown in FIG. 23, casing halves 200A and 200B are formed with respective upper and lower holes 200h, which are symmetric with respect to joint surface J and face motor chamber MC therebetween. Regardless of whether casing half 200A is above or below casing half 200B, upper hole 200h is plugged with a breather cap 250 ensuring an air communication between a space outside of casing 200 and motor chamber MC in casing 200. Lower hole 200h is plugged with a plug 251 so as to prevent fluid in motor chamber MC from escaping therethrough.

As shown in FIGS. 21 and 22, casing halves 200A and 200B are formed with respective upper and lower holes 200i, which are symmetric with respect to joint surface J and face motor chamber MC therebetween. Plugs 252 are screwed into both upper and lower holes 200i so as to close holes 200i. Each plug 252 can be rotated to be removed from corresponding hole 200i. Especially, plug 252 in lower hole 200i serves as a drain plug, and lower hole 200i serves as a drain hole which can be opened for draining fluid from motor chamber MC by removing plug 252 therefrom.

As shown in FIGS. 21 and 23, casing halves 200A and 200B are formed with respective upper and lower gauge plug holes 200j, which face gear chamber GC therebetween and are horizontally offset from each other. A portion of casing half 200A vertically opposite to gauge plug hole 200j formed in casing half 200B, and a portion of casing half 200B vertically opposite to gauge plug hole 200j are expanded vertically outward so as to serve as respective upper and lower fluid accumulation portions 200k. Regardless of whether casing half 200A is above or below casing half 200B, upper gauge plug hole 200j is plugged by a gauge plug 253 provided with a gauge rod 253a, and lower gauge plug hole 200j is closed by a plug 254 so as to prevent fluid in gear chamber GC from escaping therethrough. Incidentally, lower gauge plug hole 200j can be opened by removing plug 254 therefrom so as to serve as a drain hole for draining fluid from gear chamber GC. Gauge rod 253a is extended downward from gauge plug 253 screwed in upper gauge plug hole 200j and is submerged at a bottom tip thereof in fluid accumulated in lower fluid accumulation portion 200k vertically opposite to upper gauge plug hole 200j. When an amount of fluid in casing 200 is gauged, gauge plug 253 is screwed off from upper gauge plug hole 200j so that fluid stuck on the tip of gauge rod 253a is gauged.

Installation of electric motor assembly 202 into motor chamber MC in casing 200 will be described with reference to FIGS. 21-23. Electric motor assembly 202 includes stator 33, rotor 35 and motor shaft support frame 37, similar to electric motor assembly 2 of electric transaxle unit A. Rotor 35 is fixed on an axial intermediate portion of motor shaft 3. Motor shaft support frame 37 journaling motor shaft 3 via bearing 42 is fastened to not casing half 200B but only casing half 200A via bolts 49, similar to motor shaft support frame 37 in the embodiment of electric transaxle unit A shown in FIGS. 11 and 12. Stator plate 33b of stator 33 is fixed to motor shaft support frame 37, journals motor shaft 3 at a center portion thereof via bearing 43, and has stator core 33a, on which armature windings 34 are fixed so as to be disposed between the outer peripheral portion of rotor 35 and motor shaft 3. The processes mentioned above with reference to FIG. 6(b) are performed for assembling motor assembly 202.

A wire-gathering box 235 is fixed on stator plate 33b, and harness 85 passed through plug 144 clamped between casing halves 200A and 200B is connected to wire-gathering box 235 so as to be connected to armature windings 34.

In electric motor assembly 202, a rotation angle sensor 238 is disposed in wire-gathering box 235. Rotation angle sensor 238 includes a resolver 239 and a detected member 240. In this regard, harness 88 passed through plug 145 clamped between casing halves 200A and 200B is extended in motor chamber MC so as to be connected to resolver 239. Wire-gathering box 235 has a hole 235a in which an end portion of motor shaft 3 is extended from bearing 43 in stator plate 33b axially opposite to the end portion of motor shaft 3 in gear chamber GC. In hole 235a, discoid detected member 240 is fixed on motor shaft 3, and resolver 239 is disposed to annularly surround detected member 240 so as to detect the rotational position of detected member 240. Resolver 239 is fixed to stator plate 33b via fixture rings 241 and 242 clamping resolver 239 by screws 243.

Figure 26:
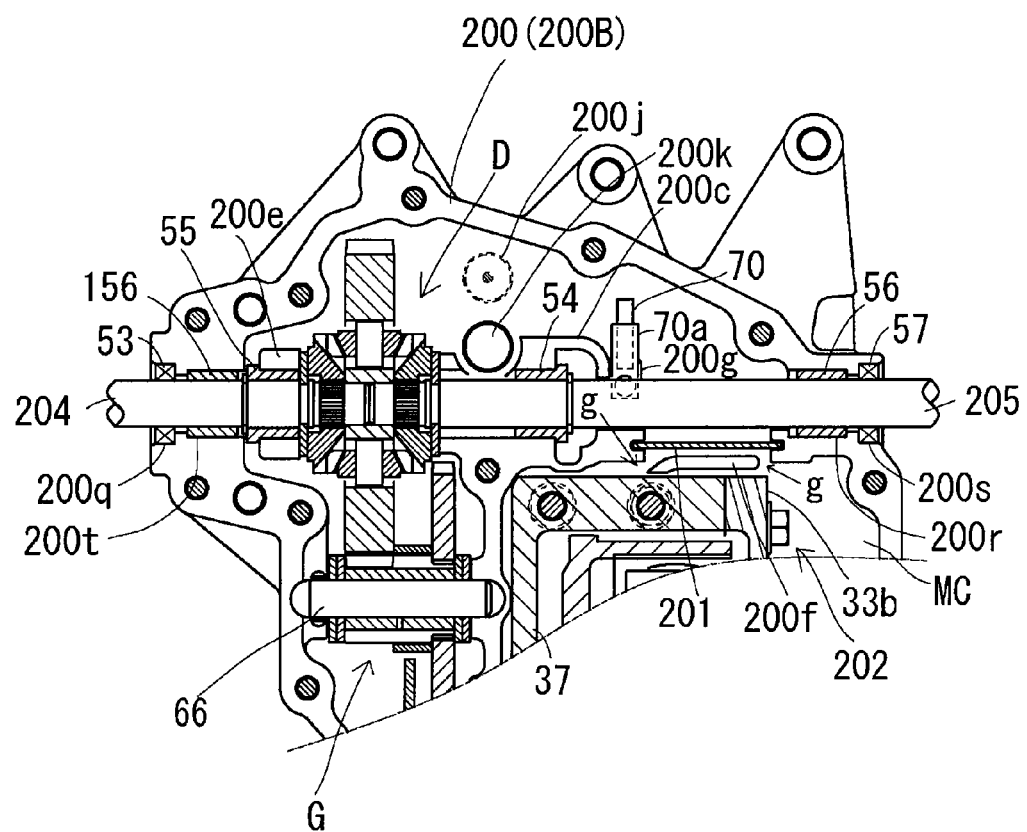
FIG. 26 is a fragmentary sectional plan view of electric transaxle unit B having casing 200 from which casing half 200B has been removed, showing remaining casing half 200A and inner and outer structures of casing half 200A, wherein electric transaxle unit A is provided with a pair of axles 204 and a differential mechanism D differentially connecting axles 204 to each other.

Alternatively, electric transaxle unit B may support a pair of left and right axle 204 and 205, and may have differential mechanism D differentially connecting left and right axles 204 and 205 and drivingly connected to deceleration gear train unit G, as shown in FIG. 26. In this regard, standardized casing 200 (i.e., casing halves 200A and 200B) can be deformed by easy machining so as to selectively support either single axle 204 or the pair of axles 204 and 205.

Here, on the assumption that casing 200 supports single axle 204, a left or right end portion of casing 200 from which the distal end of axle 204 projects outward of casing 200 is referred to as a lateral distal end portion of casing 200, and a right or left end portion of casing 200 laterally opposite to the lateral distal end portion of casing 200 is referred to as a lateral proximal end portion of casing 200.

The portions of standardized casing halves 200A and 200B, which serve as the lateral distal end portion of casing 200 when supporting single axle 204, are previously formed with sectionally semicircular recesses, which are mutually joined to constitute an axle hole for passing axle 204 therethrough, and are previously formed with sectionally semicircular annular grooves 200q around the recesses, regardless of whether casing 200 supports single axle 204 or the pair of axles 204 and 205. Grooves 200q of respective casing halves 200A and 200B are joined to each other by joining casing halves 200A and 200B so as to constitute an annular groove, into which a fluid seal 53 provided on axle 204 is fitted.

To support single axle 204, as mentioned above referring to FIG. 21, standardized casing halves 200A and 200B are deformed by additional machining so as to form respective sectionally semicircular annular grooves 200d around the respective recesses as halves of the axle hole. Grooves 200d of respective casing halves 200A and 200B constitute the circular annular groove by joining casing halves 200A and 200B to each other. Bearing (specifically, ball bearing) 52 provided on an axial intermediate portion of axle 204 is fitted into the annular groove as the joined grooves 200d. Bush 54 provides on the lateral proximal end portion of axle 204 is fitted into bearing portion 200c formed by joining casing halves 200A and 200B to each other.

More specifically, when either casing half 200B or 200A is placed as the lower casing half of casing 200 before being joined to the upper casing half, lower half portions of bearing 52 and fluid seal 53 on axle 204 are fitted into sectionally semicircular grooves 200d and 200q of the lower casing half, and a lower half portion of bush 54 on axle 204 is fitted into a lower half portion of bearing portion 200c in the lower casing half. Then, remaining casing half 200A or 200B as the upper casing half is put on the lower casing half, so that upper half portions of bearing 52 and fluid seal 53 are naturally fitted into sectionally semicircular grooves 200d and 200q of the upper casing half, and an upper half portion of bush 54 is naturally fitted into an upper half portion of bearing portion 200c in the upper casing half, thereby completing fitting of bearing 52, fluid seal 53 and bush 54 into casing 200. Incidentally, later-discussed bushes 55 and 56 and fluid seal 57 are fitted in casing 200 in the same way.

On the other hand, the portions of casing halves 200A and 200B, which serve as the lateral proximal end portion of casing 200 when supporting single axle 204, are not deformed for supporting an axle. In other words, the lateral proximal end portion of standardized casing 200 is kept as having no hole for supporting an axle, thereby preventing fluid from escaping from casing 200.

Alternatively, referring to FIG. 26, to support a pair of axles 204 and 205 serving as the pair of left and right axles, the portions of casing halves 200A and 200B, which serve as the lateral distal end portion of casing 200 when supporting single axle 204, are formed with respective sectionally semicircular grooves 200r by machining so as to extend along an outer peripheral surface of axle 204, instead of grooves 200d for fitting bearing 52. A bush 156 is fitted on axle 204 instead of bearing 52, and is fitted into grooves 200t, which form a sectionally circular hole by joining casing halves 200A and 200B. Further, a bush 55 is fitted on axle 204 and is fitted into axle guide portions 200e. Casing halves 200A and 200B, which are joined to each other, clamp bushes 55 and 56 therebetween so as to journal axle 204 via bushes 55 and 156.

Differential mechanism D, which differentially connects axles 204 and 205 to each other, is disposed between axle guide portion 200e and bearing portion 200c in gear chamber GC. Bush 54 in bearing portion 200c is provided on axle 205 extended from differential mechanism D axially opposite to axle 204. In other words, bushes 55 and 54 journal respective axles 204 and 205 adjacent to differential mechanism D.

Further, each of the portions of casing halves 200A and 200B laterally opposite to the portion supporting axle 204, which serve as the lateral proximal end portion of casing 200 when supporting only axle 204 as the single axle, is formed by machining to have a sectionally semicircular recess with sectionally semicircular annular grooves 200r and 200s therearound, and this recess is laterally symmetric to the recess having grooves 200t and 200q formed for supporting axle 204. A bush 56 is fitted on axle 205 and is fitted into grooves 200r, which form a sectionally circular hole by joining casing halves 200A and 200B. A fluid seal 57 is fitted on axle 205 and is fitted into grooves 200s, which form a sectionally circular hole by joining casing halves 200A and 200B. Casing halves 200A and 200B, which are joined to each other, clamp bush 56 and fluid seal 57 therebetween so as to journal axle 205 via bush 56.

In this way, in the embodiment of FIG. 26, casing halves 200A and 200B are joined to each other so as to journal axle 204 via bushes 55 and 156 clamped therebetween, to journal axle 205 via bushes 54 and 56 clamped therebetween, to clamp fluid seal 53 on axle 204 therebetween, and to clamp fluid seal 57 on axle 205 therebetween.

It is obvious for those skilled in the art that various structures adaptable to electric transaxle unit A are also adaptable to electric transaxle unit B even if they are not mentioned in the above description of electric transaxle unit B. Especially, the same reference numerals as used in the embodiments of electric transaxle unit A designate members and portions having the same functions as corresponding ones in the embodiments of electric transaxle unit A.

Incidentally, if the cogging torque of electric motor assembly 202 is too large to allow smooth free rotation of axle 204 when towing lawn mower 100, it is preferred for electric transaxle unit B to have a mechanical clutch for towing a vehicle, which is provided at any portion of a power train between motor shaft 3 and axle 204 (see above-mentioned clutch TC).

Figure 27:
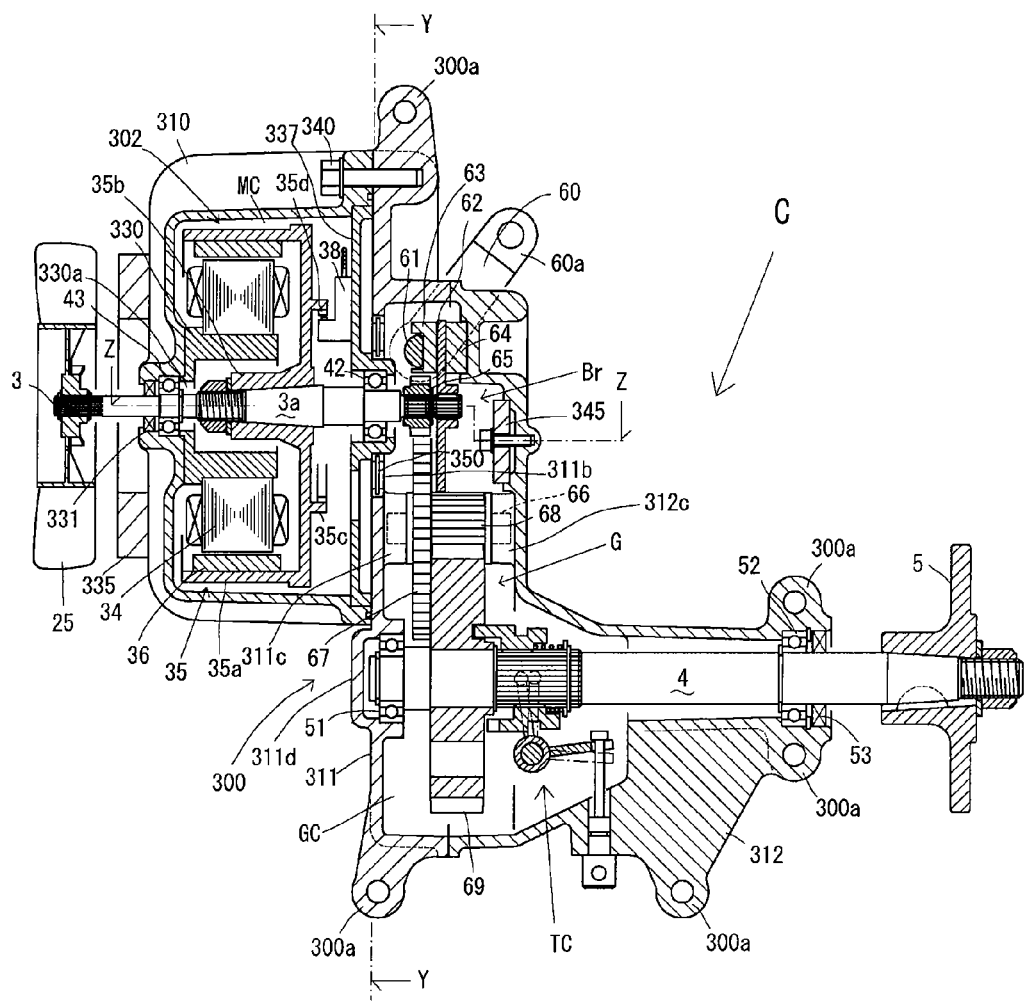
FIG. 27 is a sectional plan view of an alternative electric transaxle unit C having a casing 300 dividable into left, right and middle casing parts by vertical surfaces.
Figure 28:
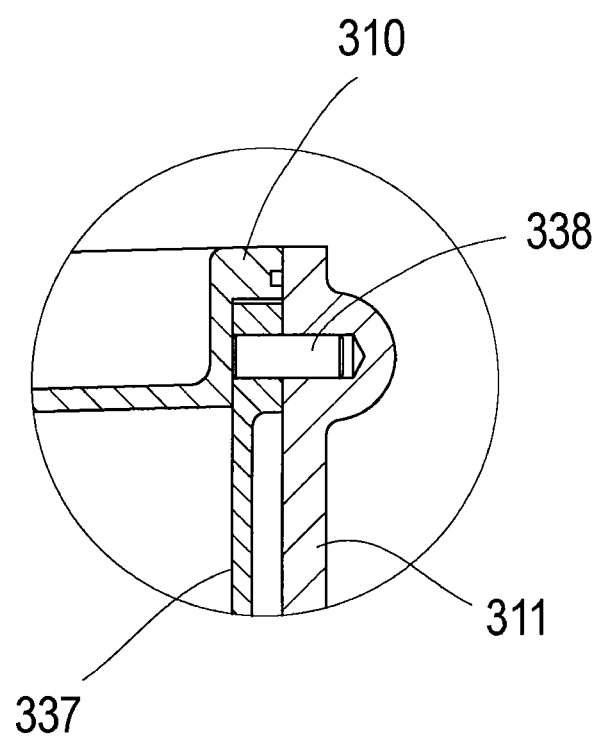
FIG. 28 is a sectional plan view of a portion of electric transaxle unit C where a motor shaft supporter is engaged with the middle casing part via a dowel pin.
Figure 29:
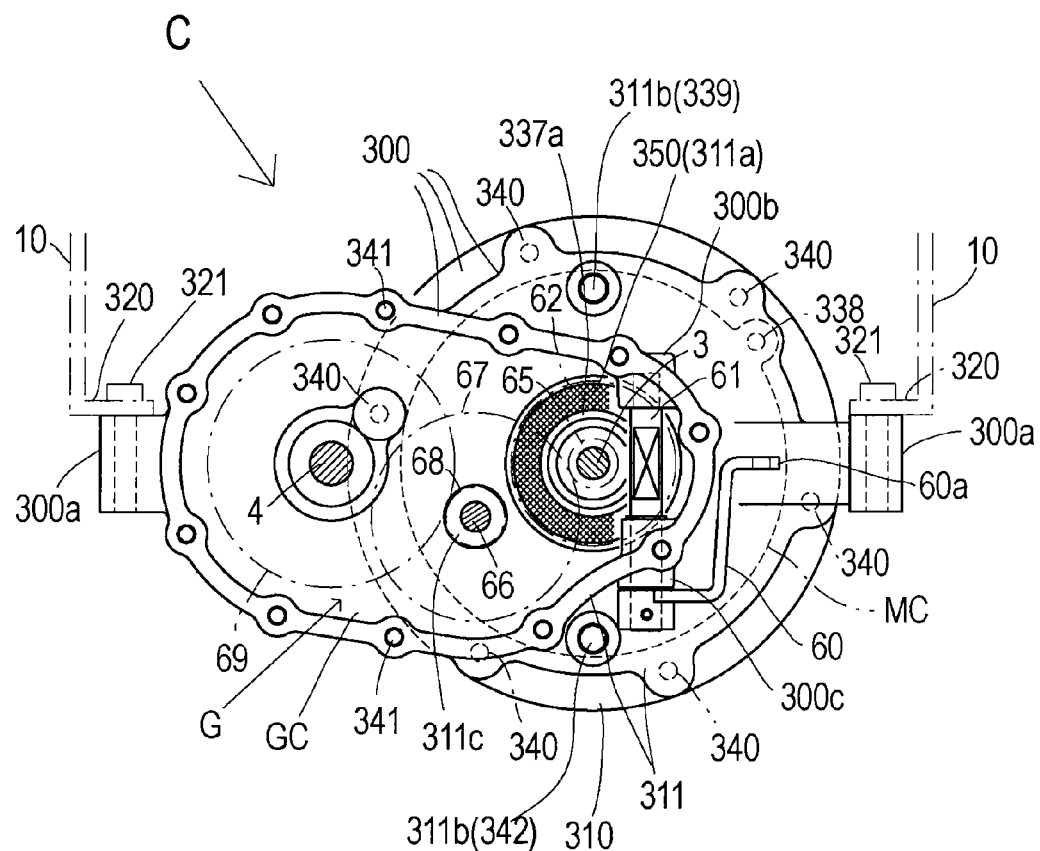
FIG. 29 is a cross sectional view taken along Y-Y line of FIG. 27.

An alternative electric transaxle unit C will be described with reference to FIGS. 27-30. Electric transaxle unit C includes a casing 300. Axle 4 projects laterally outward from casing 300. Casing 300 has later-discussed divisional casing parts 310, 311, and 312, and bosses 300a having vertical penetrating bolt holes are formed on casing parts 310, 311, and 312 so as to serve as portions to be attached to vehicle body frame 10. In this regard, vehicle body frame 10 has tabs 320 to be fitted onto top surfaces of bosses 300a, and tabs 320 are fastened to casing 300 by screwing respective bolts 321 into respective boss holes of bosses 300a, as shown in FIG. 29.

On the assumption that axle 4 supported by casing 300 is disposed on a horizontal phantom surface, casing 300 is shaped so as to have the horizontal phantom surface equidistant from top and bottom ends of bosses 300a. Therefore, when a pair of electric transaxle units C are arranged so that one corresponds to the other vertically inversed, thereby serving as left and right electric transaxle units C, the top surfaces of bosses 300a of respective left and right electric transaxle units C are disposed at equal heights so as to be convenient to their fitting to tabs 320 of vehicle body frame 10. Thus, casing 300 can be vertically inversed so as to selectively serve as either casing 300 of left electric transaxle unit C from which axle 4 projects leftwardly outward or casing 300 of right electric transaxle unit C from which axle 4 projects rightwardly outward. Further, an axis of motor shaft 3 is disposed on the horizontal phantom surface.

Casing 300 is not dividable into upper and lower divisional parts by a horizontal surface, however, it is dividable into left, middle and right divisional casing parts 310, 311 and 312 by vertical surfaces. Axle supporting casing part 312 is joined at a left or right vertical open surface to a vertical open surface of middle casing part 311, and casing parts 311 and 312 are fastened to each other by bolts 341 shown in FIG. 29, thereby constituting a gear chamber GC therein. Motor casing part 310 forming a motor chamber MC therein is joined at a vertical open surface to a right or left vertical surface of middle casing part 311 laterally opposite to axle supporting casing part 312 with respect to middle casing part 311, and is fastened to middle casing part 311 by bolts 340 as shown in FIGS. 27 and 29.

A structure of an electric motor assembly 302, installation of electric motor assembly 302 into motor casing part 310, and attachment of motor casing part 310 incorporating electric motor assembly 302 to middle casing part 311 will be described with reference to FIGS. 27-30. Electric motor assembly 302 includes motor shaft 3, drum-shaped rotor 35 fixed on motor shaft 3, and permanent magnets 36 fixed on the inner peripheral surface of the outer peripheral portion of rotor 35, similar to the above-mentioned electric motor assembly 2 in electric transaxle unit A. Electric motor assembly 302 includes a cup-shaped stator 330 disposed coaxially to motor shaft 3. Armature windings 34 are fixed on an outer peripheral surface of stator 330 so as to face permanent magnets 36 of rotor 35 therearound. Stator 330 is fixed to an inside portion of a vertical wall of motor casing part 310 at an axial end thereof opposite to gear chamber GC.

Central boss 35b of rotor 35 fixed on motor shaft 3 is disposed in cup-shaped stator 330, and a vertical end surface of stator 330, laterally opposite to the projection direction of axle 4 outward from casing 300, is fixed to an inside surface of a vertical wall of motor casing part 310. A central hole 330a is provided in the vertical surface of stator 330, and motor shaft 3 projecting outward from central boss 35b of rotor 35 is passed through central hole 330a of stator 330. Bearing 43 and a fluid seal 331 are fitted in the vertical wall of motor casing part 310 so as to neighbor central hole 330a of stator 330. Motor shaft 3 passed through hole 330a is passed through bearing 43 and fluid seal 331. A wire-gathering box 335 is fixed onto an outer surface of the vertical wall of motor casing part 310. An outer end portion of motor shaft 3 passed through fluid seal 331 is freely rotatably passed through wire-gathering box 335, and cooling fan 25 is fixed on an outer end of motor shaft 3.

Figure 30:
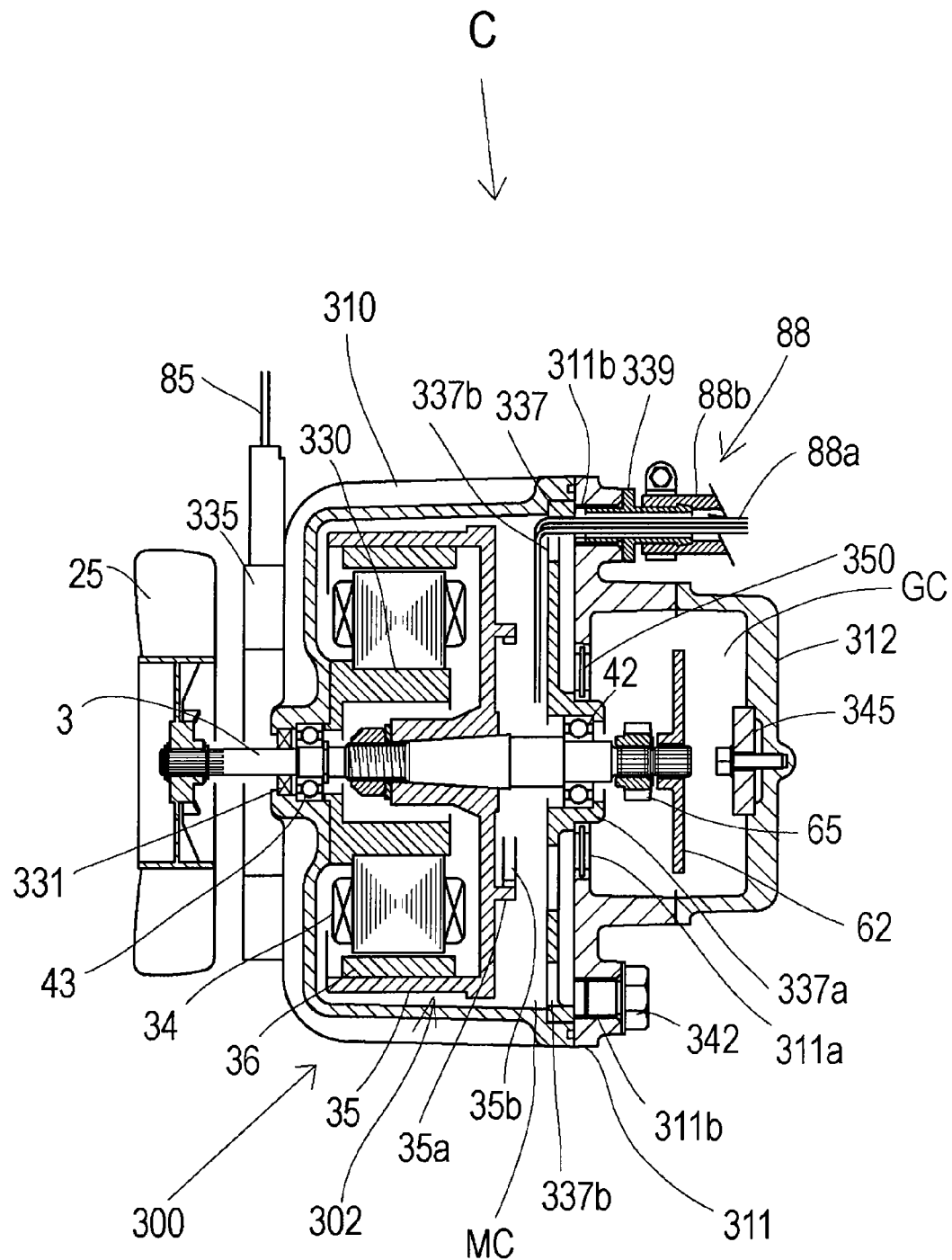
FIG. 30 is a cross sectional view taken along Z-Z line of FIG. 29.

Harness 85, which is electrically connected to armature windings 34, is connected to wire-gathering box 332 exposed on motor casing part 310 of casing 300, as shown in FIG. 30. Therefore, casing 300 does not need to have a hole for passage of harness 85 or a seal to be fitted in the hole.

To detect a rotation angle of rotor 35 (i.e., motor shaft 3), electric motor assembly 302 is provided with annular convex 35c formed on cup-shaped portion 35a, detected member 35d provided on the inner peripheral surface of annular convex 35c, and rotation angle detector 38 for detecting a rotational position of detected member 35d. Rotation angle detector 38 is fixed to a motor shaft support frame 337. Motor shaft support frame 337 is not fixed to stator 330 similar to motor shaft support frame 37, but it is disposed along middle casing part 311 and is fixedly clamped between casing parts 310 and 311. Harness 88 connected to rotation angle detector 38 is passed through motor shaft support frame 337 and middle casing part 311 as discussed later with reference to FIG. 30.

Motor shaft support frame 337 has a central boss 337a in which bearing 42 is fitted. Motor shaft support frame 337 with bearing 42 is fitted and retained on middle casing part 311 by a doweling pin or doweling pins 338 as shown in FIGS. 28 and 29, before attachment of installation of motor casing part 310 to middle casing part 311 while motor casing part 310 incorporating electric motor assembly 302 as an assembly of motor shaft 3, stator 330 and rotor 330. In this state, a ring-shaped net serving as a fluid filter 350 is fitted between an outer peripheral surface of central boss 337a and an inner peripheral surface of a circular hole 311a of middle casing part 311 surrounding central boss 337a. Rotation angle detector 38 is fixed on motor shaft support frame 337.

As shown in FIGS. 29 and 30, a pair of upper and lower holes 337b of motor shaft support frame 337 coincide to a pair of upper and lower holes 311b of middle casing part 311, respectively. Either the pair of coinciding upper holes 337b and 311b or the pair of coinciding lower holes 337b and 311b are selected (in this embodiment, upper holes 337b and 311b are selected), and electric wires 88a of harness 88 are passed through selected coinciding holes 337b and 311b so as to be connected to rotation angle detector 38. A pipe joint 339 is fitted into selected hole 311b (in this embodiment, upper hole 311b) of middle casing part 311, and projects at an outer end thereof outward from middle casing part 311. A protection pipe 88b surrounding electric wires 88a of harness 88 is connected at an end thereof to the outer end of pipe joint 339. The remaining hole 311b (in this embodiment, lower hole 311b) is closed by a plug 342 screwed therein.

Then, an outer peripheral edge portion of motor casing part 310 surrounding a vertical opening is fitted onto a vertical surface of middle casing part 311 while an annular step formed on the outer peripheral edge portion of motor casing part 310 is fitted to the outer peripheral edge of motor shaft support frame 337. During access of motor casing part 310 to middle casing part 311, motor shaft 3 is passed through bearing 42 in motor shaft support frame 337, and detected member 35d fixed on rotor 35 is disposed to face rotation angle detector 38 fixed on middle casing part 311. In this way, the outer peripheral edge of motor shaft support frame 337 comes to be clamped between the outer peripheral edge portion of motor casing part 310 and the vertical surface of middle casing part 311, and the outer peripheral portion of motor casing part 310 is fastened to middle casing part 311 by bolts 340 so as to complete attachment of motor casing part 310 incorporating electric motor assembly 302 to middle casing part 311, whereby casing 300 is provided therein with motor chamber MC incorporating electric motor assembly 302.

Before motor casing part 310 incorporating electric motor assembly 302 is completely attached to middle casing part 311, axle-supporting casing part 312 is not attached to middle casing part 311, i.e., gear chamber CG is uncompleted, and the vertical side surface of middle casing part 311 laterally opposite to motor casing part 311 has a wide opening. After the completion of attachment of motor casing part 310 to middle casing part 311, the output end portion of motor shaft 3 projects outward from bearing 42 in motor shaft support frame 337 so as to enter the cavity of middle casing part 311. Then, motor output gear 65 and brake rotor 62 are fitted onto the projecting output end portion of motor shaft 3, and other components of brake mechanism Br and deceleration gear train G are installed into the cavity of middle casing part 311.

To constitute brake mechanism Br, middle casing part 311 is formed vertically opposite upper and lower bosses 300b and 300c for supporting vertical brake shaft 61 therein, as shown in FIG. 29. Boss 300b is closed outward so as not to have the end of brake shaft 61 projecting outward therefrom, and boss 300c is vertically penetrated so as to be opened outward. Boss 300b is disposed above or below boss 300c depending on whether electric transaxle unit C serves as a left unit or a right unit corresponding to the vertically inversed left unit. Cranked brake arm 60 is fixed on the end of vertical brake shaft 61 projecting outward from boss 300c so as to have connection end 60a, which is constantly disposed at the same height as the axis of axle 4 regardless of whether boss 300c is above or below boss 300b (in this embodiment, boss 300c serves as the lower boss below boss 300b). Operable end 60a is connected to a link member, such as a wire or a rod, extended from a braking operation device provided in lawn mower 100 so as to be mechanically connected to the braking operation device, or is connected to an active portion of an electric actuator (not shown) so as to be electrically connected to the braking operation device.

To constitute deceleration gear train G, each of axial opposite ends of counter shaft 66 is not clamped between divisional casing parts but it is fitted into each of circularly shaped bosses 311c and 312c of respective casing parts 311 and 312. Before axle-supporting casing part 312 is attached to middle casing part 311, only one end of counter shaft 66 is fitted into boss 311c of middle casing part 311, and gears 67 and 68 are fitted on counter shaft 66. Further, bearing 51 for journaling an end of axle 4 is fitted in a boss 311d formed in middle casing part 311 before attachment of axle-supporting casing part 312 to middle casing part 311.

On the other hand, before axle-supporting casing part 312 is attached to middle casing part 311, axle 4 is supported by axle-supporting casing part 312 via bearing 52 and fluid seal 53, and is provided thereon with final gear 69 and clutch TC for towing the vehicle, and a discoid magnet 345 for trapping metal powder caused by rubbing of gears is fastened to a wall of axle-supporting casing part 312 by a bolt. When axle-supporting casing part 312 is attached to middle casing part 311, the projecting end of counter shaft 66 is fitted into boss 312c, and an end of axle 4 is fitted into bearing 51, and brake pad 64 is disposed between brake rotor 62 and a wall of axle-supporting casing part 312. Finally, axle-supporting casing part 312 is fastened to middle casing part 311 by bolts 341, thereby completing electric transaxle unit C.

It is obvious for those skilled in the art that various structures adaptable to electric transaxle unit A or B are also adaptable to electric transaxle unit C even if they are not mentioned in the above description of electric transaxle unit C. Especially, the same reference numerals as used in the embodiments of electric transaxle unit A or B designate members and portions having the same functions as corresponding ones in the embodiments of electric transaxle unit A or B.

Further, it is understood by those skilled in the art that the foregoing description is a preferred embodiment of the disclosed apparatus and that various changes and modifications may be made in the invention without departing from the scope thereof defined by the following claims.

What is claimed is:

1. An electric transaxle unit comprising:
an axle;
an electric motor for driving the axle;
a motor shaft serving as an output shaft of the electric motor, the motor shaft being not coaxial to the axle;
a deceleration gear train interposed between the motor shaft and the axle; and
a casing incorporating the axle, the electric motor, the motor shaft and the deceleration gear train,
wherein the casing includes an attachment portion to be attached to a frame, and
wherein the attachment portion has a constant height from a center axis of the axle regardless of whether the casing is vertically inversed.

2. The electric transaxle unit according to claim 1,
wherein the casing includes first and second divisional casing parts joined to each other to have a horizontal joint surface therebetween,
wherein the axle has an axis disposed on the horizontal joint surface, and
wherein the first divisional casing part includes a first attachment portion, and the second divisional casing part includes a second attachment portion, so that each of the first and second attachment portions can serve as the attachment portion of the casing to be attached to the frame, and the first and second attachment portions are equally distant in vertical from the horizontal joint surface therebetween.

3. The electric transaxle unit according to claim 2,
wherein the motor shaft is disposed to have an axis disposed on the horizontal joint surface.

4. An electric transaxle unit comprising:
an axle;
an electric motor for driving the axle;
a motor shaft serving as an output shaft of the electric motor, the motor shaft being not coaxial to the axle;
a deceleration gear train interposed between the motor shaft and the axle;
a brake adapted to brake any element in a power train between the motor shaft and the axle via the deceleration gear train;
a casing incorporating the axle, the electric motor, the motor shaft, the deceleration gear train and the brake; and
a brake arm for operating the brake, the brake arm being extended outward from the casing,
wherein the brake arm has a connection portion which is kept at a constant height from a center axis of the axle regardless of whether the casing is vertically inversed.

5. The electric transaxle unit according to claim 4,
wherein the casing includes first and second divisional casing parts joined to each other to have a horizontal joint surface therebetween,
wherein the axle has an axis disposed on the horizontal joint surface, and
wherein the brake arm is extended outward from one of the first and second divisional casing parts so as to have the connection portion disposed at the same height of the horizontal joint surface.

6. The electric transaxie unit according to claim 4,
wherein the casing includes first and second divisional casing parts joined to each other to have a horizontal joint surface therebetween,
wherein the axle has an axis disposed on the horizontal joint surface,
wherein both the first and second divisional casing parts include respective arm-projection portions adapted to have the brake arm extended outward therefrom,
wherein the arm-projection portions of the respective first and second divisional casing parts are evenly distant in vertical from the horizontal joint surfaces, and
wherein one of the arm-projection portions of the respective first and second divisional casing parts is selected so as to have the brake arm extended outward therefrom.

7. An electric transaxle unit comprising:
an axle;
an electric motor for driving the axle;
a motor shaft serving as an output shaft of the electric motor, the motor shaft being not coaxial to the axle;
a deceleration gear train interposed between the motor shaft and the axle;
a manually operable clutch disposed on any portion of a power train between the motor shaft and the axle via the deceleration gear train, so that the axle can be isolated from an output power of the electric motor by manual operation to disengage the clutch; and
a casing incorporating the axle, the electric motor, the motor shaft, the deceleration gear train and the clutch.

8. A vehicle comprising:
a pair of left and right wheels; and
a pair of left and right electric transaxle units for driving the respective left and right wheels, the left and right electric transaxle units being identical to each other, and each of the left and right electric transaxle units including
an axle,
an electric motor for driving the axle,
a motor shaft serving as an output shaft of the electric motor, the motor shaft being not coaxial to the axle,
a deceleration gear train interposed between the motor shaft and the axle, and
a casing incorporating the axle, the electric motor, the motor shaft and the deceleration gear train.

9. The vehicle according to claim 8,
wherein the left and right electric transaxle units are arranged so that one electric transaxle unit corresponds to the other electric transaxle unit vertically inversed.

10. The vehicle according to claim 8,
wherein the left and right electric transaxle units have the respective axles disposed on a coaxial line extended laterally of the vehicle, and
wherein the left and right electric transaxle units are line-symmetric with respect to a fore-and-aft extended centerline of the vehicle at the center of the coaxial line between the left and right axles.

11. The vehicle according to claim 8,
wherein the left and right electric transaxle units have the respective axles disposed coaxially to each other, and
wherein the left and right electric transaxle units are point-symmetric with respect to a lateral center point of a vehicle body disposed on a coaxial line of the axles between the left and right axles disposed coaxially to each other.

12. An electric transaxle unit comprising:
an axle;
an electric motor for driving the axle;
a casing incorporating the axle and the electric motor, wherein the casing includes first and second divisional casing parts joined to each other so as to have a joint surface therebetween, and includes a hole dividable between the first and second casing parts by the joint surface; and
a wire-passage member through which an electric wire is passed is fitted in the hole so as to be clamped between the first and second divisional casing parts.

13. The electric transaxle unit according to claim 12, wherein the wire-passage member fitted in the hole is shaped, when viewed along the joint surface, to have a first half extended from the joint surface into the first divisional casing part perpendicularly to the joint surface, and a second half extended from the joint surface into the second divisional casing part perpendicularly to the joint surface, and wherein each of the first and second halves has a width along the joint surface, so that the width is reduced as it goes further distant from the joint surface.

14. The electric transaxle unit according to claim 13, wherein each of the hole and the wire-passage member fitted in the hole is rhombic when viewed along the joint surface so as to have a diagonal extended on the joint surface.

15. An electric transaxle unit comprising:
a casing;
an axle supported by the casing;
an electric motor disposed in the casing so as to drive the axle, the electric motor including a hollow output rotary member having a tapered inner peripheral surface; and
a motor shaft supported in the casing and drivingly connected to the axle so as to serve as an output shaft of the electric motor,
wherein the motor shaft has a tapered outer peripheral surface, and
wherein the tapered inner peripheral surface of the output rotary member and the tapered outer peripheral surface of the motor shaft are fittingly pressed against each other by axial relative movement of the output rotary member and the motor shaft, whereby the output rotary member is fixed on the motor shaft.

16. An electric transaxle unit comprising:
a casing;
an axle supported by the casing; and
a motor assembly disposed in the casing so as to drive the axle, the motor assembly including:
a motor shaft drivingly connected to the axle,
a pair of first and second bearings fitted onto the motor shaft at respective inner peripheral surfaces thereof,
a rotor having a magnet and fixed on the motor shaft,
a stator having an armature winding and secured to the casing, the stator being formed with a first retaining projection,
wherein the stator is fitted onto an outer peripheral surface of the first bearing so as to have the first retaining projection on a distal side of the first bearing opposite to the second bearing in the axial direction of the motor shaft,
a support frame detachably fixed to the stator, the support frame being formed with a second retaining projection,
wherein the support frame is fitted onto an outer peripheral surface of the second bearing so as to have the second retaining projection on a distal side of the second bearing opposite to the first bearing in the axial direction of the motor shaft, and
wherein one of the first and second retaining projections abuts against the corresponding first or second bearing so that the other of the first and second retaining projections has a gap from the corresponding first or second bearing, and
a gap-filling member fitted in the gap so as to prevent the corresponding first or second bearing from moving towards the corresponding first or second retaining projection in the axial direction of the motor shaft.

17. The electric transaxle unit according to claim 16,
wherein the motor shaft includes a plurality of portions having different diameters so as to have a pair of steps abutting against axially proximal end surfaces of the respective first and second bearings so as to prevent the first and second bearings from moving towards each other in the axial direction of the motor shaft,
wherein the rotor has a tapered inner peripheral surface, and
wherein the motor shaft has a tapered outer peripheral surface fitted to the tapered inner peripheral surface of the rotor so as to be pressured by the rotor in one axial direction of the motor shaft towards one of the first and second bearings which abuts against the corresponding first or second retaining projection.

18. An electric transaxle unit comprising:
a casing formed therein with a motor chamber;
an axle supported by the casing; and
a motor assembly disposed in the motor chamber so as to drive the axle, the motor assembly including:
a motor shaft having an axis and drivingly connected to the axle,
a rotor having a magnet and fixed on the motor shaft,
a stator having an armature winding and secured to the casing, and
a support frame fixed to the stator so as to journal the motor shaft,
wherein the rotor and the armature winding are disposed in a space surrounded by the stator and the support frame fixed to the stator, and
wherein the support frame fixed to the support plate has an opening through which the rotor and the armature winding are exposed to the motor chamber.

19. The electric transaxle according to claim 18,
wherein the casing is constituted by joining a pair of casing halves to each other through a joint surface, and
wherein the support frame is fixed to one of the casing halves so as to secure the stator to the casing.

20. The electric transaxle unit according to claim 18,
wherein the motor chamber is filled therein with fluid so as to serve as a fluid sump which can supply fluid to the rotor and the armature winding through the opening of the support frame.

21. The electric transaxle unit according to claim 18,
wherein the casing has fins on an outer surface corresponding to the motor chamber.

* * * * *